(12) United States Patent
Mathers

(10) Patent No.: US 12,331,710 B2
(45) Date of Patent: Jun. 17, 2025

(54) POWER AMPLIFICATION, STORAGE AND REGENERATION SYSTEM AND METHOD USING TIDES, WAVES AND/OR WIND

(71) Applicant: Mathers Hydraulics Technologies Pty Ltd, Bridgeman Downs (AU)

(72) Inventor: Norman Ian Mathers, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 0 days.

(21) Appl. No.: 18/496,524

(22) Filed: Oct. 27, 2023

(65) Prior Publication Data

US 2024/0151205 A1    May 9, 2024

Related U.S. Application Data

(60) Provisional application No. 63/423,193, filed on Nov. 7, 2022, provisional application No. 63/439,754, filed on Jan. 18, 2023, provisional application No. 63/507,026, filed on Jun. 8, 2023, provisional application No. 63/432,245, filed on Dec. 13, 2022, provisional application No. 63/439,763, filed on Jan. 18, 2023, provisional application No. 63/461,084, filed on Apr. 21, 2023.

(51) Int. Cl.
   *F03B 13/26* (2006.01)
   *F03B 3/04* (2006.01)
   *F03B 15/04* (2006.01)

(52) U.S. Cl.
   CPC .............. *F03B 13/268* (2013.01); *F03B 3/04* (2013.01); *F03B 15/04* (2013.01)

(58) Field of Classification Search
   CPC ........... F03B 13/268; F03B 3/04; F03B 15/04
   See application file for complete search history.

(56) References Cited

U.S. PATENT DOCUMENTS

| | | |
|---|---|---|
| 983,754 A | 2/1911 | Nichols |
| 1,015,435 A | 1/1912 | Greenlaw et al. |
| 1,760,632 A | 5/1930 | Cooper |
| 2,003,615 A | 6/1935 | Charles et al. |
| 2,570,411 A | 10/1951 | Vickers |
| 2,696,790 A | 12/1954 | Crow |
| 2,962,972 A | 12/1960 | Meter |

(Continued)

FOREIGN PATENT DOCUMENTS

| | | |
|---|---|---|
| AU | 2010320606 B2 | 2/2017 |
| AU | 2017202300 B2 | 10/2018 |

(Continued)

OTHER PUBLICATIONS

"U.S. Appl. No. 13/510,643, Non Final Office Action mailed Aug. 13, 2015", 9 pgs.

(Continued)

*Primary Examiner* — Michael L Sehn
(74) *Attorney, Agent, or Firm* — Schwegman Lundberg & Woessner, P.A.

(57) ABSTRACT

Methods, systems and apparatuses including systems and methods that can be used for operating a water turbine such as along one or more flow channels of a tidal estuary for power generation is disclosed. The water turbine can be positioned within the one or more flow channels and can be turned by the flow of the water from the estuary.

19 Claims, 57 Drawing Sheets

(56) References Cited

U.S. PATENT DOCUMENTS

| | | | |
|---|---|---|---|
| 2,962,973 | A | 12/1960 | Bruce |
| 2,985,467 | A | 5/1961 | Cable, Jr. et al. |
| 3,042,163 | A | 7/1962 | Lapsley |
| 3,102,494 | A | 9/1963 | Adams et al. |
| 3,120,154 | A | 2/1964 | Gilreath |
| 3,149,845 | A | 9/1964 | Knox |
| 3,160,147 | A | 12/1964 | Hanson et al. |
| 3,208,570 | A | 9/1965 | Aschauer |
| 3,254,606 | A | 6/1966 | Rosaen |
| 3,407,742 | A | 10/1968 | Mitchell et al. |
| 3,421,413 | A | 1/1969 | Adams et al. |
| 3,533,493 | A | 10/1970 | Braun |
| 3,586,466 | A | 6/1971 | Erickson |
| 3,597,998 | A | 8/1971 | Ebert |
| 3,672,797 | A | 6/1972 | Gerlach et al. |
| 3,792,585 | A | 2/1974 | Eisenmann et al. |
| 3,895,565 | A | 7/1975 | Schottler |
| 3,929,356 | A | 12/1975 | Devincent et al. |
| 3,944,263 | A | 3/1976 | Arnold |
| 4,012,060 | A | 3/1977 | Reneau |
| 4,037,409 | A | 7/1977 | Leibach |
| 4,132,512 | A | 1/1979 | Roberts |
| 4,260,343 | A | 4/1981 | Watanabe et al. |
| 4,274,010 | A | 6/1981 | Lawson-Tancred |
| 4,350,220 | A | 9/1982 | Carman |
| 4,371,198 | A | 2/1983 | Martin |
| 4,406,599 | A | 9/1983 | Stephan |
| 4,441,573 | A | 4/1984 | Carman et al. |
| 4,472,119 | A | 9/1984 | Roberts |
| 4,516,919 | A | 5/1985 | Roberts |
| 4,619,290 | A | 10/1986 | Katz |
| 4,646,521 | A | 3/1987 | Snyder |
| 4,659,297 | A | 4/1987 | Kahrs |
| 4,674,280 | A | 6/1987 | Stuhr |
| 4,861,235 | A | 8/1989 | Nakajima et al. |
| 5,029,461 | A | 7/1991 | Lawrence et al. |
| 5,509,793 | A | 4/1996 | Cherry |
| 5,551,484 | A | 9/1996 | Charboneau |
| 5,655,369 | A | 8/1997 | Folsom et al. |
| 5,657,629 | A | 8/1997 | Folsom et al. |
| 5,904,043 | A | 5/1999 | Nagatomo |
| 6,056,329 | A | 5/2000 | Kitani et al. |
| 6,109,863 | A | 8/2000 | Milliken |
| 6,135,742 | A | 10/2000 | Cho et al. |
| 7,686,602 | B1 | 3/2010 | Landhuis |
| 7,914,411 | B2 | 3/2011 | Basteck |
| 7,955,062 | B2 | 6/2011 | Mathers |
| 8,535,030 | B2 | 9/2013 | Chua et al. |
| 8,584,452 | B2 | 11/2013 | Lloyd et al. |
| 8,597,002 | B2 | 12/2013 | Mathers |
| 8,602,757 | B2 | 12/2013 | Patterson |
| 8,691,063 | B2 | 4/2014 | Aleksandrov |
| 8,708,679 | B2 | 4/2014 | Mathers |
| 9,400,043 | B2 | 7/2016 | Mathers et al. |
| 9,719,351 | B2 | 8/2017 | Landrum |
| 9,874,270 | B2 | 1/2018 | Mathers |
| 10,428,798 | B2 | 10/2019 | Mathers |
| 10,487,657 | B2 | 11/2019 | Mathers et al. |
| 10,774,966 | B2 | 9/2020 | Mathers |
| 10,788,112 | B2 | 9/2020 | Mathers et al. |
| 11,060,500 | B2 * | 7/2021 | Chen ............ F03D 1/065 |
| 11,085,299 | B2 | 8/2021 | Mathers |
| 11,255,193 | B2 | 2/2022 | Mathers |
| 2004/0047741 | A1 | 3/2004 | Dalton |
| 2004/0136853 | A1 | 7/2004 | Clements et al. |
| 2004/0150168 | A1 | 8/2004 | Heathcott et al. |
| 2004/0219046 | A1 | 11/2004 | Johnson et al. |
| 2006/0133946 | A1 | 6/2006 | Mathers |
| 2007/0231117 | A1 | 10/2007 | Gokhman |
| 2009/0226243 | A1 | 9/2009 | Krywitsky |
| 2009/0280021 | A1 | 11/2009 | Mathers |
| 2009/0314353 | A1 | 12/2009 | Vasshus et al. |
| 2010/0024444 | A1 | 2/2010 | Sharma et al. |
| 2010/0028641 | A1 | 2/2010 | Zhu et al. |
| 2010/0154402 | A1 | 6/2010 | Cho |
| 2010/0244447 | A1 | 9/2010 | Gopalswamy et al. |
| 2012/0242081 | A1 | 9/2012 | Keays et al. |
| 2013/0067899 | A1 | 3/2013 | Mathers |
| 2013/0069369 | A1 | 3/2013 | Salehpoor |
| 2014/0062088 | A1 | 3/2014 | Carr |
| 2014/0138958 | A1 | 5/2014 | Verdegem |
| 2014/0265335 | A1 | 9/2014 | Andreis et al. |
| 2014/0291045 | A1 | 10/2014 | Collett et al. |
| 2015/0128581 | A1 | 5/2015 | Mathers |
| 2015/0184641 | A1 | 7/2015 | Crane et al. |
| 2015/0338003 | A1 | 11/2015 | Saito et al. |
| 2016/0178104 | A1 | 6/2016 | Queau et al. |
| 2016/0194959 | A1 | 7/2016 | Pekrul |
| 2018/0010676 | A1 | 1/2018 | Mathers et al. |
| 2018/0023738 | A1 | 1/2018 | Mathers |
| 2018/0094712 | A1 | 4/2018 | Mathers |
| 2018/0106152 | A1 | 4/2018 | Mathers et al. |
| 2018/0298881 | A1 | 10/2018 | Mathers |
| 2020/0011180 | A1 | 1/2020 | Mathers |
| 2020/0132041 | A1 | 4/2020 | Chen et al. |
| 2020/0270992 | A1 | 8/2020 | Mathers |
| 2020/0370692 | A1 | 11/2020 | Mathers |
| 2023/0026500 | A1 | 1/2023 | Mathers |

FOREIGN PATENT DOCUMENTS

| | | |
|---|---|---|
| CN | 1833901 A | 9/2006 |
| CN | 1853031 A | 10/2006 |
| CN | 2924153 Y | 7/2007 |
| CN | 101081596 A | 12/2007 |
| CN | 101233297 A | 7/2008 |
| CN | 101490420 A | 7/2009 |
| CN | 102562208 A | 7/2012 |
| CN | 102753851 A | 10/2012 |
| CN | 103052796 A | 4/2013 |
| CN | 103510988 A | 1/2014 |
| CN | 103511219 A | 1/2014 |
| CN | 103758976 A | 4/2014 |
| CN | 103836093 A | 6/2014 |
| CN | 104471251 A | 3/2015 |
| CN | 102753851 B | 8/2016 |
| CN | 106090065 A | 11/2016 |
| CN | 107428241 A | 12/2017 |
| CN | 107709704 A | 2/2018 |
| CN | 108431406 A | 8/2018 |
| CN | 108848674 A | 11/2018 |
| CN | 108894828 A | 11/2018 |
| CN | 106090065 B | 3/2019 |
| CN | 110023667 A | 7/2019 |
| CN | 110382822 A | 10/2019 |
| CN | 108431406 B | 7/2020 |
| CN | 115614205 A | 1/2023 |
| DE | 2165530 A1 | 7/1973 |
| DE | 19829726 A1 | 1/2000 |
| DE | 102011082725 A1 | 3/2013 |
| DE | 102012013152 A1 | 1/2014 |
| EP | 0051192 A1 | 5/1982 |
| EP | 0087401 A1 | 8/1983 |
| EP | 0384335 A1 | 8/1990 |
| EP | 0399387 A2 | 11/1990 |
| EP | 0399387 B1 | 9/1992 |
| EP | 1536138 A1 | 6/2005 |
| EP | 3365555 B1 | 9/2019 |
| EP | 2792178 A1 | 11/2020 |
| FR | 2944071 A3 | 10/2010 |
| GB | 1150873 A | 5/1969 |
| GB | 1513208 A | 6/1978 |
| GB | 2029906 A | 3/1980 |
| GB | 2109467 A | 6/1983 |
| GB | 2176537 A | 12/1986 |
| GB | 2481365 A | 12/2011 |
| IN | 5265DELNP2012 A1 | 8/2016 |
| IN | 201717028529 A | 10/2017 |
| IN | 201717036365 A | 12/2017 |
| IN | 201817018393 A | 9/2018 |
| IN | 201817026903 A | 11/2018 |
| IN | 201917006576 A | 5/2019 |
| IN | 201917036435 A | 11/2019 |
| IN | 202214038888 A | 1/2024 |

(56) References Cited

FOREIGN PATENT DOCUMENTS

| | | | |
|---|---|---|---|
| JP | H05263413 | A | 10/1993 |
| JP | 2011144836 | A | 7/2011 |
| KR | 20140023133 | A | 2/2014 |
| WO | WO-1981001444 | A1 | 5/1981 |
| WO | WO-9111614 | A1 | 8/1991 |
| WO | WO-1991011614 | | 8/1991 |
| WO | WO-9508047 | A1 | 3/1995 |
| WO | WO-9801670 | A1 | 1/1998 |
| WO | WO-1998001670 | | 1/1998 |
| WO | WO-2005005782 | A1 | 1/2005 |
| WO | WO-2006119574 | A1 | 11/2006 |
| WO | WO-2007140514 | A1 | 12/2007 |
| WO | WO-2011005100 | A1 | 1/2011 |
| WO | WO-2011011682 | A2 | 1/2011 |
| WO | WO-2011061630 | A2 | 5/2011 |
| WO | WO-2012015850 | A1 | 2/2012 |
| WO | WO-2013140305 | A1 | 9/2013 |
| WO | WO-2015123784 | A1 | 8/2015 |
| WO | WO-2015164261 | A1 | 10/2015 |
| WO | WO-2016116809 | A1 | 7/2016 |
| WO | WO-2016149740 | A1 | 9/2016 |
| WO | WO-2017066826 | A1 | 4/2017 |
| WO | WO-2017106909 | A1 | 6/2017 |
| WO | WO-2018014082 | A1 | 1/2018 |
| WO | WO-2018161108 | A1 | 9/2018 |
| WO | WO-2020215118 | A1 | 10/2020 |
| WO | WO-2021113907 | A1 | 6/2021 |
| WO | WO-2022056582 | A1 | 3/2022 |

OTHER PUBLICATIONS

"U.S. Appl. No. 13/510,643, Notice of Allowance mailed Mar. 23, 2016", 7 pgs.
"U.S. Appl. No. 13/510,643, Preliminary Amendment May 17, 2012", 7 pgs.
"U.S. Appl. No. 13/510,643, Response filed Feb. 15, 2016 to Non Final Office Action mailed Aug. 13, 2015", 11 pgs.
"U.S. Appl. No. 14/599,746, Non Final Office Action mailed Apr. 19, 2017", 10 pgs.
"U.S. Appl. No. 14/599,746, Notice of Allowance mailed Sep. 13, 2017", 7 pgs.
"U.S. Appl. No. 14/599,746, Preliminary Amendment filed Jan. 20, 2015", 6 pgs.
"U.S. Appl. No. 14/599,746, Response filed Jul. 19, 2017 to Non Final Office Action mailed Apr. 19, 2017", 12 pgs.
"U.S. Appl. No. 15/544,829, 312 Amendment filed Jul. 17, 2020", 7 pgs.
"U.S. Appl. No. 15/544,829, Notice of Allowance mailed Apr. 20, 2020", 9 pgs.
"U.S. Appl. No. 15/544,829, Preliminary Amendment, Jul. 19, 2017", 3 pgs.
"U.S. Appl. No. 15/544,829, PTO Response to Rule 312 Communication mailed Jul. 31, 2020", 2 pgs.
"U.S. Appl. No. 15/561,410, Corrected Notice of Allowability mailed Sep. 3, 2019", 2 pgs.
"U.S. Appl. No. 15/561,410, Corrected Notice of Allowability mailed Sep. 12, 2019", 2 pgs.
"U.S. Appl. No. 15/561,410, Non Final Office Action mailed Mar. 22, 2019", 10 pgs.
"U.S. Appl. No. 15/561,410, Notice of Allowance mailed Jul. 17, 2019", 5 pgs.
"U.S. Appl. No. 15/561,410, Preliminary Amendment filed Sep. 25, 2017", 10 pgs.
"U.S. Appl. No. 15/561,410, Response filed Jun. 21, 2019 to Non-Final Office Action mailed Mar. 22, 2019", 10 pgs.
"U.S. Appl. No. 15/654,418, Final Office Action mailed Mar. 2, 2020", 7 pgs.
"U.S. Appl. No. 15/654,418, Non Final Office Action mailed Oct. 15, 2019", 7 pgs.

"U.S. Appl. No. 15/654,418, Notice of Allowance mailed May 11, 2020", 7 pgs.
"U.S. Appl. No. 15/654,418, Response filed Jan. 15, 2020 to Non Final Office Action mailed Oct. 15, 2019", 14 pgs.
"U.S. Appl. No. 15/654,418, Response filed Apr. 24, 2020 to Final Office Action mailed Mar. 2, 2020", 10 pgs.
"U.S. Appl. No. 15/654,418, Response filed Jul. 26, 2019 to Restriction Requirement mailed May 30, 2019", 8 pgs.
"U.S. Appl. No. 15/654,418, Restriction Requirement mailed May 30, 2019", 5 pgs.
"U.S. Appl. No. 15/767,902, Non Final Office Action mailed Jan. 28, 2019", 6 pgs.
"U.S. Appl. No. 15/767,902, Notice of Allowability mailed Aug. 12, 2019", 2 pgs.
"U.S. Appl. No. 15/767,902, Notice of Allowance mailed May 24, 2019", 5 pgs.
"U.S. Appl. No. 15/767,902, Preliminary Amendment filed Apr. 12, 2018", 10 pgs.
"U.S. Appl. No. 15/767,902, Response filed Apr. 19, 2019 to Non Final Office Action mailed Jan. 28, 2019", 11 pgs.
"U.S. Appl. No. 15/835,058, Non Final Office Action mailed Aug. 6, 2019", 11 pgs.
"U.S. Appl. No. 15/835,058, Notice of Allowance mailed Jan. 31, 2020", 7 pgs.
"U.S. Appl. No. 15/835,058, Preliminary Amendment filed Jan. 5, 2018", 8 pgs.
"U.S. Appl. No. 15/835,058, Response filed Nov. 6, 2019 to Non-Final Office Action mailed Aug. 6, 2019", 17 pgs.
"U.S. Appl. No. 16/063,822, Advisory Action mailed Feb. 8, 2021", 3 pgs.
"U.S. Appl. No. 16/063,822, Examiner Interview Summary mailed Sep. 24, 2020", 5 pgs.
"U.S. Appl. No. 16/063,822, Final Office Action mailed Nov. 27, 2020", 19 pgs.
"U.S. Appl. No. 16/063,822, Non Final Office Action mailed Jun. 24, 2020", 13 pgs.
"U.S. Appl. No. 16/063,822, Notice of Allowance mailed Mar. 29, 2021", 13 pgs.
"U.S. Appl. No. 16/063,822, Preliminary Amendment filed Jun. 19, 2018", 8 pgs.
"U.S. Appl. No. 16/063,822, Response filed Jan. 25, 2021 to Final Office Action mailed Nov. 27, 2020", 13 pgs.
"U.S. Appl. No. 16/063,822, Response filed Feb. 26, 2021 to Advisory Action mailed Feb. 8, 2021", 13 pgs.
"U.S. Appl. No. 16/063,822, Response filed Sep. 23, 2020 to Non Final Office Action mailed Jun. 24, 2020", 19 pgs.
"U.S. Appl. No. 16/491,112, 312 Amendment filed Oct. 14, 2021", 52 pgs.
"U.S. Appl. No. 16/491,112, Corrected Notice of Allowability mailed Dec. 22, 2021", 3 pgs.
"U.S. Appl. No. 16/491,112, Non Final Office Action mailed Apr. 1, 2021", 12 pgs.
"U.S. Appl. No. 16/491,112, Notice of Allowance mailed Sep. 28, 2021", 11 pgs.
"U.S. Appl. No. 16/491,112, Preliminary Amendment filed Sep. 11, 2019", 8 pgs.
"U.S. Appl. No. 16/491,112, PTO Response to Rule 312 Communication mailed Oct. 21, 2021", 2 pgs.
"U.S. Appl. No. 16/491,112, Response filed Jun. 22, 2021 to Non Final Office Action mailed Apr. 1, 2021", 13 pgs.
"U.S. Appl. No. 16/990,789, Appeal Brief filed Dec. 19, 2022", 33 pgs.
"U.S. Appl. No. 16/990,789, Final Office Action mailed Jul. 19, 2022", 23 pgs.
"U.S. Appl. No. 16/990,789, Non Final Office Action mailed Feb. 15, 2022", 25 pgs.
"U.S. Appl. No. 16/990,789, Non Final Office Action mailed May 10, 2023", 27 pgs.
"U.S. Appl. No. 16/990,789, Preliminary Amendment filed Sep. 16, 2020", 7 pgs.
"U.S. Appl. No. 16/990,789, Response filed Jun. 14, 2022 to Non Final Office Action mailed Feb. 15, 2022", 17 pgs.

(56) References Cited

OTHER PUBLICATIONS

"U.S. Appl. No. 16/990,789, Response filed Sep. 12, 2022 to Final Office Action mailed Jul. 19, 2022", 17 pgs.
"Australian Application Serial No. 2010320606, First Examination Report mailed Jul. 5, 2016", 3 pgs.
"Australian Application Serial No. 2010320606, Response filed Jan. 4, 2017 to First Examination Report mailed Jul. 5, 2016", 14 pgs.
"Australian Application Serial No. 2016343296, First Examination Report mailed Jul. 10, 2020", 4 pgs.
"Australian Application Serial No. 2016343296, Response filed Oct. 1, 2020 to First Examination Report mailed Jul. 10, 2020", 33 pgs.
"Australian Application Serial No. 2016343296, Subsequent Examiners Report mailed Oct. 2, 2020", 2 pgs.
"Australian Application Serial No. 2017202300, First Examination Report mailed Jun. 14, 2018", 4 pgs.
"Australian Application Serial No. 2017202300, Response filed Sep. 7, 2018 to First Examination Report mailed Jun. 14, 2018", 6 pgs.
"Chinese Application Serial No. 201080052336.2 Response filed Nov. 6, 2014 to Final Office Action mailed Apr. 21, 2014", (w/ English Translation of Claims), 14 pgs.
"Chinese Application Serial No. 201080052336.2, Office Action mailed Feb. 9, 2015", (w/ English Translation), 9 pgs.
"Chinese Application Serial No. 201080052336.2, Office Action mailed Apr. 21, 2014", (w/ English Translation), 12 pgs.
"Chinese Application Serial No. 201080052336.2, Office Action mailed Oct. 13, 2015", with English translation of claims, 7 pgs.
"Chinese Application Serial No. 201080052336.2, Response filed Feb. 29, 2016 to Office Action mailed Oct. 13, 2015", with English translation of claims, 8 pgs.
"Chinese Application Serial No. 201080052336.2, Response filed Jun. 24, 2015 to Office Action mailed Feb. 9, 2015", (w/ English Translation of Claims), 12 pgs.
"Chinese Application Serial No. 201610605209.X, Office Action mailed Jan. 11, 2018", W/ English Translation, 12 pgs.
"Chinese Application Serial No. 201610605209.X, Office Action mailed Sep. 30, 2018", w/ English translation, 12 pgs.
"Chinese Application Serial No. 201610605209.X, Response Filed Jan. 11, 2019 to Examiner Interview Jan. 8, 2019", with machine translation, 30 pgs.
"Chinese Application Serial No. 201610605209.X, Response filed May 25, 2018 to Office Action mailed Jan. 11, 2018", with machine translation, 18 pgs.
"Chinese Application Serial No. 201610605209.X, Response Filed Nov. 19, 2018 to Office Action mailed Sep. 30, 2018", with English translation of claims, 9 pgs.
"Chinese Application Serial No. 201680012390.1, Office Action mailed Jun. 17, 2019", w/ English translation, 25 pgs.
"Chinese Application Serial No. 201680012390.1, Response filed Oct. 18, 2019 to Office Action mailed Jun. 17, 2019", w/ English Claims, 29 pgs.
"Chinese Application Serial No. 20168003037.1, Voluntary Amendment filed", w/ English Claims, 10 pgs.
"Chinese Application Serial No. 201680030371.1, Office Action mailed May 30, 2019", w/ English Translation, 9 pgs.
"Chinese Application Serial No. 201680030371.1, Response filed Sep. 30, 2019 to Office Action mailed May 30, 2019", w/ English Claims, 16 pgs.
"Chinese Application Serial No. 201680061659.5, Office Action mailed Apr. 25, 2019", w/ English translation, 18 pgs.
"Chinese Application Serial No. 201680061659.5, Office Action mailed Nov. 25, 2019", with machine translation, 6 pgs.
"Chinese Application Serial No. 201680061659.5, Response filed Jan. 16, 2020 to Office Action mailed Nov. 25, 2019", w/ English Claims, 17 pgs.
"Chinese Application Serial No. 201680061659.5, Response filed Aug. 27, 2019 to Office Action mailed Apr. 25, 2019", w/ English Claims, 22 pgs.
"Chinese Application Serial No. 201680061659.5, Voluntary Amendment Filed Feb. 1, 2019", w/English Claims, 22 pgs.
"Chinese Application Serial No. 202210825582.1, Notification to Make Rectification mailed Sep. 9, 2022", with machine translation, 2 pgs.
"Eurasian Application Serial No. 201791637, Office Action mailed Feb. 27, 2019", W/English Translation, 6 pgs.
"Eurasian Application Serial No. 201791637, Office Action mailed Oct. 8, 2019", w/ English Translation, 4 pgs.
"Eurasian Application Serial No. 201791637, Response filed Jan. 16, 2020 to Office Action mailed Oct. 8, 2019", w/ English Claims, 16 pgs.
"Eurasian Application Serial No. 201791637, Response filed Jun. 27, 2019 to Office Action mailed Feb. 27, 2019", w/ English Claims, 15 pgs.
"Eurasian Application Serial No. 201891020, Office Action mailed Oct. 21, 2019", w/ English Translation, 4 pgs.
"Eurasian Application Serial No. 201891020, Response filed Jan. 9, 2020 to Office Action mailed Oct. 21, 2019", w/ English Claims, 17 pgs.
"Eurasian Application Serial No. 201891483, Office Action mailed Sep. 27, 2019", with English translation of claims, 6 pgs.
"European Application Serial No. 10831224.0, Extended European Search Report mailed Feb. 6, 2018", 6 pgs.
"European Application Serial No. 10831224.0, Further Response filed Sep. 7, 2018 to Extended European Search Report mailed Feb. 6, 2018", 26 pgs.
"European Application Serial No. 10831224.0, Further Response filed Oct. 5, 2018 to Extended European Search Report mailed Feb. 6, 2018", 24 pgs.
"European Application Serial No. 10831224.0, Response filed Sep. 5, 2018 to Extended European Search Report mailed Feb. 6, 2018", 49 pgs.
"European Application Serial No. 16739836.1, Extended European Search Report mailed Sep. 6, 2018", 5 pgs.
"European Application Serial No. 16739836.1, Response Filed Jan. 11, 2019 to Extended European Search Report mailed Sep. 6, 2018", 23 pgs.
"European Application Serial No. 16739836.1, Response filed Feb. 23, 2018", 8 pgs.
"European Application Serial No. 16767517.2, Communication Pursuant to Article 94(3) EPC mailed Nov. 14, 2019", 4 pgs.
"European Application Serial No. 16767517.2, Extended European Search Report mailed Oct. 8, 2018", 6 pgs.
"European Application Serial No. 16767517.2, Response Filed Apr. 29, 2019 to Extended European Search Report mailed Oct. 8, 2018", 56 pgs.
"European Application Serial No. 16767517.2, Response filed May 7, 2018 to Communication pursuant to Rules 161(2) and 162 EPC, mailed Nov. 7, 2017", 13 pgs.
"European Application Serial No. 16876998.2, Extended European Search Report mailed Jun. 12, 2019", 8 pgs.
"European Application Serial No. 16876998.2, Response filed Jan. 8, 2020 to Extended European Search Report mailed Jun. 12, 2019", 19 pgs.
"European Application Serial No. 16876998.2, Response filed Aug. 3, 2018", 13 pgs.
"European Application Serial No. 18763798.8, Extended European Search Report mailed Dec. 5, 2019", 8 pgs.
"European Application Serial No. 22183925.1, Extended European Search Report mailed Mar. 9, 2023", 11 pgs.
"European Application Serial No. 22183925.1, Notification to Pay Further Search Fee mailed Dec. 5, 2022", 12 pgs.
"European Application Serial No. 22183925.1, Response filed Sep. 8, 2023 to Extended European Search Report mailed Mar. 9, 2023", 30 pgs.
"European Application Serial No. 23205927.9, Notification to Pay Further Search Fee (Rule 64) mailed Apr. 15, 2024", 10 pgs.
"European Application Serial No. 16856481.3, Extended European Search Report mailed Oct. 10, 2018", 5 pgs.
"European Application Serial No. 16856481.3, Response filed Feb. 28, 2019 to Extended European Search Report mailed Oct. 10, 2018", 20 pgs.

(56) References Cited

OTHER PUBLICATIONS

"Indian Applicaiton Serial No. 201817018393, First Examination Report mailed Nov. 4, 2020", w/ English Translation, 6 pgs.
"Indian Applicaiton Serial No. 201817018393, Response filed Apr. 22, 2021 to First Examination Report mailed Nov. 4, 2020", w/ English claims, 63 pgs.
"Indian Application Serial No. 5265/DELNP/2012, Amendment filed Jul. 4, 2012", 8 pgs.
"Indian Application Serial No. 5265/DELNP/2012, First Examination Report mailed Sep. 20, 2018", W/ English Translation, 7 pgs.
"International Application No. PCT/IB2010/003161, International Preliminary Report on Patentability mailed May 31, 2012", (May 31, 2012), 8 pgs.
"International Application Ser. No. PCT/AU2006/000623, International Preliminary Report for Patentability dated Nov. 13, 2007", 6 pgs.
"International Application Ser. No. PCT/AU2006/000623, International Search Report mailed Sep. 4, 2006", 4 pgs.
"International Application Ser. No. PCT/AU2006/000623, Written Opinion mailed Sep. 4, 2006", 5 pgs.
"International Application Serial No. PCT/AU2007/000772, International Search Report mailed Jul. 23, 2007", 3 pgs.
"International Application Serial No. PCT/AU2007/000772, Written Opinion mailed Jul. 23, 2007", 6 pgs.
"International Application Serial No. PCT/AU2004/000951, International Preliminary Report on Patentability mailed Nov. 4, 2005", 9 pgs.
"International Application Serial No. PCT/AU2004/000951, International Search Report mailed Sep. 13, 2004", 3 pgs.
"International Application Serial No. PCT/AU2004/000951, Written Opinion mailed Sep. 13, 2004", 4 pgs.
"International Application Serial No. PCT/AU2007/000772, International Preliminary Report on Patentability mailed Apr. 21, 2008", 6 pgs.
"International Application Serial No. PCT/AU2016/000108, International Preliminary Report on Patentability mailed Oct. 5, 2017", 8 pgs.
"International Application Serial No. PCT/AU2016/000108, International Search Report mailed Jun. 7, 2016", 7 pgs.
"International Application Serial No. PCT/AU2016/000108, Written Opinion mailed Jun. 7, 2016", 6 pgs.
"International Application Serial No. PCT/AU2016/050967, International Preliminary Report on Patentability mailed May 3, 2018", 6 pgs.
"International Application Serial No. PCT/AU2016/050967, International Search Report mailed Dec. 21, 2016", 9 pgs.
"International Application Serial No. PCT/AU2016/050967, Written Opinion mailed Dec. 21, 2016", 4 pgs.
"International Application Serial No. PCT/AU2016/051256, International Preliminary Report on Patentability mailed Jul. 5, 2018", 8 pgs.
"International Application Serial No. PCT/AU2016/051256, International Search Report mailed Apr. 24, 2017", 6 pgs.
"International Application Serial No. PCT/AU2016/051256, Written Opinion mailed Apr. 24, 2017", 6 pgs.
"International Application Serial No. PCT/AU2017/050744, International Preliminary Report on Patentability mailed Jan. 31, 2019", 9 pgs.
"International Application Serial No. PCT/AU2017/050744, International Search Report mailed Sep. 29, 2017", 4 pgs.
"International Application Serial No. PCT/AU2017/050744, Written Opinion mailed Sep. 29, 2017", 7 pgs.
"International Application Serial No. PCT/AU2018/050180, International Preliminary Report on Patentability mailed Sep. 19, 2019", 8 pgs.
"International Application Serial No. PCT/AU2018/050180, International Search Report mailed May 15, 2018", 5 pgs.
"International Application Serial No. PCT/AU2018/050180, Written Opinion mailed May 15, 2018", 6 pgs.
"International Application Serial No. PCT/AU2020/050389, International Preliminary Report on Patentability mailed Nov. 4, 2021", 8 pgs.
"International Application Serial No. PCT/AU2020/050389, International Search Report mailed Jun. 22, 2020", 4 pgs.
"International Application Serial No. PCT/AU2020/050389, Written Opinion mailed Jun. 22, 2020", 6 pgs.
"International Application Serial No. PCT/AU2021/051053, International Search Report mailed Oct. 28, 2021", 5 pgs.
"International Application Serial No. PCT/AU2021/051053, Written Opinion mailed Oct. 28, 2021", 7 pgs.
"International Application Serial No. PCT/IB2010/003161, International Search Report and Written Opinion mailed May 11, 2011", (May 11, 2011), 11 pgs.
"International Application Serial No. PCT/IB2010/003161, Written Opinion mailed May 11, 2011", (May 11, 2011), 13 pgs.
"International Application Serial No. PCT/IB2016/000090, International Preliminary Report on Patentability mailed Aug. 3, 2017", 6 pgs.
"International Application Serial No. PCT/IB2016/000090, International Search Report mailed May 2, 2016", 4 pgs.
"International Application Serial No. PCT/IB2016/000090, Written Opinion mailed May 2, 2016", 4 pgs.
"Japanese Application Serial No. 2012-539437, Voluntary Amendment filed Dec. 27, 2012", (w/ English Translation of Claims), 10 pgs.
"Low Head Hydro", VerdErg Renewable Energy Limited, [Online]. Retrieved from the Internet: <URL: https://www.verderg.com/>, (Accessed Jun. 23, 2023), 3 pgs.
"U.S. Appl. No. 17/860,842, Non Final Office Action mailed Sep. 25, 2024", 8 pgs.
"U.S. Appl. No. 17/860,842, Response filed Sep. 11, 2024 to Restriction Requirement mailed Jul. 11, 2024", 7 pgs.
"U.S. Appl. No. 17/860,842, Response filed Oct. 17, 2024 to Non Final Office Action mailed Sep. 25, 2024", 13 pgs.
"U.S. Appl. No. 17/860,842, Restriction Requirement mailed Jul. 11, 2024", 8 pgs.
"European Application Serial No. 22183925.1, Decision to Grant a European Patent Pursuant to Article 97(1) EPC mailed May 24, 2024", 3 pgs.
"European Application Serial No. 23205927.9, Extended European Search Report mailed Sep. 18, 2024", 13 pgs.
"European Application Serial No. 24176393.7, Office Action mailed Sep. 30, 2024", 15 pgs.

\* cited by examiner

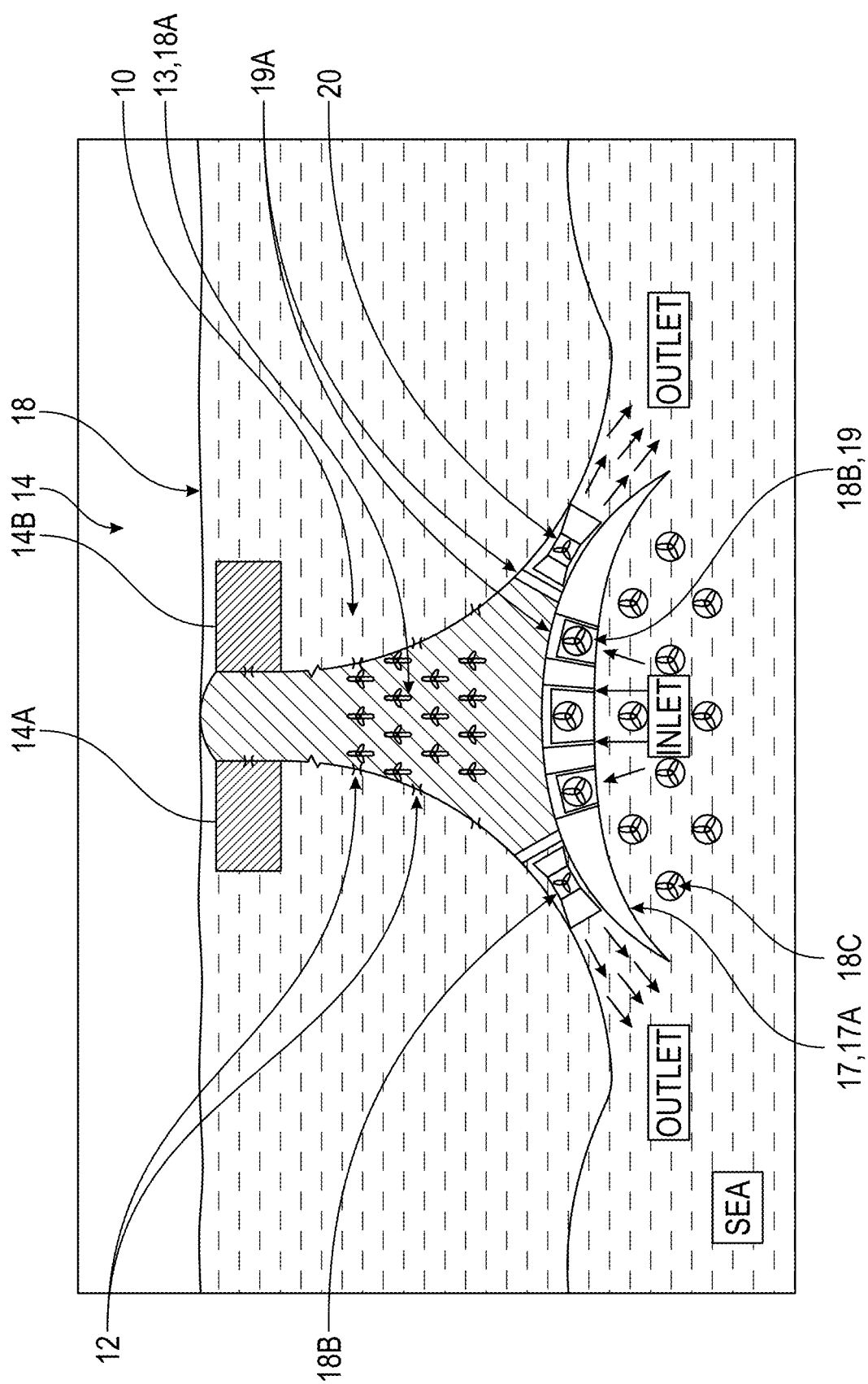

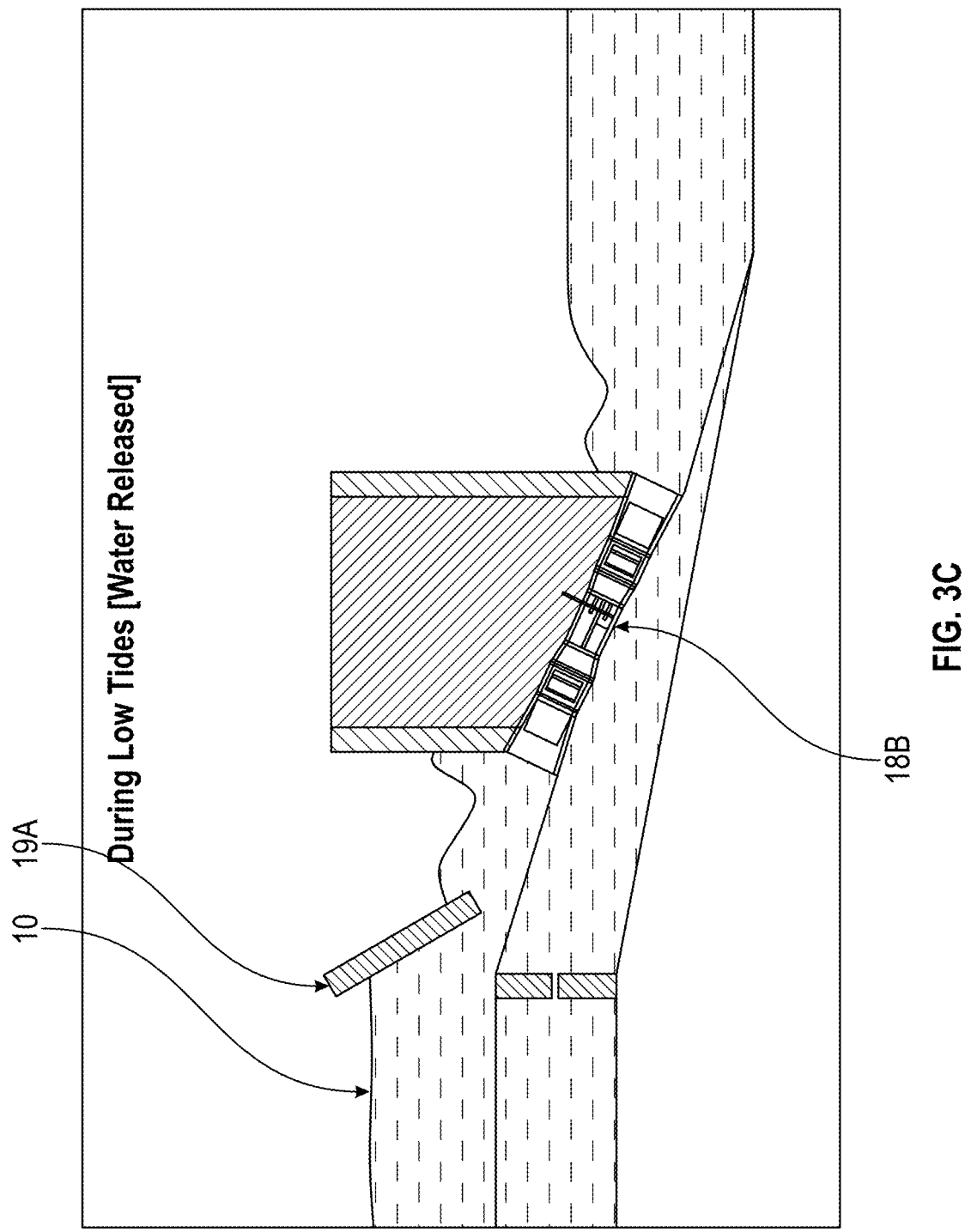

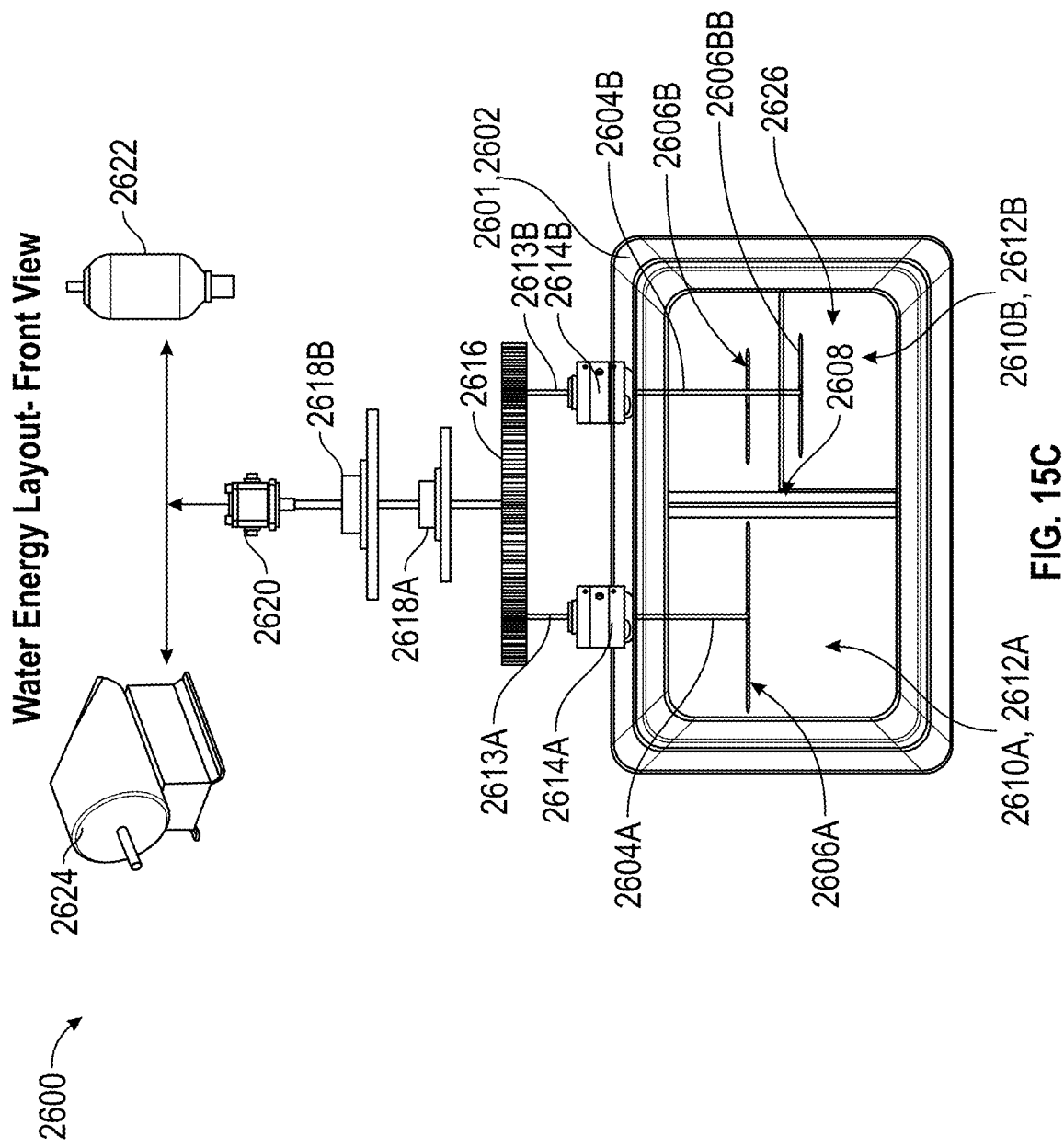

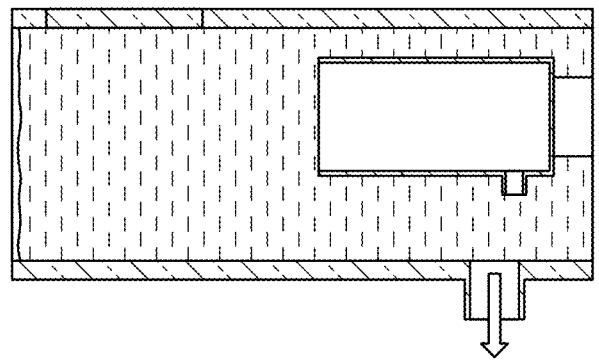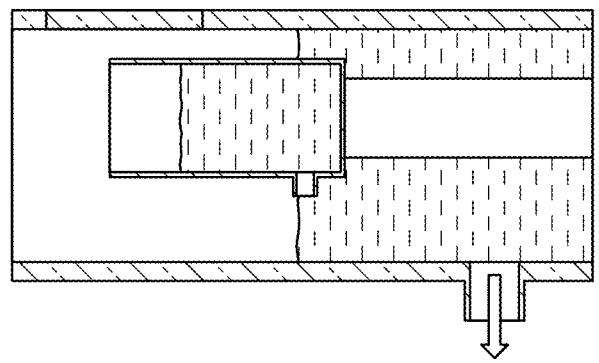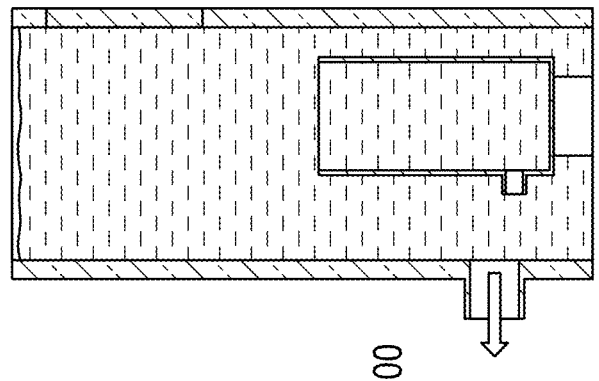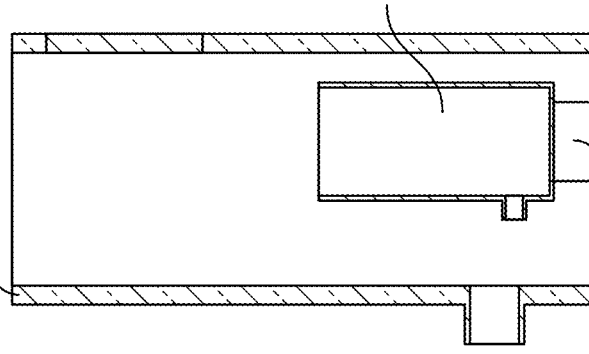
FIG. 22

POWER AMPLIFICATION, STORAGE AND REGENERATION SYSTEM AND METHOD USING TIDES, WAVES AND/OR WIND

PRIORITY CLAIM

The present application claims priority to U.S. Provisional Patent Application Nos. 63/423,193, 63/439,754 and 63/507,026 entitled "POWER AMPLIFICATION, STORAGE AND REGENERATION SYSTEM AND METHOD USING TIDES, WAVES AND/OR WIND", filed Nov. 7, 2022, Jan. 18, 2023 and Jun. 8, 2023; and U.S. Provisional Patent Application Nos. 63/432,245, 63/439,763 and 63/461,084, entitled IN-AND-OUT WAVE CAPTURE APPARATUS SYSTEM AND PROCESS, filed Dec. 13, 2022, Jan. 18, 2023, and Apr. 21, 2023, the entire specification of each of which is incorporated herein by reference.

CROSS REFERENCE TO RELATED APPLICATIONS

The present application is related to international application no. PCT/AU2016/050967, publication no. WO/2017/066826, United States publication no. US/2018/0298881, entitled "Turbine Power Storage and Regeneration" filed Oct. 14, 2016; international application no. PCT/AU2007/000772, publication no. WO/2007/140514, entitled "Vane Pump for Pumping Hydraulic Fluid," filed Jun. 1, 2007; international application no. PCT/AU2006/000623, publication no. WO/2006/119574, entitled "Improved Vane Pump," filed May 12, 2006; international application no. PCT/AU2004/00951, publication no. WO/2005/005782, entitled "A Hydraulic Machine," filed Jul. 15, 2004; U.S. patent application Ser. No. 13/510,643, publication no. U.S. 2013/0067899, entitled "Hydraulically Controlled Rotator Couple," filed Dec. 5, 2012; international application no. PCT/AU2020/050389, publication no. WO 2020/215118, entitled TIDAL POWER HARNESSING, STORAGE AND REGENERATION SYSTEM AND METHOD filed Apr. 22, 2020; and U.S. application Ser. No. 17/860,842, entitled RIVER VENTURI POWER AMPLIFICATION, STORAGE AND REGENERATION SYSTEM AND METHOD, filed on Jul. 8, 2022, the entire specification of each of which is incorporated herein by reference in entirety.

TECHNICAL FIELD

This document pertains generally, but not by way of limitation, to systems and techniques for power generation and power regeneration by harnessing tidal, wave and/or wind energy in various combinations.

BACKGROUND

Current systems for power generation can include a turbines to harness energy from running water and/or wind energy for conversion to electrical power. River current has been used for centuries to perform various tasks. Turbines such as those used with dams are known. However, off flow from dams varies based upon the height of the water behind the dam. Off flow from the dam may be shut down for substantial periods of time if the height of the water behind the dam is low. Existing wind turbines experience periods where wind conditions necessitate shutdown. Likewise, tidal turbines and other systems that harness waves are known but suffer from periodic lulls where energy extraction dips or is not possible.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a highly schematic view of a man modified tidal estuary along with a power generation system including one or more hydrokinetic turbines that can derive power from flow of water out of the estuary.

FIG. 3C is a cross-sectional view of the entrance area during emptying of the water from the estuary and through a water turbine for power generation.

FIG. 15C is a plan view of a front end of the water flow capturing apparatus and also showing other components of the system of FIG. 15A.

FIG. 22 is a schematic illustration of process of filling and emptying a reservoir with a drum that can be selectively raised and lowered within the reservoir to alter a height of the water within the reservoir.

DETAILED DESCRIPTION

Figure 1A:
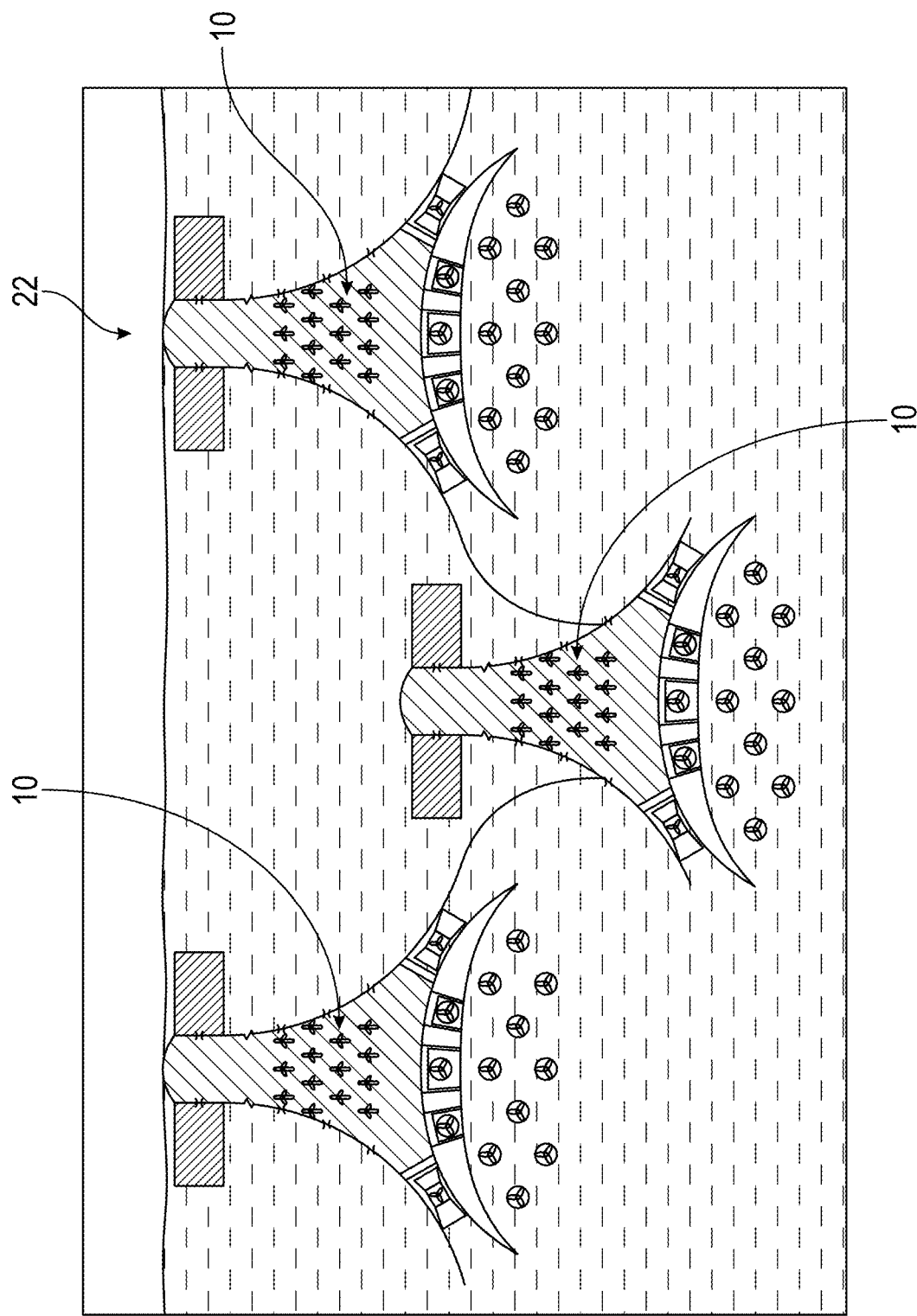
FIG. 1A is a highly schematic view of a system of several tidal estuaries in a staggered arrangement.

The present application relates to systems and techniques for turbine power storage and regeneration using tidal, wave and/or wind energy in various combinations. As used herein the term "turbine" unless otherwise described can connote either a wind turbine or a hydrokinetic turbine. The term "estuary" should not be limited to a river mouth or other naturally occurring tidal location. The term "estuary" can be an entirely or partially man-made location on a tidal shelf that receives tidal energy. The following detailed description includes examples intended to be illustrative of the subject matter disclosed herein and are in no way intended to be limiting. Features and steps described in relation to one or more examples may be combined with the subject matter of other examples and methods provided in this disclosure. The following examples are sufficient to enable one of skill in the art to practice the systems and techniques described in the following detailed description.

The present inventor has recognized, among other things, that a problem to be solved can include inconsistency of reliance on green energy power such as hydrokinetic power, wind power or other renewable energy source alone (with wind-lack of such wind or high gusts can limit generation opportunities). The present inventor has further recognized, among other things, tidal energy especially in estuary can be harnessed in various ways to be predictable. The inventor proposes various ways that allow for combinations of tidal, wind and/or wave energy to be harvested, stored and reused in various methodology. This allows for reliable largely untapped energy sources that can be used to supplement one another (wind, wave, solar, etc.).

The present inventor also recognizes that tidal estuaries and tidal shelfs provide potential untapped power generating sites. Large tides with largely untapped kinetic energy occur in these areas. The present inventor further recognizes estuaries, and in particular, the islands, flow courses and other features thereof, could be modified (and/or indeed dams can be created) to facilitate turbine energy capture for power generation. For example, man-made dams and/or islands can create flow channels can be fabricated by modifying the estuary with heavy machinery, concreate, etc. Various other concepts include modifying the shelf leading to the estuary, creating obstructions such as islands, gates, dams, etc., forming tunnels, etc. These tunnels could have various locations along the bank and could extend through obstructions such as islands if desired. Turbines (both hydrokinetic and wind) could be placed in various locations along (and within) the tunnels, banks, flow channels. Advantageously, the tunnels or flow channels can be constructed in the shape of venturi for highly efficient concentration of tidal flow (particularly outflow) to higher velocity if needed. The turbines, and indeed hydrokinetic turbines and other devices disclosed herein can be combined with one or more power generation systems as will be discussed in further detail subsequently in the remainder of this application. It should be noted that although power generation and/or regeneration systems are discussed as utilizing in combination with tidal, wave and/or wind turbines examples contemplate use of only one or two forms of this energy. Thus, in some cases supplementing tidal power generation with wind power generation (and/or wave power generation) is not necessary. Similarly, if wind conditions are optimal, supplementing wind power generation with tidal power generation (and/or wave power generation) is not necessary. The hydrokinetic power and other regeneration systems discussed in herein exemplify systems, apparatuses and principles that could be used with tidal power generation and/or regeneration systems such as river power generation, for example. Thus, rather than tidal flow turning the blades of one or more turbines, water such as river flow would turn the blades of the one or more turbines. Other aspects and components of the power and other regeneration systems discussed herein could be maintained and utilized with the power generation and/or regeneration systems discussed herein.

In some cases, power generated by the turbines (whether water, wind, wave or a combination of both) can be stored as energy in accumulators and/or batteries. In yet further embodiments, energy can be used for hydrogen production, supply to the power grid and other purposes. Modifications to the estuary and/or sea floor (shelf) to create flow channels (variously by the terraforming techniques discussed herein and optionally including dams, reservoirs, gates, etc.) of can concentrate water flow as discussed herein. Such modifications to create flow channels can include creation of banks, islands, dams, etc. thereby creating convoluted channel shapes (e.g., a restriction, a more open section followed by a second restriction). Further concepts include the use of position adjustable flow control valves or other features such as gates, reservoirs, etc. that allow flow of water to be precisely controlled to bypass the turbines such that water flow passing the turbine has a desired velocity. In instances of high tidal volume, flow control valve(s), gates, off-flows, over-flows can be opened to reduce flow volume and slow the flow velocity within the flow channel upon reaching the turbine.

The present inventor also recognizes hydrokinetic turbines that utilize or can be placed in a man-made venturi apparatus. Such venturi apparatus can be constructed of metal, plastic, concrete or other suitable material such as pipe, etc. This venturi apparatus allows tidal flow (particularly tidal outflow) to enter the apparatus, pass therethrough into a venturi section and exit the apparatus. The flow stream can turn one or more turbines within the venturi section.

With regard to wind gusts or rapid water flow velocity that occur causing overspeed conditions, it is understood that these can fluctuate in velocity and volume. Similarly, tidal current (referred to a flow herein) can fluctuate in velocity and volume. The inventor recognizes limiting/metering this energy. Furthermore, various storage methods and regeneration uses of are contemplated. In general, the techniques discussed herein attempt to minimize instances where the power captured by a turbine rotor where rotor speeds exceed a rated speed (max power rating) of an electrical generator within the turbine, such as for generating electrical power. The present subject matter can help provide a solution to this problem, for instance, by including a power split transmission coupling, flywheel(s) and other devices within the turbine system. The systems and methods disclosed herein can store energy for use during a period of turbine rotor velocity is low or for capture and storage when energy is to fast (exceeding the rated speed of the generator). During periods of rotor velocity below the rated speed, the system can operate in a regeneration mode. For instance, the turbine can include one or more motors or flywheels operatively coupled to the generator. Previously stored energy can be applied to the motor or one or more flywheels for increasing power generation during periods of below rated speed operation. A power split transmission coupling can be operatively coupled to the turbine rotor by an input shaft and to a generator by an output shaft. The power split transmission coupling can be configured to transmit the rotor torque to the output shaft at an adjustable torque ratio of the input shaft. The power split transmission coupling can divert hydraulic fluid in response to the output shaft exceeding a threshold power, torque, or angular velocity. By diverting hydraulic fluid, the power transmitted to the generator, and accordingly the power produced by the generator can be adjusted. Electrical power generated by the generator during non-peak times or in other circumstances can also be stored in batteries for later use.

A hydraulic fluid storage vessel such as an accumulator can be configured to store the diverted hydraulic fluid under pressure. The turbine system can include at least one hydraulic motor. The hydraulic motor can include a motor output configured to receive the hydraulic fluid stored under pressure and generate a torque on the motor output in response. The generator can be operatively coupled to the output shaft and the motor output to produces electrical power in response to at least one of: torque applied by the output shaft, torque applied by the motor output, or both.

In an example, the power split transmission coupling includes an input shaft coupled to the turbine rotor. The input shaft can rotate in response to the rotor torque. The output shaft can rotate at an output speed. The power split coupling can include a cam ring and a hub disposed between the input shaft and the output shaft. A hydraulic fluid can be disposed between the cam ring and the hub. The hub can include a plurality of circumferentially spaced slots configured to house a plurality of vanes therein. The vanes can be configured to be movable, such as between a retracted position, a fully extended position, or any partially extended position therebetween. In the retracted position, the input shaft is independently rotatable with respect to the output shaft. In the one or more extended positions, the plurality of vanes are configured to work the hydraulic fluid and transmit torque from the input shaft to the output shaft at an adjustable torque ratio. The power split transmission coupling includes an inlet port communicatively coupled to a hydraulic fluid source. The hydraulic fluid can be transported from the hydraulic fluid source to the power split transmission coupling. The power split transmission coupling can include an outlet port having a closed configuration and an at least partially open configuration. The hydraulic fluid can be released from the power split transmission coupling through the outlet port in response to a power applied to the output shaft exceeding a threshold power. The released hydraulic fluid can exit the power split transmission coupling and can be stored under pressure.

Tidal flow and/or wind conditions can be temporal and/or inconsistent (in the case of wind), in an example, the power split transmission coupling and/or flywheel(s) can transmit a constant power to the generator during low tidal and/or wind conditions by adjusting the volume of hydraulic fluid diverted from the power slit transmission coupling. For instance, the power split transmission coupling can reduce tidal and/or wind jitter effects on the turbine system. The power split transmission coupling can operate at high volumetric efficiency thereby increasing the efficiency of power generation. In an example, mechanical braking or turbine blade adjustments may need to be applied in order to prevent the generator from receiving more than the maximum rated power. By diverting hydraulic fluid from the power split transmission coupling, the application of mechanical braking or the feathering of the turbine blades is unnecessary to prevent the generator from exceeding the maximum rated power.

In an example, the system can be operated in a power generation cycle and in a regeneration cycle. In the power generation cycle, the power split transmission coupling can be adjusted (e.g., by a computer controller) to transfer substantially all torque from the turbine rotor to the generator by working the hydraulic fluid. In response, the generator can convert mechanical power to electrical power. The power split transmission coupling can divert the hydraulic fluid at high pressure from the power split transmission coupling in response to the electrical power produced by the generator exceeding the threshold power. Diverting the hydraulic fluid can maintain the electrical power produced by the generator at or below the threshold. The hydraulic fluid diverted from the power split transmission coupling under high pressure can be stored in a storage vessel. In a regeneration cycle, the hydraulic fluid stored at high pressure can be introduced to a hydraulic motor in response to the generator producing below threshold power. The hydraulic motor can be configured to transmit mechanical power to the generator for electrical power generation. As a result, the generator can operate at or closer to maximum power output for a higher percentage of the life of the generator. For instance, tidal flow and/or wind conditions may not facilitate full power operation of the turbine during all periods of operation. The turbine can operate closer to the maximum operational power or maximum efficiency as a result of the regeneration mode.

It should be understood by one of ordinary skill in the art that the power applied to the generator is a function of the rotational speed of the generator rotor as well as the torque applied to the generator rotor and the electrical power load of the generator. Accordingly, one of ordinary skill would appreciate that examples discussed herein including electrical power or mechanical power terms can include examples of corresponding rotational speed, power, or torque. For instance, a system configured to operate below a threshold power can also include an equivalent example of the same system configured to operate below a threshold rotor speed corresponding to the threshold power value for a given system.

The present inventor contemplates: forming an estuary with various components to capture the water in the manner of a storage dam and release at, near or after the bottom of the tide. Additionally, it is contemplated that estuaries (or reservoirs attached to an estuary can be in flow communication) as tides sit at their peak for a period, so once the maximum height is reached in first estuary flow can be further directed to a second estuary (or reservoir connected to the estuary). Water flow can be metered to fill or empty the estuary. Thus, flow from the estuary can drive a water turbine and hydraulic pump to accumulator storage as an energy source. Similarly, flow filling the estuary could be used to drive another water turbine. Optionally, the accumulator storage lifts a drum of water when filled by the incoming tide. The drum of water can be raised out of the reservoir (or estuary) and the reservoir or estuary can be filled to capacity equal to the tidal power on the day. Water can be drained out of the drum to increase the water height and power. The empty drum can be lowered back into the reservoir (or estuary) for a further height and power increase when discharged at the bottom of the tide to generate power. The incoming tides can be directed through gated water turbines. Subject to tidal power, the gates are opened and the tide rushes in to the estuary. Then close the gates to maintain a higher water level within the estuary as the tide recedes. Gates can then open in sequence or as desired. The system contemplates the estuary can have one, two or more outlets for flow from the estuary. A smaller number of outlets is desirable. Tidal storage from the estuary can be released through these outlets (termed flow channel herein). These outlets can be on an edge or side of the estuary such as to a side of an obstruction that forms an ocean facing side of the estuary. One or more venturi systems can be used at the outlets to increase flow rate. The systems contemplated can also use power generated by wave action. This can include terraforming the sea floor, shaping the sea facing obstruction and using other techniques to shorten and raise the power of the waves striking the obstruction. Further embodiments contemplate the use of spinning water wheel that drives a water turbine driving a hydraulic pump for energy capture as the wave power rushes through a flow channel through the obstruction when a gate is open the inflow tidal turbine. When the gate is closed, the wave power still drives the water turbine driving a hydraulic pump for power generation to hit against the wall of the obstruction and the closed gate. It is also contemplated that a water wheel type device can be placed near outlets from the estuary such that outrushing water drives the water wheel to again power the water turbine driving a hydraulic pump for energy capture. Additionally, flow inlets through the obstruction could also be used for outflow of water in some circumstances. Positioning a water wheel device at or near the flow channels through the obstruction could then be used again during outflow and not just inflow as outrushing water reverses the water wheel to again power the reversing water turbine driving a hydraulic pump for energy capture.

Additionally, the present application relates to systems and techniques for wave power storage and regeneration using wave energy in various combinations. The terms "channel", "foreshore" or "cliff" should not be limited to a naturally occurring oceanographic location. These terms channel", "foreshore" or "cliff" can be an entirely or partially man-made location on a tidal shelf that receives wave energy. The following detailed description includes examples intended to be illustrative of the subject matter disclosed herein and are in no way intended to be limiting. Features and steps described in relation to one or more examples may be combined with the subject matter of other examples and methods provided in this disclosure. The following examples are sufficient to enable one of skill in the art to practice the systems and techniques described in the following detailed description.

The present inventor contemplates: forming a channel with various components (which as walls and/or a floor) to elevate wave heights. Additionally, it is contemplated that a turbine such as water wheel designs (or other design can be placed adjacent a wall or cliff to capture wave action both toward and away (rebound) from the wall or cliff. This can include terraforming the sea floor, shaping the sea facing obstruction such as wall or cliff and using other techniques to shorten and raise the height (and hence the power) of the waves striking the obstruction. The spinning water wheel drives a hydraulic pump and/or combinations of the system components discussed previously for energy capture as the wave power rushes past in one or both directions. It is also contemplated that a water wheel type device can be placed near outlets from the estuary such that outrushing water drives the water wheel to again power the system for energy capture.

Tidal flow, wave action and/or wind conditions can be temporal and/or inconsistent (in the case of wind), in an example, the power split transmission coupling and/or flywheel(s) can transmit a constant power to the generator during low tidal and/or wind conditions by adjusting the volume of hydraulic fluid diverted from the power slit transmission coupling. For instance, the power split transmission coupling can reduce tidal and/or wind jitter effects on the turbine system. The power split transmission coupling can operate at high volumetric efficiency thereby increasing the efficiency of power generation. In an example, mechanical braking, raising or lowering the water wheel, making other system or other blade adjustments may be applied in order to prevent the generator from receiving more than the maximum rated power. Such adjustments can also be made to increase the torque supplied to the generator. By diverting hydraulic fluid from the power split transmission coupling, the application of mechanical braking or the feathering of the turbine blades may be unnecessary to prevent the generator from exceeding the maximum rated power.

FIG. 1 shows a man-modified or man-created estuary 10 having walls 12 that form a bank with an exemplary shape that funnels and magnifies incoming tidal flow along a flow channel 13 to dams/reservoir 15A and/or dam/reservoir 15B. Estuary 10 can be located partially-onshore, off-shore such as on a tidal shelf, adjacent the shoreline (formed by mainland, island, reef or the like) or another suitable location. Tidal shelves have been shown to raise tides to large heights around the world and would be suitable locations for the estuary 10. The shape of the flow channel 13 and wall 12 shown is exemplary and is contemplated to be modified (other examples are provided). However, the walls 12 can be convex or otherwise gradually curved narrowing toward one another to restrict the flow channel 13 as shown according to one example. The shape can differ from the shape illustrated. Portions of the wall 12 may or may not be modified by human activity according to some examples. Indeed, the entire wall 12 can be created by human activity in some examples. The wall 12 can thus be formed by concrete, steel, wood, stone, brick, rock, piled sand, etc. In some cases, portions or all of the wall 12 may not be modified by human activity. The flow channel 12 can thus be formed of natural materials (e.g., sand, rock, etc.) that formed from the ocean floor or other material that is manmade or man-modified for example. In FIG. 1, the wall 12 has the reduced cross-sectional regions leading to the reservoirs 15A and 15B in order to better magnify tidal in flow. The modified estuary 10 includes a power generation system 14 that communicates with power generation systems such as a power grid, battery stations, accumulators, hydrogen production facilities, etc. The power generation system 14 can include one or more turbines 18 and optionally can include one or more wind turbines 18A, water turbines 18B (also called hydrokinetic turbines herein), one or more power split couplings, one or more wave power generators 18C (also called water wheels herein), etc.

FIG. 1 depicts a wall, dam, island, gate, breakwater or other obstacle (called simply obstruction 17 herein for brevity) placed across and forming an entrance to the estuary 10. The obstruction 17 can be man made or man modified to have a particular desired shape as further discussed herein. The obstruction 17 can be created by human activity in some examples. The obstruction 17 can thus be formed by concrete, steel, wood, stone, brick, rock, piled sand, etc. In some cases, portions or all of the obstruction 17 may not be modified by human activity. The obstruction 17 can be configured to form an outer wall for the estuary facing the ocean. Thus, the obstruction 17 can block a mouth of the estuary 10 and can divide the estuary 10 from the ocean in some embodiments. As the obstruction 17 is an outermost wall, the obstruction 17 can be subject to ocean wave action, storm, tide and other forces in a manner that portions of the walls 12 may not be (e.g., the obstruction 17 acts as a breakwater prior to water of the ocean reaching at least some portions of the walls 12). Together the walls 12 and the obstruction 17 form at least a portion (and indeed most) of an enclosure that is the estuary 10. In some cases, only a flow channel 20 (see subsequent description) can be provided between the wall 12 and the obstruction 17 as an outlet from the estuary 10.

As shown in FIG. 1, the shape for the obstruction 17 combined with the shape of the wall 12 can form one or more outlet(s) for water flow to sides of the obstruction 17. The obstruction 17 can have a sliver moon shape having a convex side facing with the estuary 10 and a concave side also facing toward the sea. However, other shapes for the obstruction 17 are contemplated. The outer side (called an outer wall 17A herein) of the obstruction 17 can have elevated and vertical or almost vertical face. This outer wall 17A can be configured to create backwash flow (outflow or undercurrent flow), rebounding flow and rebounding wave action that can interact with and power the wave power generators 18C and/or water turbines 18B placed adjacent the wall 17A. One or more tunnels 19 comprising examples of one or more flow channels or flow passages can be formed through, under or past the obstruction 17. The one or more tunnels 19 can be configured as flow channels to receive tidal inflow, for example. These tunnel(s) 19 can include the water turbines 18B therein. Such water turbines 18B can have venturi as discussed herein. Furthermore, the tunnel(s)

can each (or only some) can include gates 19A able to cover the respective tunnel 19 to restrict or stop flow thereto or therethrough.

FIG. 1 shows the estuary 10 filled with water after a tidal inflow and the tidal inflow blocked by the gate(s) 19A on the obstruction 17. The trapped tidal water has begun outflow as indicated with arrows along the flow channels 20 between the obstruction 17 and the wall 12 and passing the gate(s) 19A (which have been opened) and around/past the water turbines 18B placed in these outflow areas (i.e., in or adjacent the channels 20). The channels 20 can be positioned to a lateral side of the obstruction 17 are designed to restrict tidal outflow from the estuary 10 and thereby increase the velocity of the outflow passing the water turbines 18B.

As shown in FIG. 1, the modified wall 12 and obstruction 17 can position water turbines 18B in areas with an inlet flow or outlet flow of relatively higher velocity. The channel 20 can be shaped to funnel and magnify tidal estuary flow to the water turbine(s) 18B. Inlets formed by the tunnels 19 can also act as bypass channels for outflow of tide from the estuary 10 as necessary. Gates 19A can act as flow control devices and can be position adjustable to be selectively opened, partially opened and fully closed to control the volume (and hence speed) of flow into and out of the estuary 10 (and hence to the water turbines 18B). Partially opened gates 19A can meter flow in a controlled manner to the water turbine(s) 18B. Opening of gates 19A can be sequenced as desired. The locations, size and shape of the tunnels 19 and the channel 20 shown is purely exemplary and other locations are contemplated. The tunnels 19 and channel 20 can be man-made (e.g., formed of metal, concrete or another material not native to the location such as to be part of a dam or other structure) or can be shaped by use of natural materials native to that location such as rock, sand, dredging of sea floor, etc.

It should be noted that parts of the flow channel 13 and/or channel 20 can be formed from and along the estuary 10 bottom using pipe, tunnel or other material(s) rather than being formed from the wall 12 or obstruction 17 in some cases. Thus various aspects of the flow channel 13 and/or channel 20 can be submerged (or uncovered after low tide and outflow but then submerged as estuary 10 fills). Similarly, the channel 20 and the tunnels 19 discussed can be formed as part of dam or other structure and need not be formed or partially by the obstruction 17 and the wall 12 in some embodiments.

According to the example of FIG. 1, the flow channel 13 and/or the channels 20 can be shaped with at least one section configured as venturi. Alternatively or additionally, the water turbine 18B can be shaped to form a venturi. This shape for the channel 20 and/or the tunnels 19 can facilitate highly efficient tidal estuary flows that are steady and reliable plus the shape can delay tidal estuary flow so that it occurs less rapidly than would otherwise be the case (a time delay being over hours, minutes, etc.) in a natural setting or with a non-venturi tube shaped passage. The water turbine(s) 18B may be positioned within the channels 20 or closely adjacent thereto (within a few hundred meters of an entrance/exit). It is contemplated that the water turbines 18B can be positioned at any position and any number within the extent of the channels 20 as is practically feasible. However, if possible, it can be advantageous to place at least one of the one or more water turbines 18B at the most restricted point in the channel 20 where the tidal estuary flow would have a greatest velocity such as at, within or just downstream of the venturi. Further water turbines 18B can be placed in other locations within or adjacent the flow channel 20 such as at an exit, an entrance (within the estuary 10 within the flow channel 13) or in other locations along the channel 20.

The location of the wind turbines 18A within the estuary 10 is purely exemplary and other locations such as along the walls 12, outside the walls 12 or the like are also contemplated.

During tidal filling, the inlets (tunnels 19) are open (gates 19A opened) to receive inflow. The flow channel 13 is configured to funnel the inflowing tide to the reservoirs 14A and/or 14B. Eventually at peak tidal height, gates to the reservoirs 14A and 14B are closed. The flow channel 13 will fill. Once tidal inflow subsides, the gates 19A at the tunnels 19 are closed. Tidal water is then trapped at a maximum height within the estuary 10 as defined between the walls 12 and the obstruction 17. Power generation/storage with the power generation system 14 using wave, water and wind turbines 18C, 18B and 18A can take place during inflow to the estuary 10. Power generation/storage with the power generation system 14 c using wave, water and wind turbines 18C, 18B and 18A an also occur during controlled tidal outflow. In particular, as shown in FIG. 1, the gates 19A adjacent and/or within the channel 20 can be opened (partially or fully). This can allow water to pass along the channel 20 past the water turbine 18B as shown. The gates 19A within the channel 20 could be a dam or other structure and need not be limited to a gate. Indeed, the channel 20 can be formed by a tunnel or other feature of the dam and the water turbine 18B can be placed within the dam such as within the tunnel, for example (see example of this in FIG. 5). Optionally, the gates 19A at or adjacent the tunnels 19 at the obstruction 17 could also be opened (partially or fully) to facilitate outflow (past water turbines 18B). Once the tidal water level within the estuary 10 drops sufficiently, water from the reservoirs 14A and 14B can be tapped by off-flowing water from these to supplement tidal water within the flow channel 13. Reservoirs 14A and 14B could also be emptied back into the ocean rather than back into the estuary 10 if so desired.

It should be understood that the size (e.g., volume and diameter) of the flow channels 13, 19 and 20 is purely exemplary in the FIG. 1. A careful study should be undertaken to properly size the channels (e.g., provide for a proper cross-sectional area and volume) relative to the characteristics (speed, volume flow rate, mass flow rate) of the tidal flow such that inertia of the water passing through the channels 13, 19, 20 can be maintained or is not substantially reduced before passing to the turbine(s).

It should be noted that once filled, the estuary 10 can be emptied at any desired time. Thus, reliance upon periodic tides (which shift in time of day over time) can be avoided. Thus, the estuary 10 could be emptied for power generation by the power generation system 14 at times that a need peak power (e.g., during breakfast time and during dinner time) can be satisfied, for example.

The one or more turbines 18 can be constructed in the manner described in the subsequent FIGS., or known in the art, for example. The one or more turbines 18 can include blades for capturing load of water as known in the art. Likewise, the power generation system 14 can be constructed in the manner described in subsequent of the FIGS. and can include a hydraulic power generation system as will be discussed in further detail subsequently. In some cases, the power generation system 14 can include other sources of power generation including for hydraulic power generation in parallel or series with the water turbines 18B. This can include the wind turbines 18A, the wave power generators 18C and other power generation sources. However, such supplemental sources of power generation are not necessary and are optional.

FIG. 1A shows a system 22 that includes a series of the estuaries 10 previously described. These can be constructed in a staggered relationship as shown, for example. Staggering in the manner shown in FIG. 1A (or FIG. 2) can also change the timing for tidal inflow and outflow into and out of each estuary in a desired manner for power generation purposes.

Figure 2:
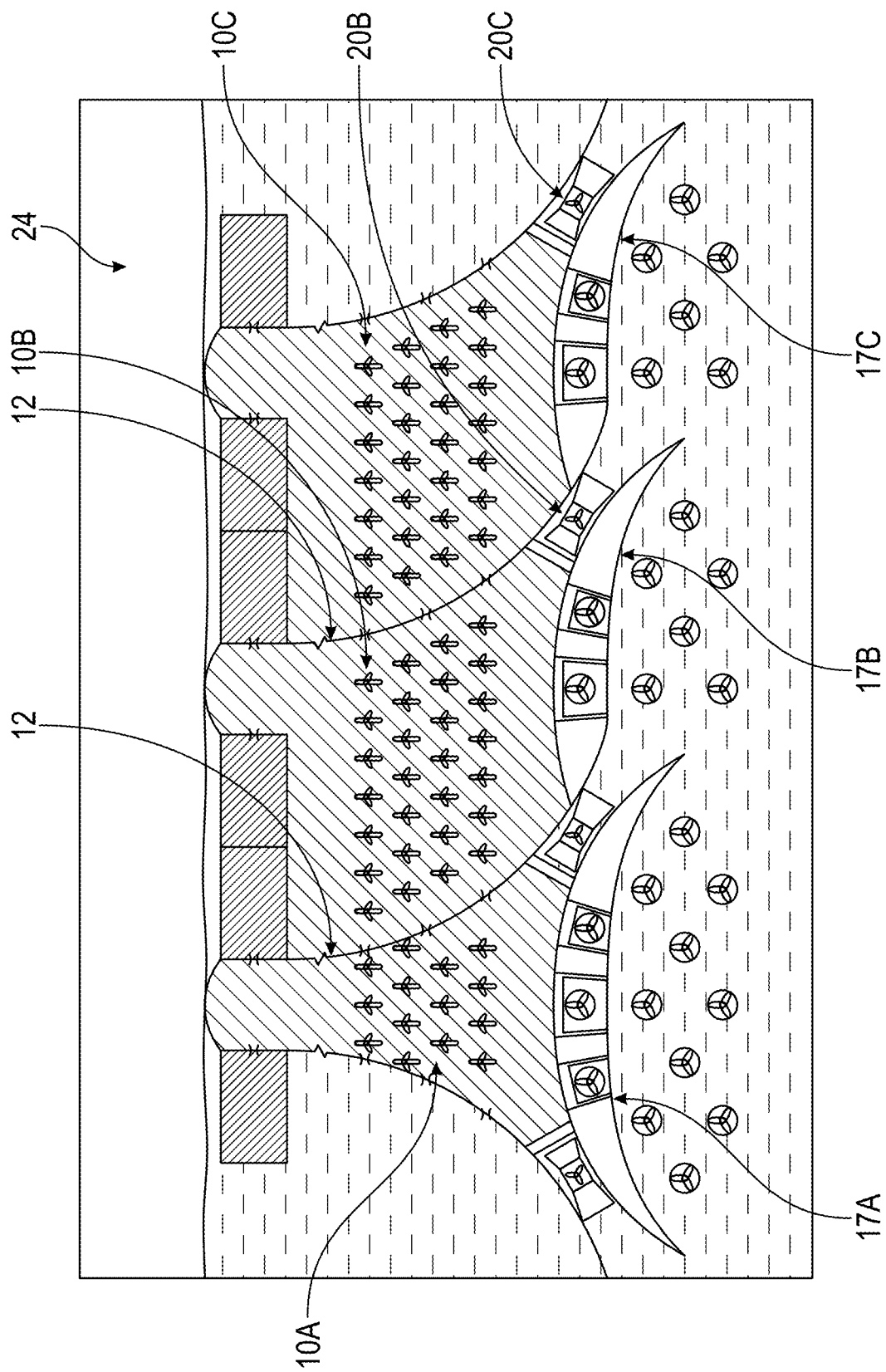
FIG. 2 is a highly schematic view of another system of several tidal estuaries arranged in parallel.

FIG. 2 shows a system 24 with parallel estuaries 10A, 10B and 10C. The estuary 10A can be similar to the example of FIG. 1A but the estuaries 10B and 10C can be modified so as to minimize the number of walls 12 between the various estuaries 10. Some estuaries 10B and 10C can have a modified shape relative to the estuary 10A (as described in FIG. 1). This can result in larger and/or modified flow channels 13B and 13C for the estuaries 10B and 10C and also in modifications to the shape and size of the obstructions 17B and 17C relative to the obstruction 17A (and also described in FIG. 1). The obstructions 17B and 17C may form only a single channel 20B and 20C from the estuary 10B and 10C, for example. The examples of FIGS. 1A and 2 can include all the power generation system 14 components and other features previously discussed in FIG. 1.

Figure 3A:
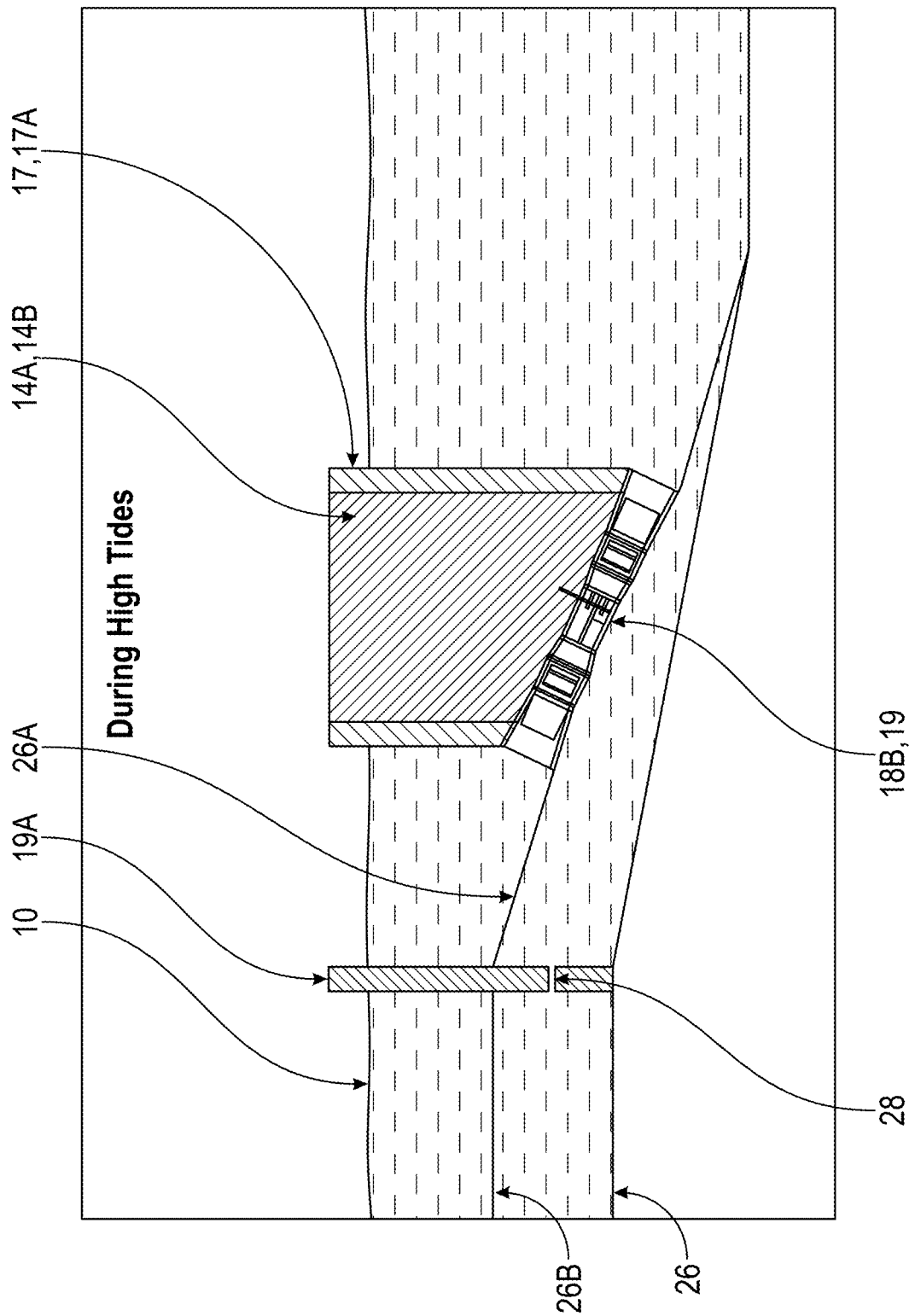
FIG. 3A is a cross-sectional view of one example of an entrance area to the estuary and filling of the estuary during a high tide.
Figure 3B:
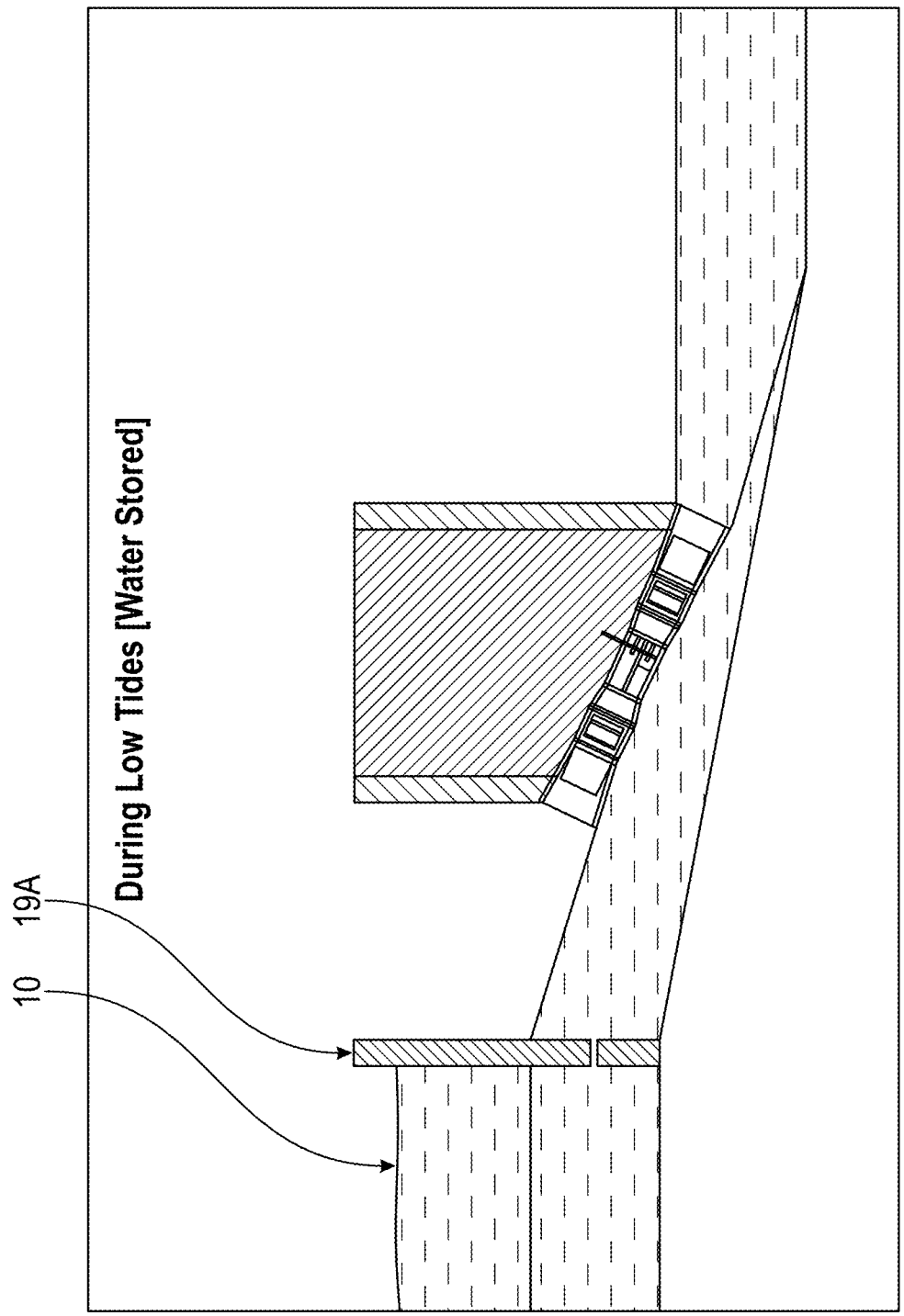
FIG. 3B is a cross-sectional view of the entrance area during a low tide with water that had entered the estuary during the high tide held within the estuary by a gate or dam or other flow regulating object.

FIGS. 3A-3C show schematic cross-sections of parts of the estuary 10 during the filling and off-flowing as previously described. It should be realized that the reservoirs 14A and 14B can be controlled in a similar manner to the flow channel 13 (FIG. 1) to allow for power generation. FIGS. 3A-3C also show construction of a floor 26 of the estuary 10 and tapered floor 26A areas around and leading into the estuary 10 (such as below or through the obstruction 17) can be modified by human activity. The inventor conceives that a false floor 26B (which can include the tapered floor 26A) could be created in certain areas such as in the estuary 10 and adjacent the estuary 10. The false floor 26B can just be a minimum water height for the estuary 10 that can be maintained for sea life to live in the estuary 10 or safely leave (or enter) the estuary 10 via holes 28. False floor 26B can also be features formed by human activities such as tunnels, membrane, cavities/cave or other features or components.

FIG. 3A shows that during high tides the estuary 10 can be fully filled. Power can be generated using the water turbine(s) 18B at the inlet (such as tunnels 19) of the obstruction 17 as described previously. FIG. 3B depicts a low tide where tidal water in the estuary 10 is maintained at or near high tide level (elevated relative to low tide of the ocean) by gate 19A for use at any desired time for power generation as described herein. FIG. 3C depicts that water from the estuary 10 can be released by opening the gate 19A during low tide (or at another time such as between high and low tide) for power generation via the water turbine 18B. Outflow from the estuary 10 can be delayed as desired (e.g., hours, minutes, days).

Figure 4:
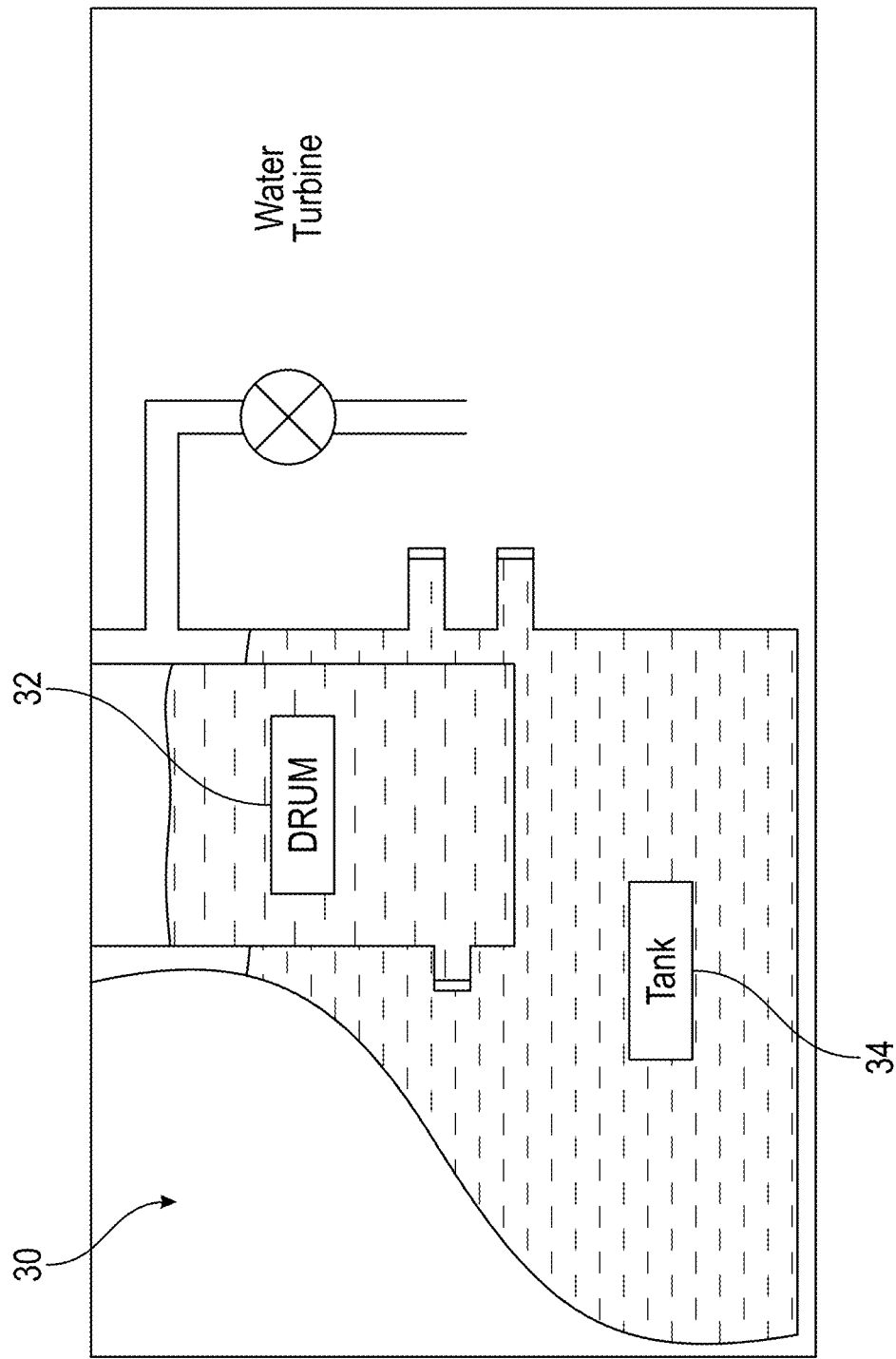
FIG. 4 is a highly schematic view of a system such as for a reservoir that includes a drum that can be selectively raised and lowered into the reservoir to alter a height of the water within the reservoir.

FIG. 4 depicts a system 30 that can be utilized with any one of the reservoirs 14A, 14B (FIG. 1) described previously or indeed can be used with the flow channel 13 (FIG. 1) itself. The system 30 includes a drum 32 and a tank 34 (e.g., the reservoir 14A, 14B, flow channel 13 or another feature). The drum 32 can be filled while incoming water simultaneously fills the tank 34. When the water level in the tank 34 falls the drum 32 can be brought down into the tank 34 so as to increase the height of water within the tank 34 by displacement. Once the water has been emptied in drum 32, the empty drum 32 can be used again to raise the water within the tank 34 (again via displacement).

Figure 5:
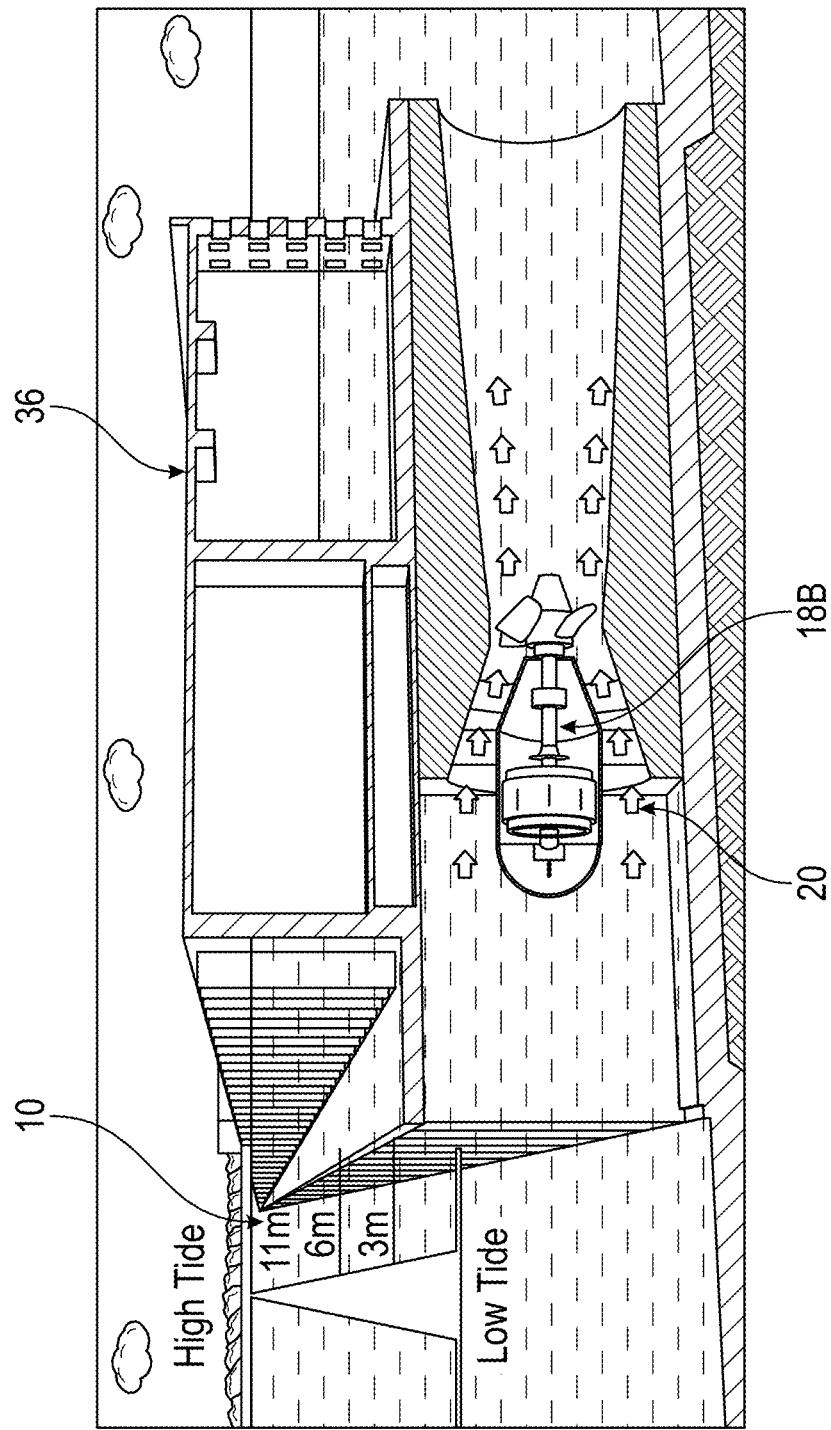
FIG. 5 is a schematic view of a dam that can include various components of the system of FIG. 1 according to an embodiment.

FIG. 5 depicts a dam 36 that can be used as part of the obstruction 17 (FIG. 1) or as an additional feature for the estuary 10 (such as in or forming the channel 20 for outflow past the water turbine 18B from the estuary 10—see also FIG. 1). The dam 36 can include one or more gates 19A (FIG. 1) that can be selectively closed once the estuary 10 behind the dam 36 is filled as desired to store energy for use when needed.

Figure 6A:
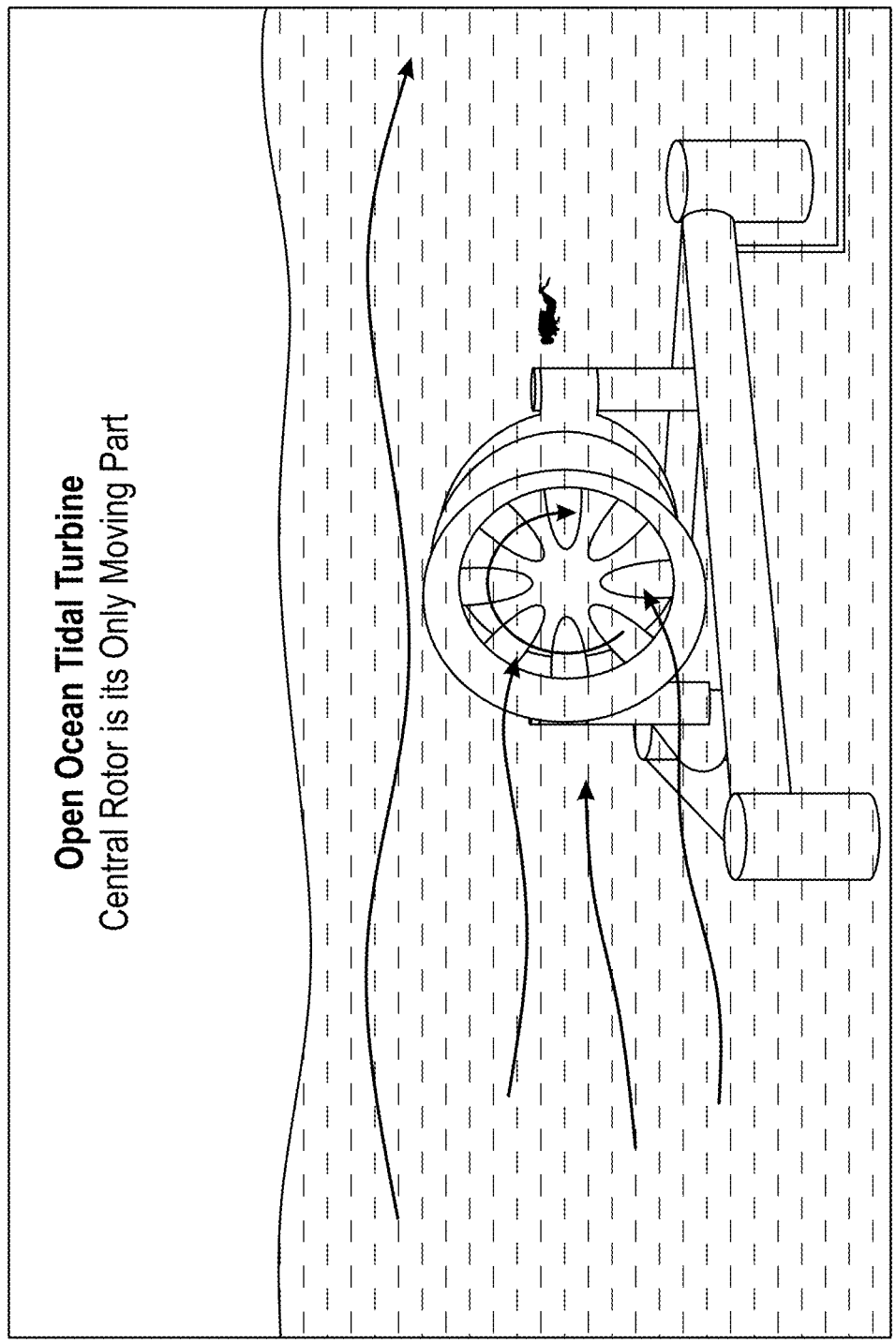
FIGS. 6A-6E are schematic views of various examples of apparatuses that can be used as water turbines or wave power generators as contemplated herein.
Figure 6B:
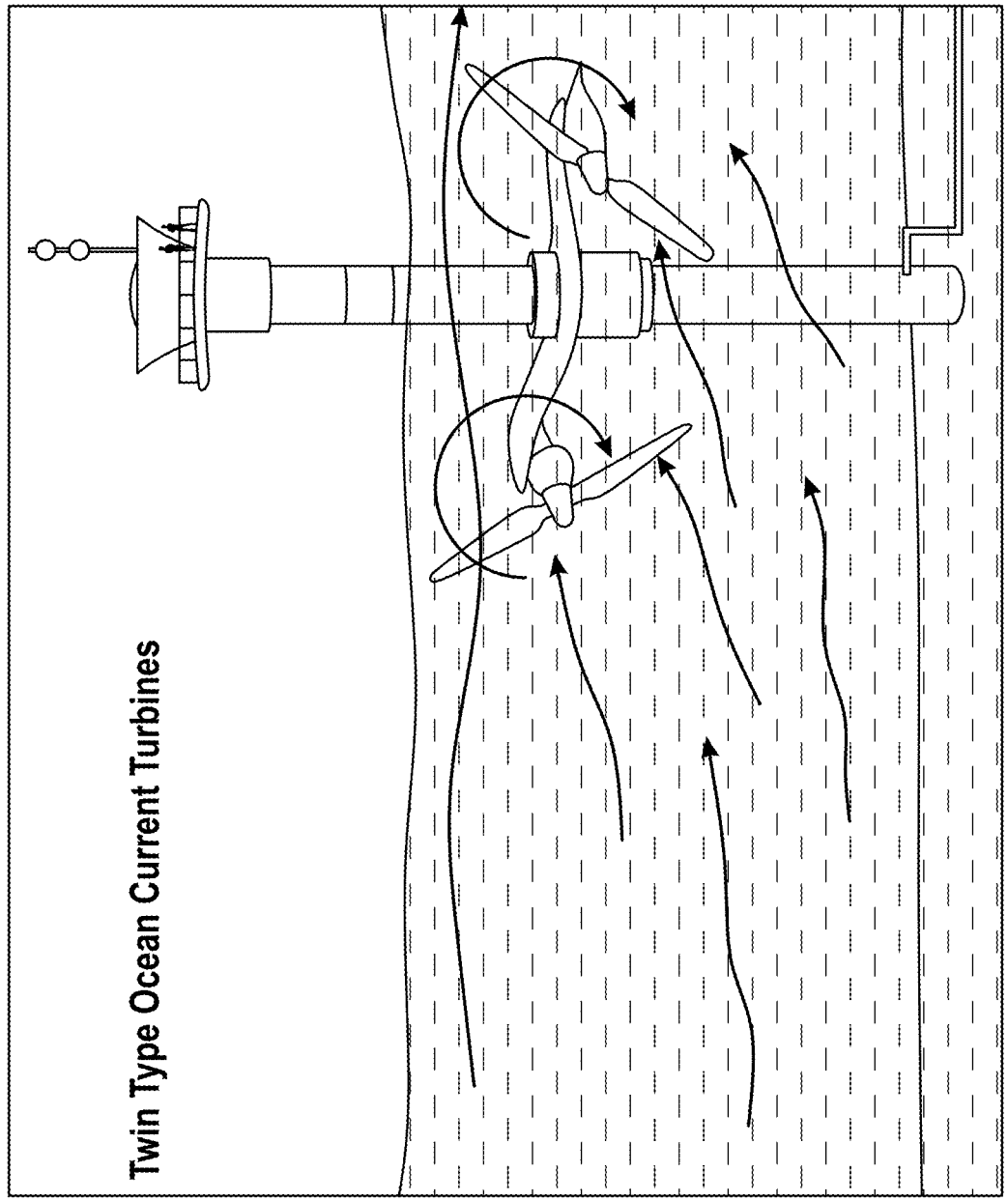

FIGS. 6A-6E show examples of wave power generators 18C that are contemplated for use with the present systems, methods and techniques. It should be noted that placement of the wave power generators 18C close to the obstruction 17 as described in FIG. 1 can be particularly effective as deflected wave action back from the obstruction 17 can produce additional wave energy that can be captured. However, the location of the wave power generators 18C is purely exemplary in FIG. 1 and can be in any desired location (e.g., need not be near the obstruction 17). In particular, FIG. 6A shows an example of an open ocean tidal turbine 38 that can be positioned in a location where wave action (e.g., undertow current) can result in additional power generation. FIG. 6B shows an example of a twin turbine 40 device. This again can be positioned in a location where wave action (e.g., undertow current) can result in additional power generation.

Figure 6C:
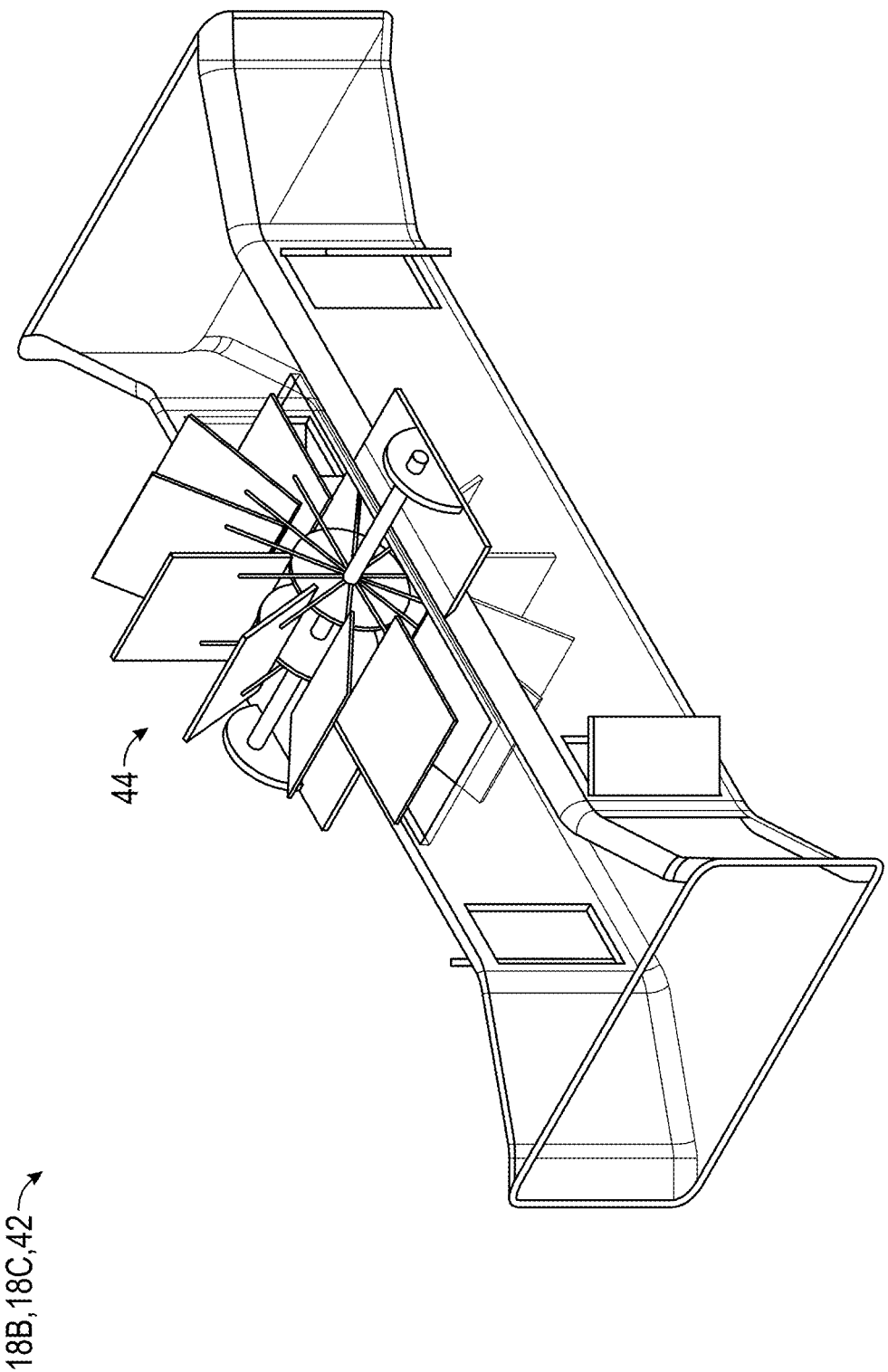

FIG. 6C shows a water wheel device 42. This device 42 can be constructed in a manner similar to the device described in my U.S. application Ser. No. 17/860,842, entitled RIVER VENTURI POWER AMPLIFICATION, STORAGE AND REGENERATION SYSTEM AND METHOD, previously incorporated by reference but can include a water wheel 44. Operation of the device 42 will be discussed in reference to subsequently FIGS. 15A-15F. The device 42 can be used as a water turbine 18B and/or as a wave power generator 18C.

Figure 6D:
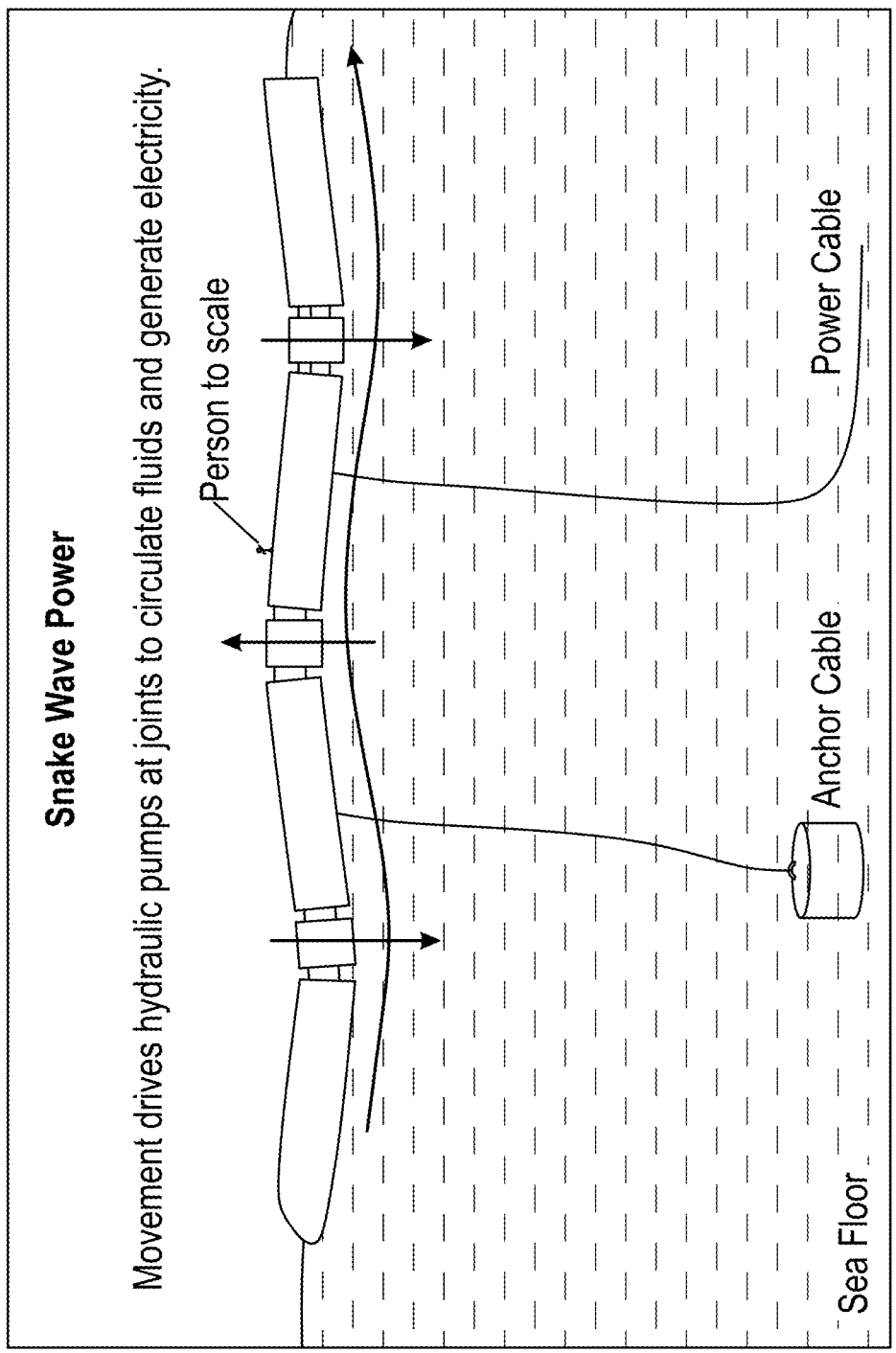
Figure 6E:
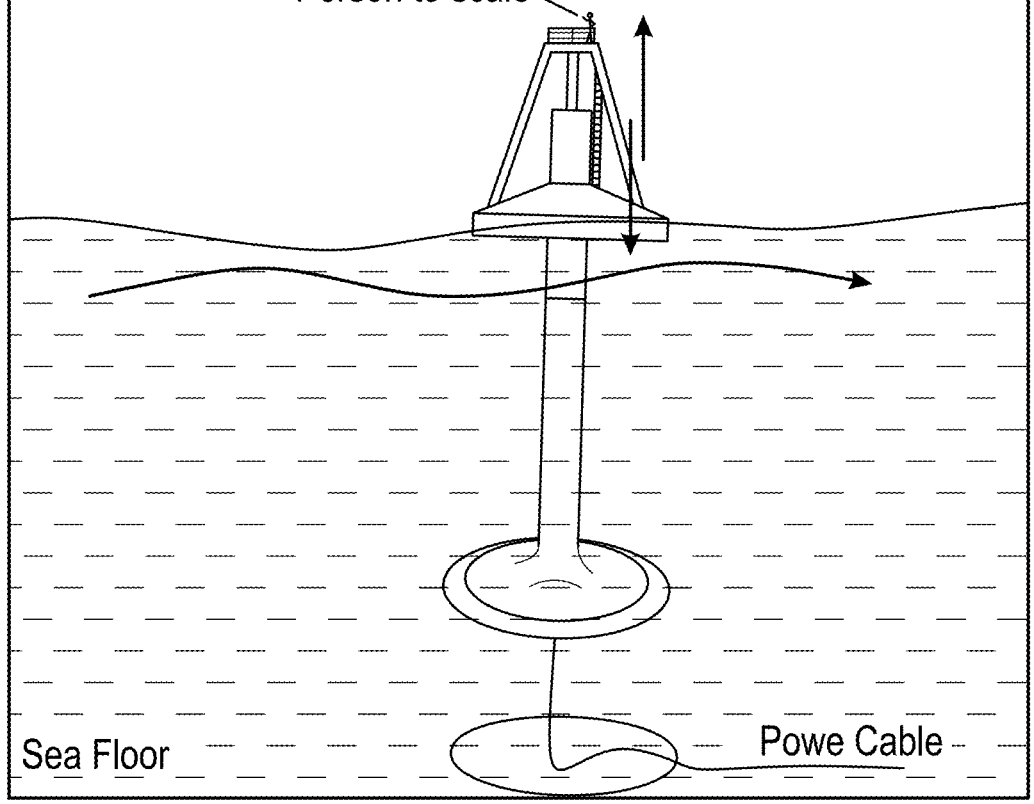

FIG. 6D shows a snake wave power device 46 that uses hydraulic pumps at joints to circulate fluid and generate electricity. FIG. 6E shows a floating device 48 that uses wave motion to drive sea-floor pumps that circulate fluid to devices onshore.

Figure 7A:
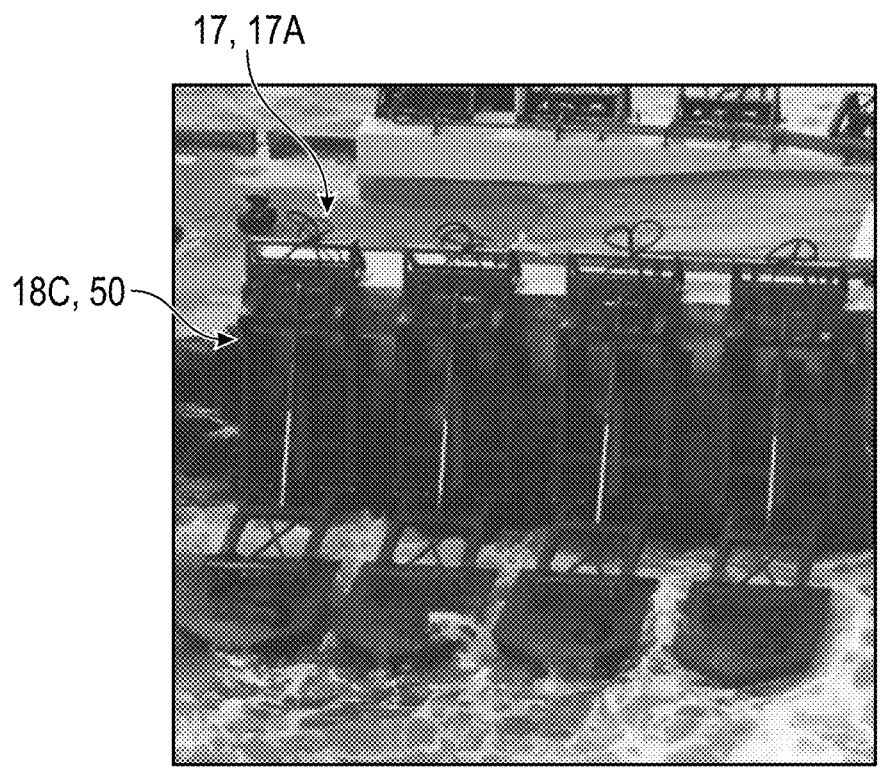
FIGS. 7A-7B are perspective views of further examples of apparatuses that can act as wave power generators according to an embodiment.
Figure 7B:

FIGS. 7A and 7B show wave power generators 18C that can be deployed along the wall 12 (FIG. 1) or along the obstruction 17 (FIG. 7A) such as along the wall 17A thereof. These power generators 18C can include floats 50 that can be raised and lowered by wave action. This movement can circulate hydraulic fluid and can be used to turn a generator, for example.

Figure 8:
FIG. 8 is a perspective view of waves striking a wall of an obstruction and rebounding according to an embodiment.

FIG. 8 shows an example of wave striking and rebounding action off of obstruction 17 (in particular wall 17A) that can be harvested by wave power generators 18C (or indeed land based or land anchored devices as shown in FIGS. 7A and 7B for example) placed in proximity to the obstruction 17.

Figure 9:
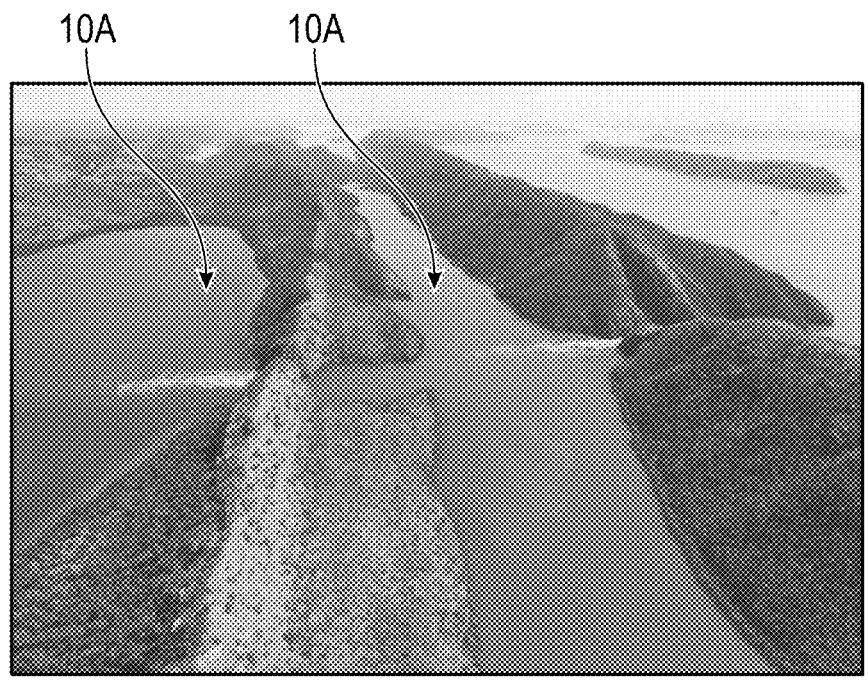
FIGS. 9-10 are perspective views of naturally occurring tidal estuaries that could be modified by human activity for power generation according to an embodiment.
Figure 10:
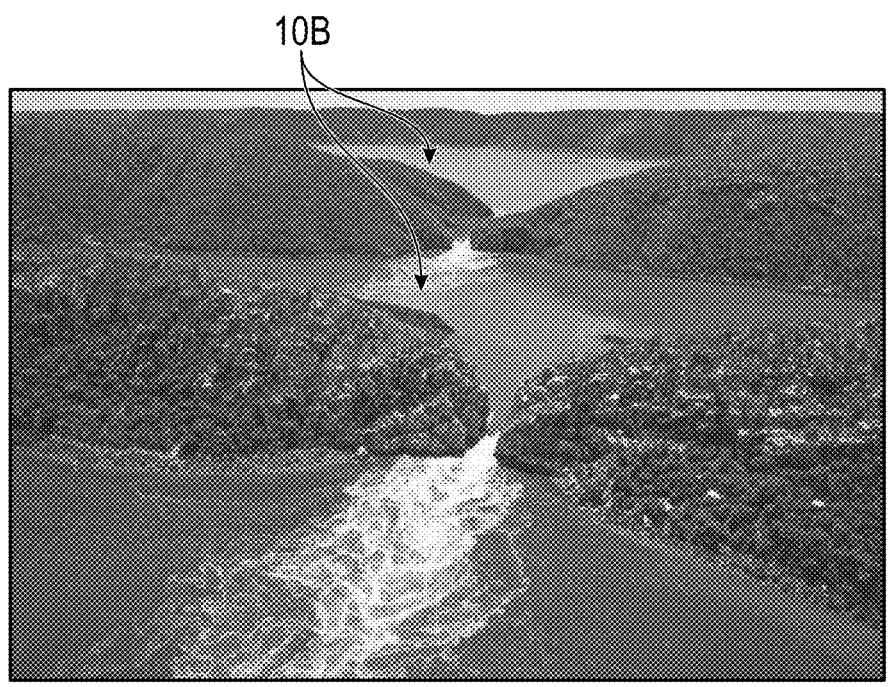

FIGS. 9 and 10 show examples of naturally occurring tidal estuaries 10A and 10B that can be at least partially formed or modified with human activity using the techniques discussed herein including using the power generation systems discussed herein. Tide is showing rushing in the images of FIGS. 9 and 10. It is contemplated that multiple estuaries in series connection to each other could be created in the manner shown in FIGS. 9 and 10.

Figure 11:
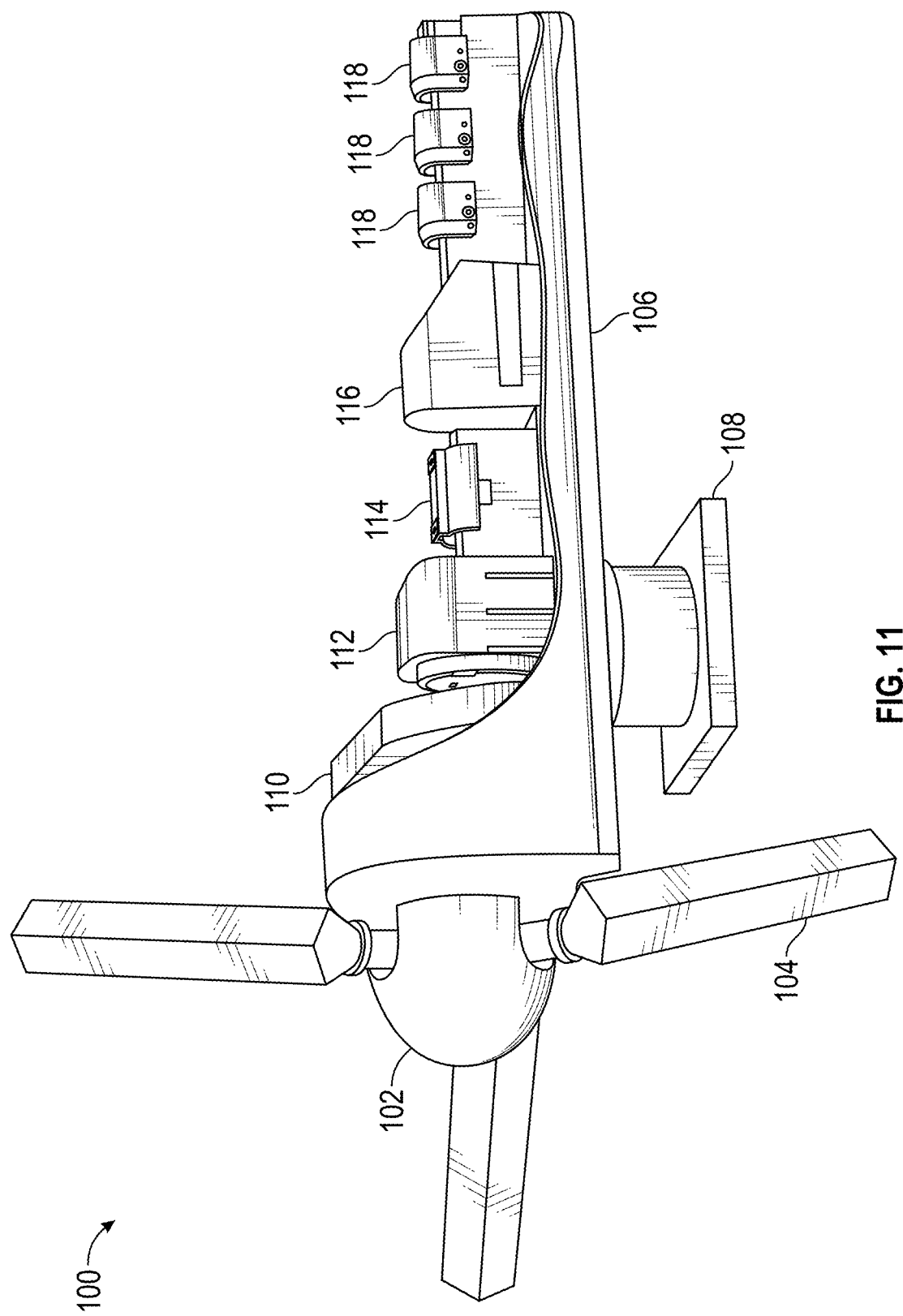
FIG. 11 is a perspective view of a turbine according to one embodiment.

FIG. 11 shows a perspective view of an exemplary turbine 100, which can be either a hydrokinetic turbine or wind turbine. The turbine 100 (or modifications thereof as known in the art or discussed herein) can be utilized with the systems and apparatuses of FIGS. 1-10 and further of the FIGURES described subsequently. Thus, the turbine 100 is merely exemplary of one possible turbine that could be utilized with the apparatuses and systems discussed herein.

Figure 13:
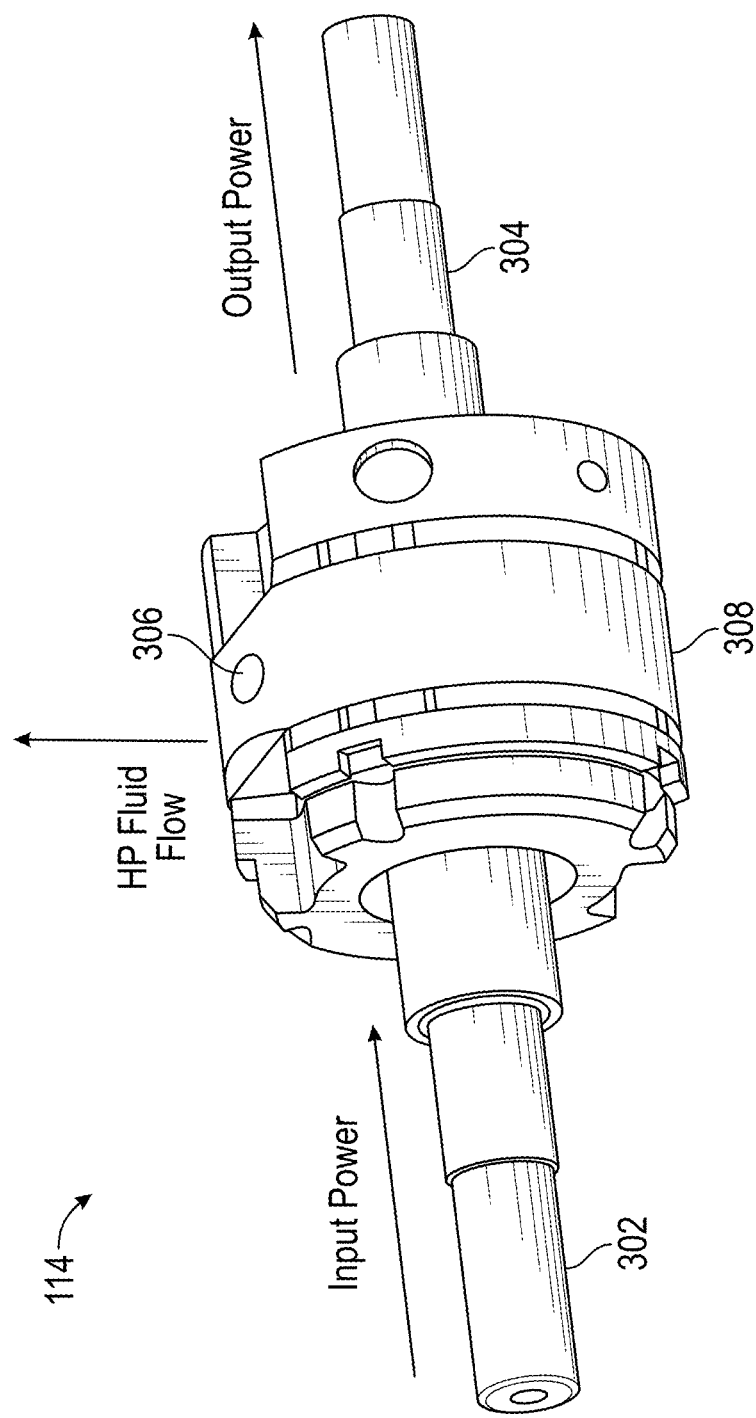
FIG. 13 is a perspective view of a variable power split transmission coupling according to an embodiment.
Figure 14:
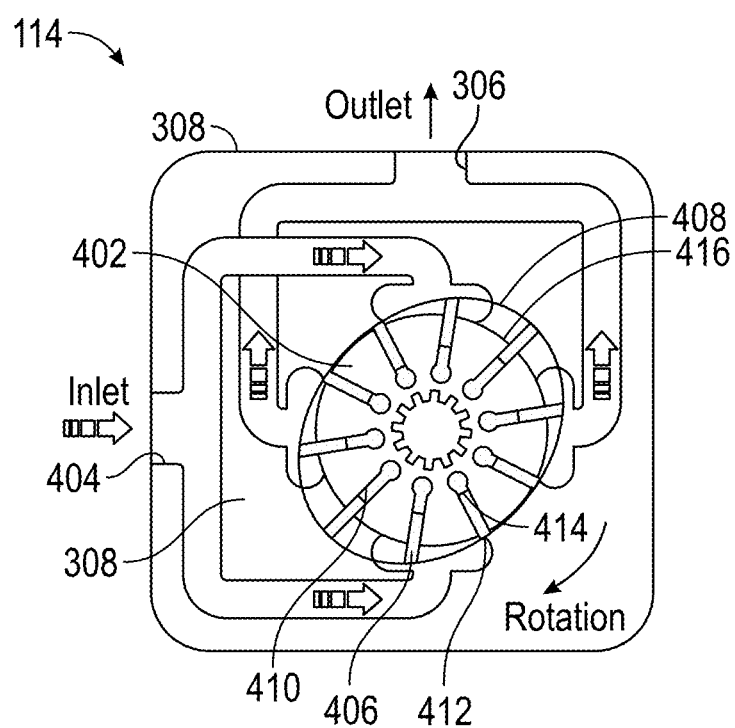
FIG. 14 is a cross section view of an exemplary power split transmission coupling.

In FIG. 11, the turbine 100 can include a turbine rotor 102 and at least one turbine blade 104. The turbine blade 104 can be rotatably coupled to the turbine rotor 102. For instance, the turbine blade 104 can include an airfoil shape and the pitch of the airfoil with respect to a tidal estuary flow can be adjustable. The turbine rotor 102 can be mounted to a nacelle 106, for example, by a bearing 110. A tower 108 can support the nacelle 106 in the tidal estuary at a location sufficiently above the ground to provide clearance for rotation of the turbine blades 104. The nacelle 106 can house, and also support in some examples, a gearbox 112, a power split transmission coupling 114, a generator 116, and at least one hydraulic motor 118. The turbine blade 104 can generate a torque in response to a tidal estuary loading and transmit that torque to the turbine rotor 102. The turbine rotor 102 can transmit the torque generated by the turbine blade 104 to the generator 116. Electrical power can be produced by the generator 116 in response to the application of torque to a generator rotor 120 resulting in a rotation of the generator rotor within a stator of the generator 116. The turbine rotor 102 can be coupled to the generator 116 by one or more linkages (rotary shafts). The gearbox 112 and the power split transmission coupling 114 can be operatively coupled to the one or more linkages between the turbine rotor 102 and the generator 116. For instance, the turbine rotor can include a turbine rotor shaft. The gearbox 112 can include an input coupling attached to the turbine rotor shaft and an output coupling. The gearbox 112 can include one or more sprockets and gears arranged to rotate the output coupling at a speed corresponding to a ratio of the rotational speed of the input coupling (i.e., the turbine rotor shaft). In other words, the gearbox 112 can rotate the output coupling at a faster, slower, or equal speed of the turbine rotor shaft. The one or more linkages can further include an input shaft 122 of the power split transmission coupling 114 (as shown in FIGS. 13 and 14 and described herein). The power split transmission coupling 114 can divert hydraulic fluid under high pressure to a storage vessel. The hydraulic fluid stored under high pressure can be used for auxiliary power purposes including, but not limited to, supplying high pressure hydraulic fluid to a hydraulic motor 118 for power generation or regeneration, pumping fluid, supplying cooling fluid to components of the turbine 100, or the like.

The hydraulic motor 118 can also be coupled to the generator rotor 120 for supplying increased torque and power to the generator 116. In the example of FIG. 11, the turbine 100 includes three hydraulic motors 118 and one of the hydraulic motors 118 is capable of operating at a variable displacement. In an example, a plurality of hydraulic motors 118 can be more efficient than a single larger hydraulic motor 118. For instance, where the maximum power output of the hydraulic motor 118 can exceed the maximum power of the generator 116, the hydraulic motor 118 can be de-stroked to operate at lower than maximum capacity. Some hydraulic motors 118 operate less efficiently when de-stroked. The greater the degree of de-stroking, the less efficient the hydraulic motor 118 can operate. In an example, the hydraulic motor 118 can include a similar design to the power split transmission coupling 114 (as shown in FIGS. 3 and 4 and described herein). Instead of diverting hydraulic fluid to reduce the torque delivered to the generator 116, the hydraulic motor 118 can produce torque on the generator rotor 120 in response to the application high pressure hydraulic fluid to the hub and vanes of the hydraulic motor 118.

Figure 12:
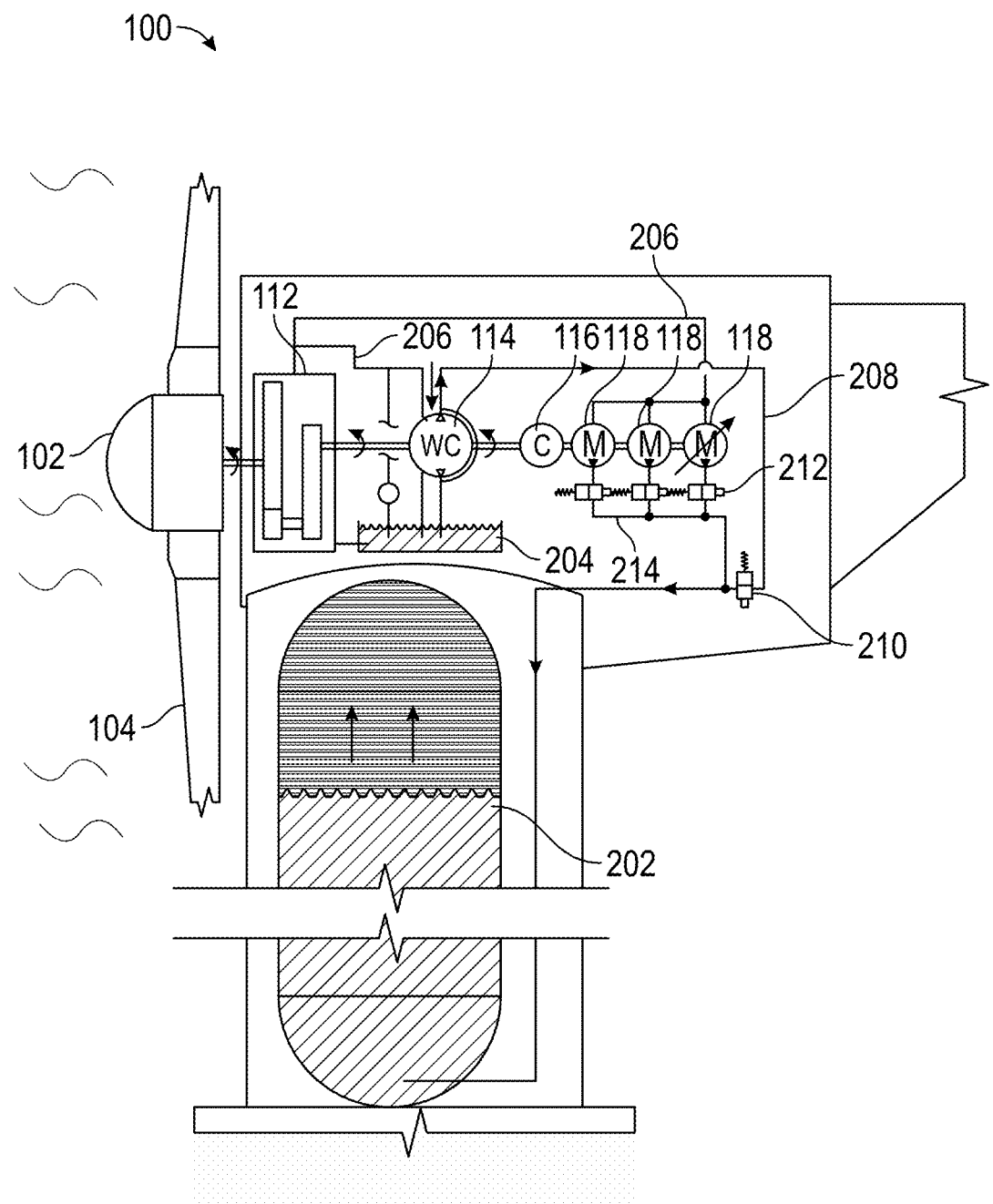
FIG. 12 is a system diagram of a turbine including a power split transmission coupling for regeneration according to an embodiment.

FIG. 12 depicts a system diagram according to an example of the turbine 100. The turbine 100 can include the turbine rotor 102, turbine blades 104, gearbox 112, power split transmission coupling 114, generator 116, and a plurality of hydraulic motors as previously described herein. The example, of FIG. 2 further includes a hydraulic storage vessel 202, a hydraulic fluid reservoir 204, and a cooling circuit 206. Where the mechanical power of the turbine rotor 102 exceeds the maximum power of the generator 116, the power split transmission coupling 114 can draw hydraulic fluid from the reservoir 204 into the power split transmission coupling 114 and divert the hydraulic fluid at high pressure to the hydraulic storage vessel 202. The power split transmission coupling 114 can include an inlet port and outlet port (as shown in FIG. 3 and described herein). The inlet port can be coupled to the reservoir 204 to communicate the hydraulic fluid from the reservoir 204 to the power split transmission coupling 114. A hydraulic storage conduit 208 can couple the power split transmission coupling 114 to the hydraulic storage vessel 202. The high pressure hydraulic fluid can be stored at high pressure in the storage vessel 202. For instance, high pressure hydraulic fluid can be hydraulic fluid at pressures including, but not limited to, 20 bar, 100 bar, 300 bar, 500 bar, or other pressure. The hydraulic storage conduit 208 can include at least one cutoff valve 210 located along the hydraulic storage conduit between the power split transmission coupling 114 and the hydraulic storage vessel 202. The communication of hydraulic fluid from the power split transmission coupling 114 and the hydraulic storage vessel can be interrupted or stopped where the cutoff valve 210 is in the closed position. Closing the cutoff valve can prevent reverse flow of hydraulic fluid from the hydraulic storage vessel 202 to the power split transmission coupling 114.

In an example, the turbine system 100 includes at least one hydraulic regeneration conduit 214 coupled between the hydraulic storage vessel 202 and at least one hydraulic motor 118. For instance, the hydraulic regeneration conduit 214 can be connected to the hydraulic storage conduit 208 between the hydraulic storage vessel 202 and the cutoff valve 210 as shown in FIG. 12. In the regeneration mode, the turbine 100 can direct hydraulic fluid from the hydraulic storage vessel 202 to the one or more hydraulic motors 118 through the hydraulic regeneration conduit 214. The hydraulic regeneration conduit 214 can include one or more regeneration valves 212. In the open position, high pressure hydraulic fluid can flow from the hydraulic storage vessel to at least one hydraulic motor 118 through the regeneration valve 212. Torque can be supplied to the generator rotor 120 in response to the high pressure hydraulic fluid passing through the hydraulic motor 118.

In an example, the hydraulic fluid can include, but is not limited to water, a water glycol mixture, hydraulic oil, or the like. The power split transmission can operate with water as a fluid medium for transmitting torque from the input shaft to the output shaft resulting in cost savings over more expensive fluids. Couplings, fittings, hoses, conduits, and the like can leak hydraulic fluid in the course of normal operation. The use of water as the hydraulic fluid can result in an environmentally friendly solution. In an example, glycol or ethylene glycol can be added to water to form a water glycol mixture. For instance, the water glycol mixture can include a lower freezing point and a higher boiling point than pure water.

In the example of FIG. 12, the reservoir 204 can include a fluid storage tank for holding the hydraulic fluid at low pressures, such as atmospheric pressure. In an example, the reservoir 204 can include a large body of water, such as an ocean, lake, tidal estuary, storage pod, tank, or the like. For instance, the large body of water can include a naturally occurring body of water. The reservoir can provide hydraulic fluid for cooling various components of the turbine 100 or for storing the hydraulic fluid at high pressure generated by the power split transmission coupling 114. In an example, where the hydraulic fluid from the reservoir 204 is not stored under high pressure, it can be returned to the reservoir 204. For instance, where the hydraulic fluid is circulated in a cooling circuit (described further below), the hydraulic fluid can be returned to the reservoir 204.

The hydraulic storage vessel 202 can be configured to store high pressure hydraulic fluid for long durations of time. For instance, the hydraulic storage vessel 202 can contain pressures of up to 350 bar for hours, days, weeks, or months. In the example of FIG. 2, the hydraulic storage vessel 202 is a hydraulic accumulator. The accumulator can be charged with a gas or a liquid, such as nitrogen gas or liquid nitrogen, to increase the storage pressure of the accumulator. In an example, the stored hydraulic fluid can provide up to 1 megawatt of power or more.

The cooling circuit 206 can circulate hydraulic fluid (e.g., from the reservoir 204) in a conduit. In the example, shown in FIG. 12, the hydraulic fluid diverted from the power split transmission coupling 114 can be circulated through the cooling circuit 206. The cooling circuit 206 can transfer heat away from the turbine components including, but not limited to, the gearbox 112, power split transmission coupling 114, generator 116, or the like. For instance, the cooling circuit 206 can include one or more heat exchangers to transfer the heat away from the turbine components. In an example, water can be the hydraulic fluid used as a cooling source for the turbine powertrain. In an example, hydraulic fluid exiting the hydraulic motor 118 can circulate through the cooling circuit 206 before returning to the reservoir 204. Optionally, the water can be combined with fire retardants (e.g., foaming agents) for reducing the flammability of the hydraulic fluid. In an example, the hydraulic fluid can be a water glycol mixture with good fire retardant properties. The hydraulic fluid can mitigate damage to the generator 116 and risk of fire and accordingly the generator 116 can be operated at rated power. In an example, hydraulic fluid (e.g., water glycol) can be used to extinguish developing fires. For instance, the cooling circuit 206 can include fire extinguishing nozzles that release the hydraulic fluid to extinguish fire.

FIG. 13 shows a perspective view of an example of the power split transmission coupling 114 (sometimes referred to herein simply as power split coupling, hydraulic coupling or simply coupling). As previously described, the power split transmission coupling 114 can include an input shaft 302 and an output shaft 304. Furthermore, according to some examples a thru shaft arrangement is also contemplated. The torque applied to the output shaft 304 can be adjusted according to an adjustable torque ratio of the input shaft 302. In an example, the torque of the output shaft 304 can be reduced according to the adjustable torque ratio of the power split transmission coupling 114. Displacing hydraulic fluid through an outlet port 306 of the power split transmission coupling 114 can decrease the adjustable torque ratio (i.e., reduce the amount of torque on the output shaft 304 in relation to the torque of the input shaft 302. A hub (shown in FIG. 14 and described herein) can be fixably attached to the input shaft 302. The hub can be rotatable within the cam ring 308. In an example, the cam ring 308 can be fixably attached to the output shaft 304. The power split transmission coupling 114 can have a through drive mode and a power split mode. In the through drive mode, the hub and the cam ring rotate in a substantially fixed 1:1 ratio (i.e., the output torque is substantially equal to the input torque). The power split mode, the power split transmission coupling 114 can mitigate excess power or shock being applied to the generator. For instance, adjustable torque ratio of the power split transmission coupling 114 can be adjusted so the torque of the output shaft 304 is constant where there can be variation of torque applied to the input shaft 302. In an example, the power split transmission coupling 114 can include a housing. The cam ring 308 and hub 402 can be disposed within the housing. The hydraulic fluid can be included in a cavity between the housing and the cam ring 308, input shaft 302, output shaft 304, or other components for lubrication or coolant.

FIG. 14 is an example of a cross section view of the power split transmission coupling 114 located perpendicular to the input shaft 302 and centered within the hub 402. The cam ring 308 includes the inlet port 404, the outlet port 306, and a cam ring surface 408. The cam ring surface 408 can be an elliptical shape. The inlet port 404 can extend from the outer portion of the cam ring 308 and divide into at least two conduits, each extended to opposite quadrants of the cam ring surface 408 in the example shown in FIG. 14. The outlet port 306 can extend from the outer portion of the cam ring 308 and divide into at least two conduits, each extended to opposite quadrants of the cam ring surface 408 and adjacent to the inlet port quadrants. The inlet port 404 and outlet port 306 can terminate at the cam ring surface 408 forming one or more apertures in the cam ring surface 408. In the example of FIG. 14, the elliptical shape of the cam ring 308 can be symmetrical. Symmetry of the cam ring 308 can balance the forces applied to bearings of the power split transmission coupling 114. For instance, bearings supporting the input shaft 302 and the output shaft 304. Balanced forces can extend the life of the power split transmission coupling 114 as mechanical stress and fatigue are reduced.

The hub 402 can be located at the center axis of the cam ring surface 408. As shown in FIG. 14, the hub 402 can include a circular shape sized to fit within the elliptical shape of the cam ring surface 408. For instance, the hub 402 can be sized with a clearance fit to the cam ring surface 408, such as a precision running fit to allow for the hub 402 to rotate within the cam ring 308 with minimal clearance. The hub 402 can include a plurality of circumferentially spaced slots 410 extended radially outward from the center axis of the hub 402. Each slot 410 can be sized and shaped to support a vane 406 therein. The inner portion of the slot 410 can include a signal passage in communication with a high pressure fluid.

As shown in the example of FIG. 14, the vane 406 can be located within the slot 410. The vanes can be extended radially outward from the center axis of the hub 402 in response to the application of the high pressure fluid to the base 414 of the vane 406 through the signal passage. In an example the high pressure fluid can be high pressure hydraulic fluid. A tip 412 of the vane 406 can contact the cam ring surface 408 in a fully extended position. Each vane 406 can extend and retract throughout the rotational cycle of the hub 402. For instance, the tip 412 can be substantially flush with the outer surface 416 of the hub 402 in a first orientation of the hub 402 and then be displaced to a partially extended position or a fully extended position as the hub 402 rotates from the start of a first quadrant to the start of the second quadrant. In the retracted position, the input shaft 302 can be independently rotatable with respect to the output shaft 304.

In an example, the tip 412 can include a roller bearing (referred to herein as a roller vane). The roller vane can decrease friction between the vane 406 and the cam ring surface 408 and can be used in a large scale power split transmission coupling 114 (e.g., 200 kilowatts or greater). Where the hydraulic fluid includes an environmentally friendly or non-flammable fluid (such as water glycol), the roller vane can be used to reduce friction between the vane 406 and the cam ring 308. The vane 406 can also include a coating to reduce friction, increase corrosion resistance, or reduce wear. For instance, the vane 406 can include a diamond-carbon coating or diamond-dust coating to improve the corrosion resistance of the vane 406. The coating can be selected from a variety of coatings to reduce friction where a particular hydraulic fluid is used in the power split transmission coupling 114. The diamond-dust coating can reduce corrosion where water glycol is used in the power split transmission coupling 114.

As previously stated the power split transmission coupling 114 can include a through drive mode and a power split mode. In the through drive mode, the input shaft 302 and the output shaft 304 can include a 1:1 adjustable torque ratio. For instance, the input shaft 302 and the output shaft 304 can rotate together (i.e., at the same angular velocity). The hydraulic fluid between the hub 402 and the cam ring 308 can be pressurized by the power split transmission coupling 114. For instance, where the vane 406 is extended, a pressure can be applied to the hydraulic fluid by the vane 406. Torque is transferred from the hub 402 to the cam ring 308 by the pressurized hydraulic fluid on the cam ring 308. The outlet port 306 can be closed (i.e., deadheading). With the hydraulic fluid trapped within the power split transmission coupling 114, substantially all of the torque from the hub 402 can be transferred to the cam ring 308. The torque applied to the generator 116 can be substantially equal to the torque of the input shaft 302. The power split transmission coupling 114 can operate in the trough drive mode where the power applied to the input shaft 302 is lower than the rated power of the generator 116 (e.g., at low turbine rotor speed). Efficiency of the turbine 100 can be maximized by operating the power split transmission coupling 114 in the through drive mode where the turbine rotor power is below the rated power of the generator 116 (e.g., when tidal estuary and/or wind speed is low).

In the power split mode, the outlet port 306 can be open or partially open. Hydraulic fluid can exit the power split transmission coupling 114 through the outlet port 306. The pressure of the hydraulic fluid between the hub 402 and the cam ring 308 can be reduced as a result of the exiting (diverted) hydraulic fluid. Accordingly, less than substantially all of the input shaft 302 torque can be transferred to the output shaft 304. In an example, the volume between vanes 406 in the inlet quadrants of the cam ring 308 increase as the hub 402 rotates within the cam ring 308. The volume between the vanes 406 in the outlet quadrants of the cam ring 308 decrease as the hub 402 rotates within the can ring 308. The increasing volume in the inlet quadrants draws the hydraulic fluid into the power split transmission coupling 114. For instance, the increasing volume can generate a negative pressure that draws hydraulic fluid into the power split transmission coupling 114. The decreasing volume in the outlet quadrants can increase the pressure of the hydraulic fluid, for instance, by compressing the hydraulic fluid. A portion of the hydraulic fluid in the outlet quadrant can be diverted through the outlet port 306 in response to the power transferred from the input shaft 302 to the output shaft 304 exceeding a threshold level (e.g., a maximum rated generator power). The diverted hydraulic fluid can be stored under pressure (e.g., the pressure at which the hydraulic fluid exits the power split transmission coupling 114) and stored in the storage vessel 202. Stated another way, the hydraulic fluid exiting the power split transmission coupling 114 can be high pressure hydraulic fluid.

The adjustable torque ratio of the power split transmission coupling 114 can be adjusted to provide a desired output shaft condition including but not limited to, an output shaft torque, power, rotational speed, or the like. The difference in the torque of the input shaft 302 and the torque of the output shaft 304 is proportional to the volume of high pressure hydraulic fluid diverted from the power split transmission coupling 114. For instance, the outlet port 306 can include an adjustable valve. An orifice of the adjustable valve can be adjusted to increase or decrease the flow rate of fluid flowing through the outlet port 306. Increasing the flowrate of hydraulic fluid through the outlet port 306 can decrease the amount of torque transferred from the input shaft 302 to the output shaft 304. In an example, the extension of the vane 406 can be controlled to achieve the desired output shaft condition. The position of the tip 412 of the vane 406 can be adjusted to a location flush with the outer surface 416 of the hub 402, a location in contact with the cam ring 308, or any location therebetween. The adjustable torque ratio can be controlled by any number of mechanical or electromechanical devices including, but not limited to, an electric motor, servo, flow control valve, mechanical linkage, hydraulic motor, hydraulic system, pneumatic motor, pneumatic system, or the like. In an example, the adjustable torque ration can be controlled by a computer in communication with the electromechanical device.

In an example, the stored hydraulic fluid can be supplied under high pressure to a hydraulic motor 118 to increase the power produced by the generator 116. For instance, where the power applied to the generator rotor 120 is below the maximum rated power of the generator 116, additional power can be supplied to the generator 116 from the hydraulic motor 118. In an example, reducing the power transmitted to the generator rotor 120 can prevent damage to the generator 116 or prevent the oversupply of power to an electric grid and accordingly an undesired increase in the electrical frequency of the grid. In the power split mode, power generated by the turbine rotor 102 is not wasted by reducing the power transmitted to the generator 116. Instead, the excess power is stored as high pressure fluid to be used at another time or location, such as used to provide additional power to the generator 116 when tidal estuary and/or wind speed is low or to provide additional power to another turbine operating below maximum production. In an example, the power split transmission coupling 114 can smooth the torque and/or power transmitted from the input shaft 302 to the output shaft 304. For instance, an inconsistent input shaft torque can be converted to a constant output shaft torque by the power split transmission coupling 114. In an example, the energy efficiency of the power split transmission coupling 114 can be 90% or greater. In comparison, a piston pump can have an energy efficiency of only 70%. The power split transmission coupling 114 can operate at power capacities over one megawatt, such as two megawatts, three megawatts, or more.

Figure 15A:
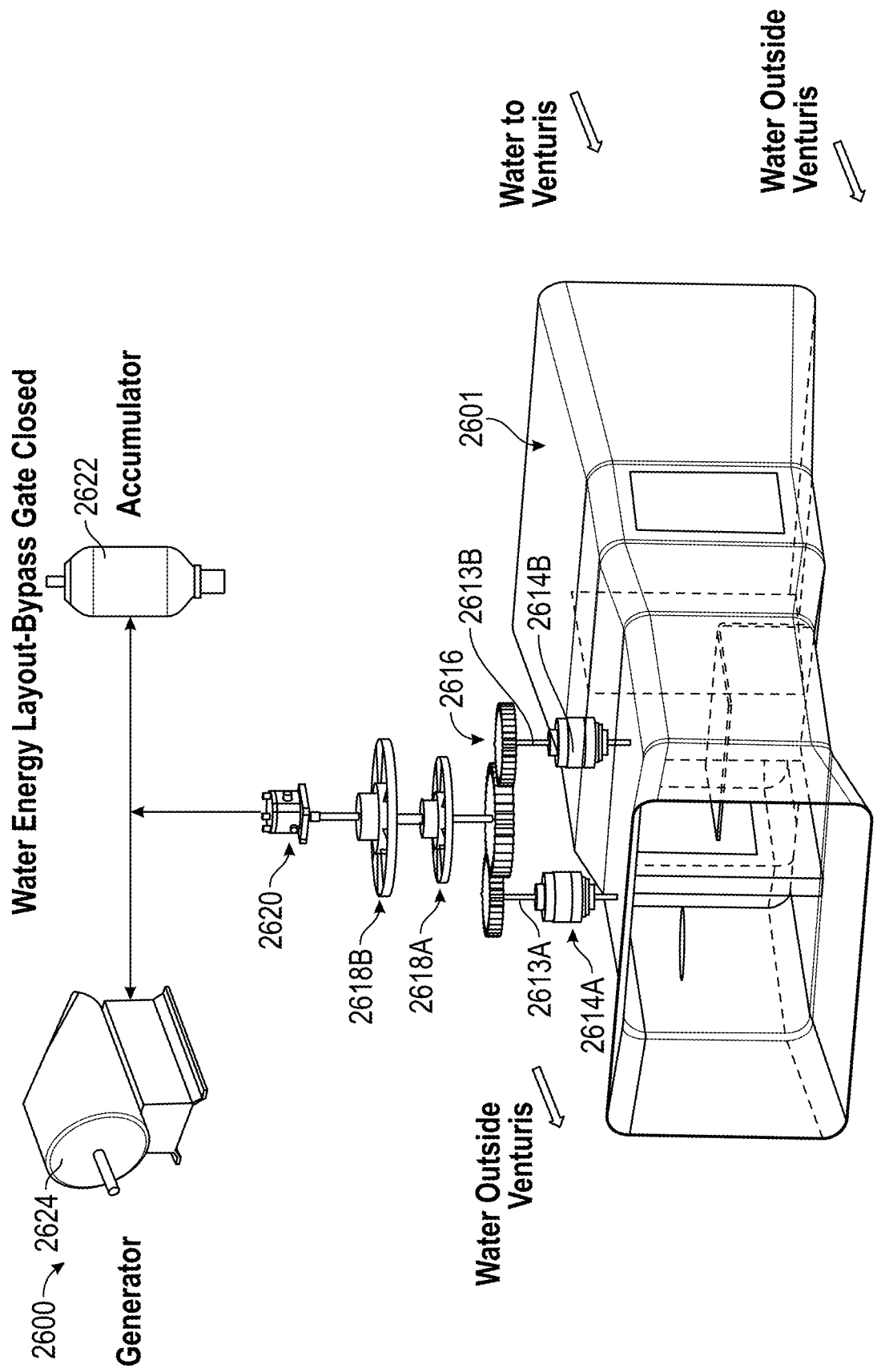
FIG. 15A shows a tidal estuary power generation, storage and regeneration system according to an example of the present application.
Figure 15B:
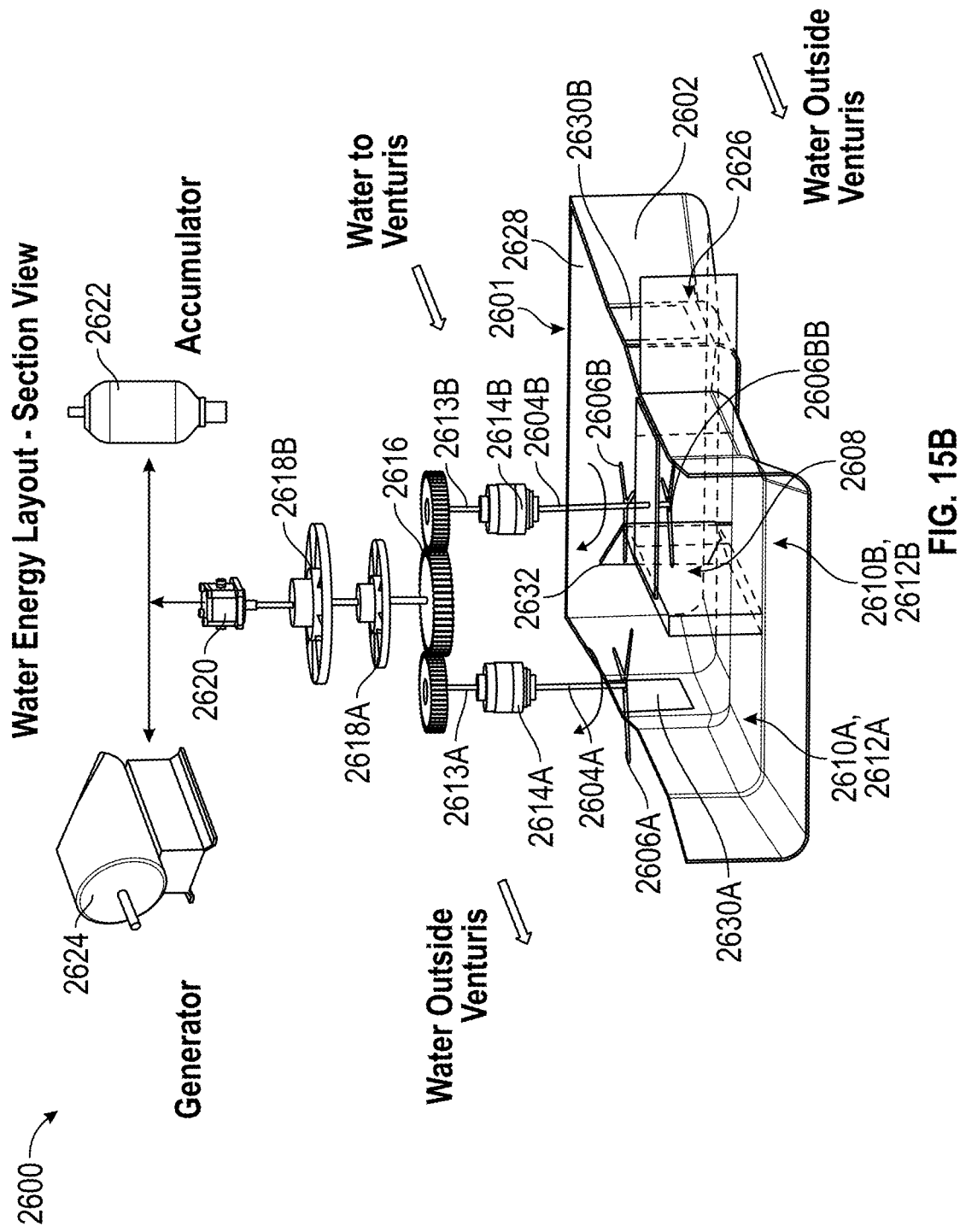
FIG. 15B shows the system of FIG. 15A with a water flow capturing apparatus shown in cross-section.
Figure 15D:
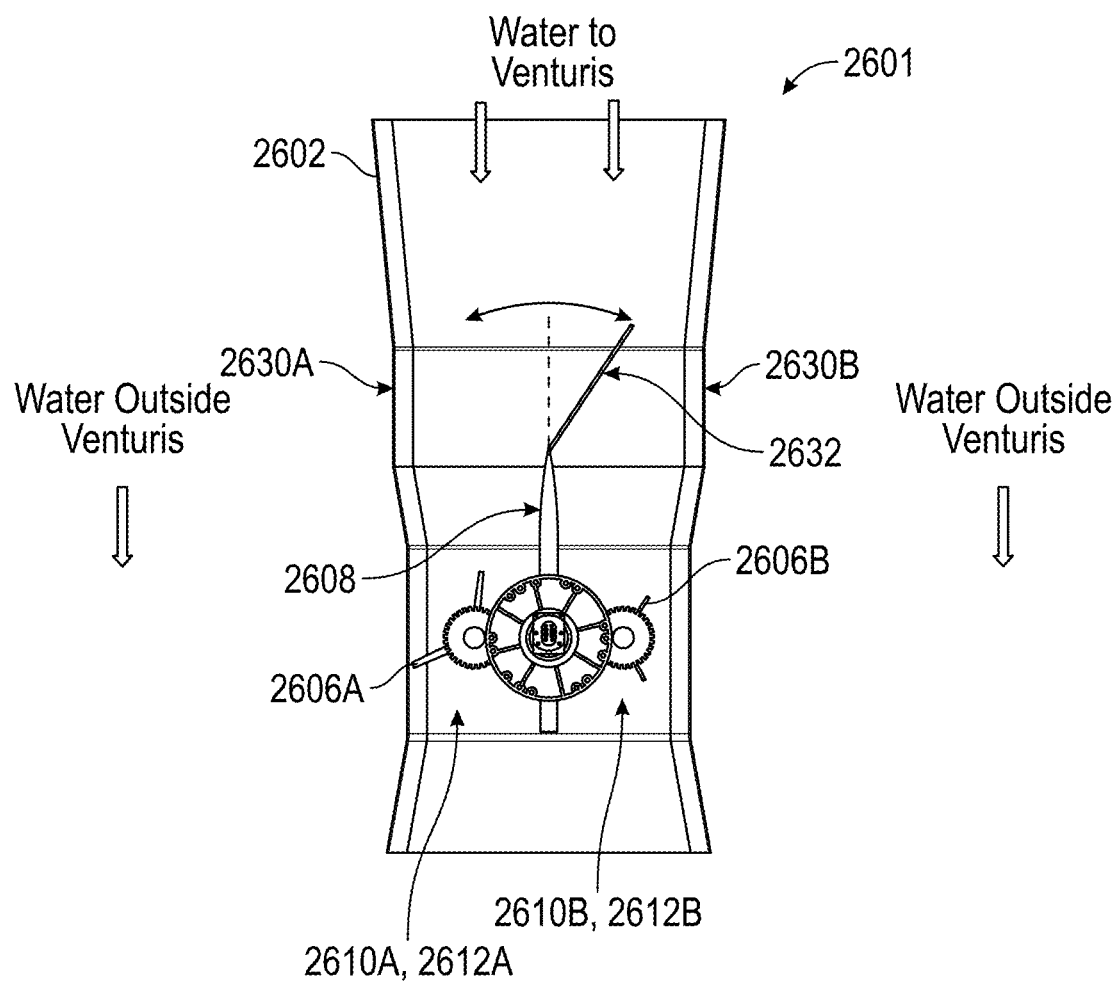
FIG. 15D is a top down view showing the water flow capturing apparatus with a diversion gate articulated to a first position and also showing some of the components of the system of FIG. 15A.

FIGS. 15A, 15B and 15C show a power generation, storage and regeneration system 2600 according to another example. The system 2600 can include a water flow capturing apparatus 2601 that can be utilized with a water turbine 18B (FIG. 1) and/or as a wave capture apparatus 18C. The water flow capturing apparatus 2601 can be modified to be the water wheel device 42 (FIG. 6C) with elimination of one or both of the two turbines discussed below and substitution of the wheel 44 (FIG. 6C). The water flow capturing apparatus 2601 can include one or more drive shafts 2613A and 2613B, one or more power split transmission couplings 2614A and 2614B, a gearbox 2616, a first flywheel 2618A, a second flywheel 2618B, one or more pump/motors 2620, one or more accumulators 2622 and one or more generators 2624. Although not specifically shown in FIGS. 15A-15C, the system 2600 can also include one or more controllers and one or more sensors such as (electrical control unit and tachometers). The controller can be used to operate the system 2600 in the various operation modes discussed herein.

Referring now to FIGS. 15A, 15B, 15C, 15D, 15E and 15F in combination, the water flow capturing apparatus 2601 can include an outer nacelle 2602, one or more turbine rotors 2604A and 2604B, a plurality of blades 2606A, 2606B and 2606BB, an inner wall 2608, venturi sections 2610A and 2610B, a first flow passage 2612A, a second flow passage 2612B, a slide door 2626, a screen 2628, one or more bypass gates 2630A and 2630B and a diversion gate 2632. In addition to the venturi section 2610A and 2610B, the outer nacelle 2602 can include an inlet section 2634 and an outlet section 2636.

At a system level, the system 2600 the water flow capturing apparatus 2601 can be configured to capture an amount of water (e.g., from a river, stream, tide or other source of moving water) and funnel this water to one or more of the plurality of blades 2606A, 2606B and 2606BB. The load of the water passing over the one or more of the plurality of blades 2606A, 2606B and 2606BB can cause the one or more of the plurality of blades 2606A, 2606B and 2606BB to turn the one or more turbine rotors 2604A and 2604B. The turbine rotors 2604A and 2604B can couple with or be the one or more drive shafts 2613A and 2613B. The one or more power split transmission couplings 2614A and 2614B can selectively couple with the one or more drive shafts 2613A and 2613B and can be utilized in the manner discussed previously. The drive shafts 2613A and 2613B can extend from the one or more power split transmission couplings 2614A and 2614B and can couple with the gearbox 2616. Another drive shaft 2614C (or shafts) can extend from the gearbox 2616 and can couple in series or parallel arrangement with the first flywheel 2618A, the second flywheel 2618B, the one or more generators 2624 and the one or more pump/motors 2620. Hydraulically, the one or more power split transmission couplings 2614A and 2614B can be in selective fluid communication with the gearbox 2616, the one or more pump/motors 2620 and the one or more accumulators 2622 (see schematic diagrams of FIGS. 16A and 16C).

The system 2600 can be constructed and operate in a similar to that of the systems of FIGS. 11-14 previously discussed. However, the first flywheel 2618A and/or the second flywheel 2618B can be an important addition. The first flywheel 2618A and second flywheel 2618B can differ in size and inertia. The first flywheel 2618A and second flywheel 2618B can smooth out delivery of power from the turbine rotors 2604A and 2604B to the one or more generators 2624. The inertia of each of the first flywheel 2618A and second flywheel 2618B opposes and moderates fluctuations in the speed of the turbine rotors 2604A and 2604B (as a result of changes in water flow velocity) and stores the excess rotational energy (conserves angular momentum) for intermittent use.

Turning to the water flow capturing apparatus 2601 as shown in FIGS. 15A, 15B, 15C, 15D, 15E and 15F, the outer nacelle 2602 can funnel water into the water flow capturing apparatus 2601 via the inlet section 2634. Thus, the inlet section 2634 can have a reduced cross-sectional area traveling from an upstream edge thereof toward the downstream direction. The outer nacelle 2602 can be constructed of suitable materials such as plastic, sheet metal, reinforced concrete, or the like. The inlet section 2634 can fluidly communicate with the venturi sections 2610A and 2610B, which have a reduced cross-sectional area relative to the inlet section 2634 and the outlet section 2636. The venturi sections 2610A and 2610B can be separated from one another by the inner wall 2608. The inner wall 2608 can extend into or adjacent the inlet section 2634 and/or the outlet section 2636. A leading upstream edge of the inner wall 2608 can have an airfoil, tapered or aerodynamic shape. The inner wall 2608 in combination with the outer nacelle 2602 can form the first flow passage 2612A and the second flow passage 2612B within the venturi sections 2610A and 2610B, respectively.

The plurality of blades 2606A, 2606B and 2606BB can be positioned in or adjacent the venturi sections 2610A and 2610B. In particular, the blades 2606A can be positioned in or adjacent the first flow passage 2612A and the blades 2606B and 2606BB can be positioned in or adjacent the second flow passage 2612B. The blades 2606B and 2606BB can be spaced apart from one another such as in a vertical arrangement and coupled together via the turbine rotor 2604B. The blades 2606B and 2606BB can differ in a size and/or shape from the blades 2606A. In the example shown, the blades 2606A can be larger (at least longer in length) than the blades 2606B and 2606BB. However, it is contemplated that the blades 2606A could also be larger in other dimensions, and/or can have different airfoil geometry or the like from the blades 2606B and 2606BB.

It should also be noted that the first flow passage 2612A (formed by the venturi section 2610A and the inner wall 2608) can differ in volume (e.g., cross-sectional area, shape etc.) from the second flow passage 2612B (formed by the venturi section 2610B and the inner wall 2608). Such difference in volume can be between 0.1% to 80%, for example. However, such difference in volume is not contemplated in some embodiments.

The slide door 2626 (shown in FIGS. 15B and 15C) can be selectively moveable into or out of the outer nacelle 2602. Multiple positions for the slide door 2626 (e.g., partial insertion) area possible. When selectively moved fully into the outer nacelle 2602, the slide door 2626 can block water flow through a portion of the second flow passage 2612B such that water does not engage and/or load the blades 2606B (see FIG. 15C).

The one or more bypass gates 2630A and 2630B can comprise doors or other selectably openable openings on the outer nacelle 2602 such as in a downstream location of the inlet section 2634 upstream of the venturi sections 2610A and 2610B, respectively.

Figure 15E:
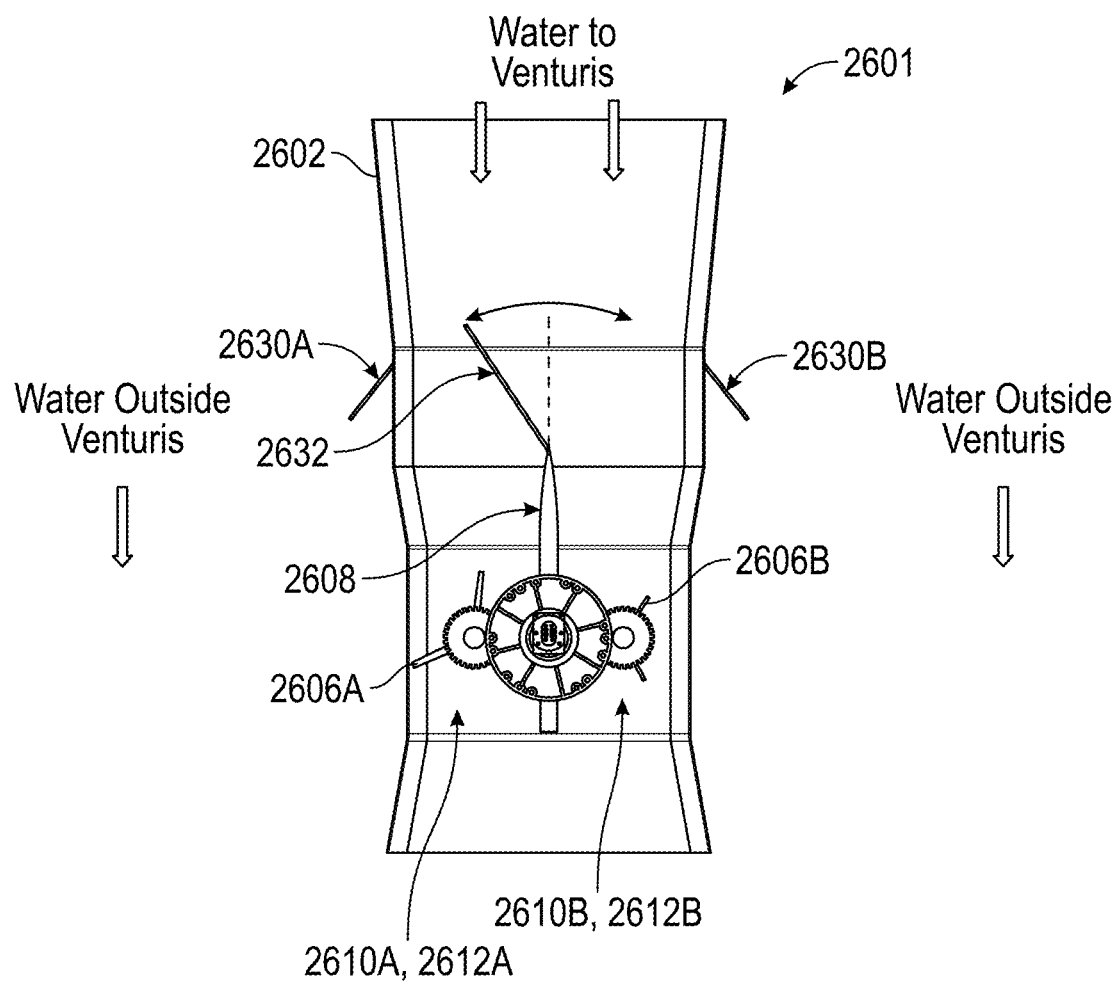
FIG. 15E is a top down view showing the water flow capturing apparatus with the diversion gate articulated to a second position and also showing some of the components of the system of FIG. 15A.
Figure 15F:
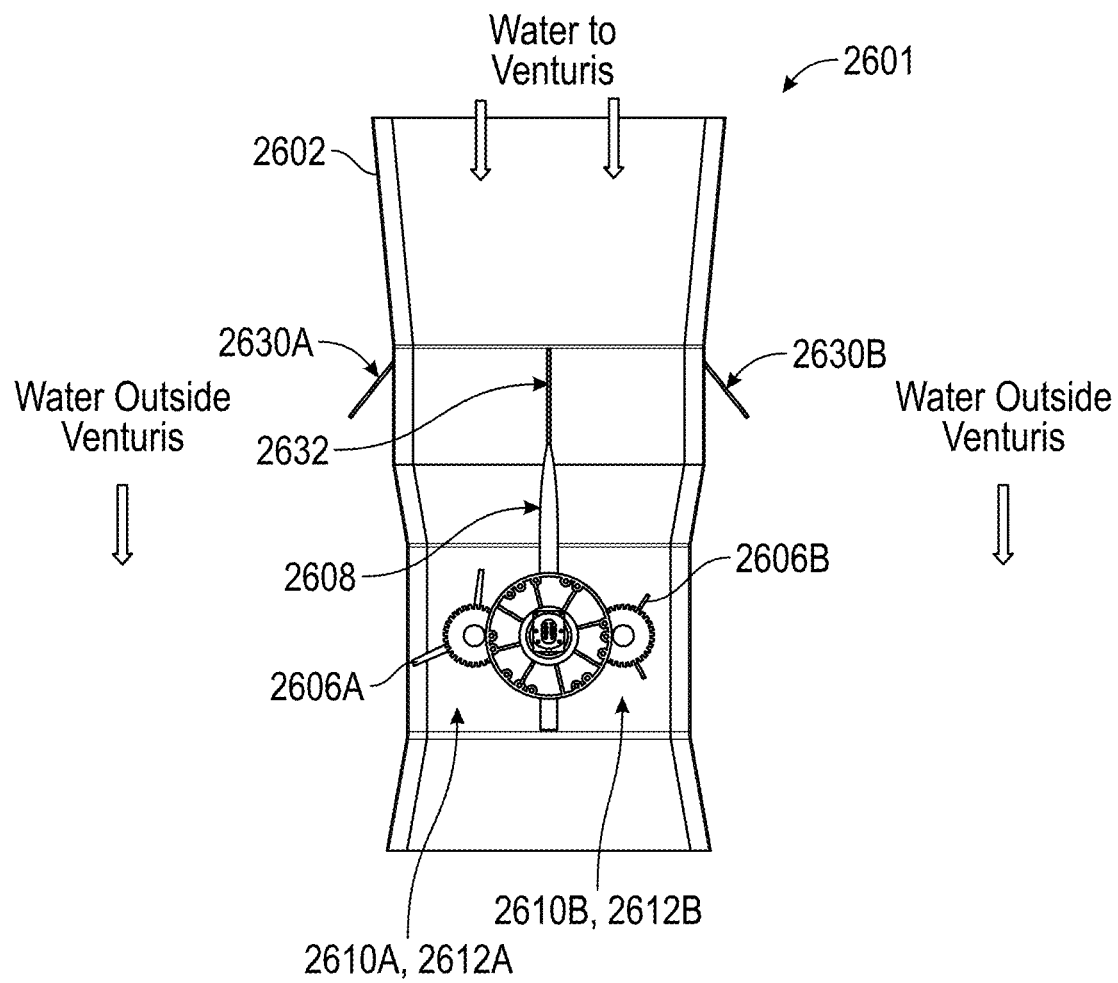
FIG. 15F is top down view showing the water flow capturing apparatus with the diversion gate articulated to a third position and also showing some of the components of the system of FIG. 15A.

The diversion gate 2632 can be articulated to rotate to selectively reduce and/or block flow to one of the first flow passage 2612A or the second flow passage 2612B. The water flow can be directed by the diversion gate 2632 (i.e. diverted away) from one of the flow passage 2612A or the second flow passage 2612B to the other of the flow passage 2612A or the second flow passage 2612B (or out one of the bypass gates 2630A or 2630B). For example, FIG. 15D, the diversion gate 2632 can be positioned by articulation to reduce flow to the second flow passage 2612B and at least some of this flow (excess flow) can be directed by the diversion gate 2632 to the first flow passage 2612A. Alternatively, as shown in FIG. 15E, the diversion gate 2632 can be articulated reduce flow to the first flow passage 2612A and at least some of this flow (excess flow) can be directed by the diversion gate 2632 to the second flow passage 2612B. FIG. 15F shows the diversion gate 2632 can be locked or otherwise held in a neutral position where it does not divert flow between the first flow passage 2612A and the second flow passage 2612B.

The screen 2628 can be placed in or adjacent (in front of) the inlet section 2634 to discourage aquatic animals or debris from entering the water flow capturing apparatus 2601.

The diversion gate 2632, the slide door 2626 and/or the one or more bypass gates 2630A and 2630B can be used in combination to direct flow to load the plurality of blades 2606A, 2606B and/or 2606BB in a manner that maximized power generation given water flow speed through the water flow capturing apparatus 2601. For example, in a low water velocity situation (lowest flow with generation possible situation 1) the one or more bypass gates 2630A and 2630B would be closed. The diversion gate 2632 can be articulated to direct substantially all or most of the water flow into the second flow passage 2612B. The slide door 2626 can also be moved into the outer nacelle 2602 so as to block water flow through a portion of the second flow passage 2612B such that water does not engage and/or load the blades 2606B (see FIG. 15C). Power then in the lowest flow situation would only be from the water flow loading the blades 2606BB.

In a slightly higher water flow velocity situation (situation 2), the slide door 2626 could be removed from within the outer nacelle 2602 (or at least partially removed). This would allow some amount of the flow within the venturi section 2610B to load the blades 2606B in addition to the blades 2606BB.

If water flow velocity were to be further increased (situation 3), the diversion gate 2632 could be articulated to direct some, most or substantially all of the water flow into the first flow passage 2612A to engage the larger blades 2606A. Flow would thus be diverted from the second flow passage 2612B such that blades 2606B and 2606BB would have a reduced loading.

In a further increased water flow velocity situation (situation 4) one or both of the bypass gates 2630A and 2630B could be opened. In yet a further increased water flow velocity situation (situation 5) the bypass gates 2630A and 2630B can be closed and the diversion gate 2632 can be locked or otherwise held in the neutral position to allow water flow to both the first flow passage 2612A and the second flow passage 2612B to the plurality of blades 2606A, 2606B and 2606BB. In a highest flow velocity situation (situation 6), the diversion gate 2632 can remain in the neutral position but one or both of the bypass gates 2630A and 2630B can be opened. In the highest flow velocity situation (situation 6), the water flow can be to both the first flow passage 2612A and the second flow passage 2612B to the plurality of blades 2606A, 2606B and 2606BB.

The above situations 1-6 are exemplary operation modes and it is recognized that other modes of operation are possible. These further modes of operation include diverting flow away from the second flow passage 2612B initially so that flow passes through the first flow passage 2612A to load the blades 2606A should flow velocity or flow conditions dictate. Furthermore, situates where only partial diversion of flow using the diversion gate 2632 such that the first flow passage 2612A and the second flow passage 2612B each receive some flow of water to load the blades are recognized as possible further modes of operation.

Figure 16A:
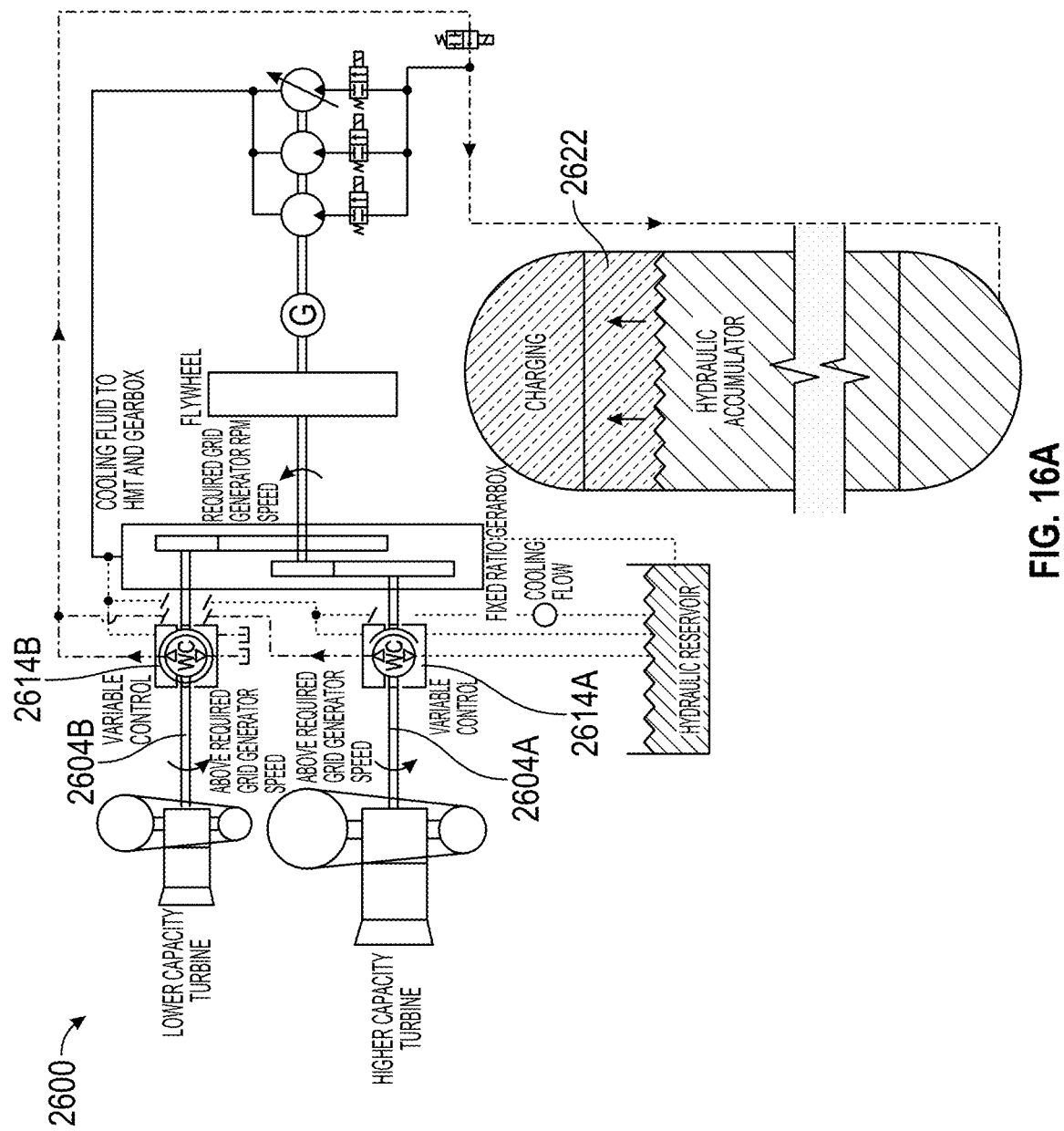
FIG. 16A is a schematic diagram of a tidal estuary power generation, storage and regeneration system similar to FIG. 15A during a power storage (charging) mode of operation.
Figure 16B:
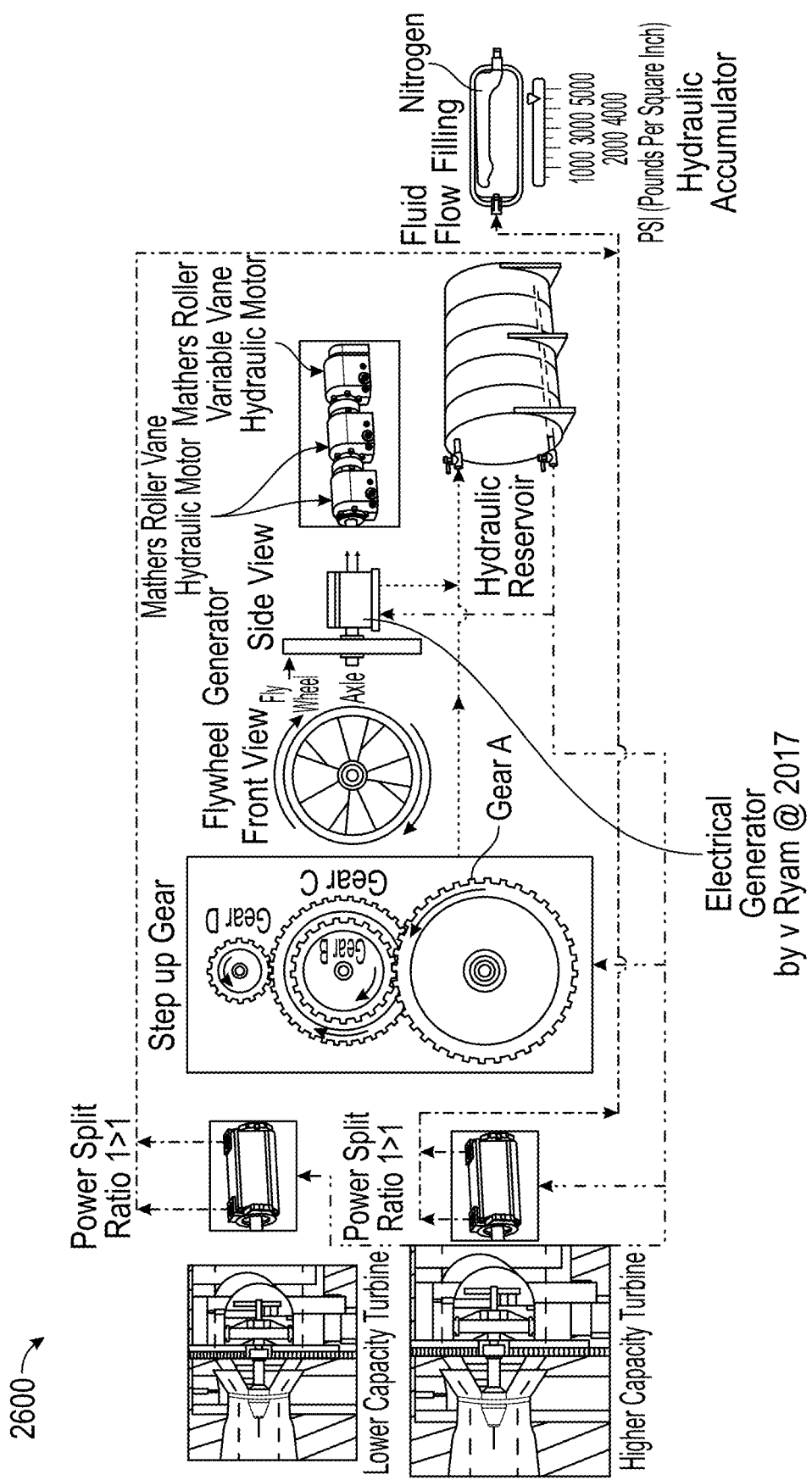
FIG. 16B is a highly schematic illustration of the system of FIG. 16A during the power storage (charging) mode of operation.

FIGS. 16A and 16B show a power storage mode of operation for the system 2600, that can occur in a higher water flow velocity situation (e.g., such as situations 4-6 described above). In this power storage mode, the turbine rotors 2604A and 2604B are rotating at a speed that is above required grid generator speed. The one or more power split transmission couplings 2614A and 2614B can reduce the respective shafts speeds to acceptable rotational speeds for the generator and can act as pumps to divert hydraulic fluid with the excess energy to the one or more accumulators 2622.

Figure 16C:
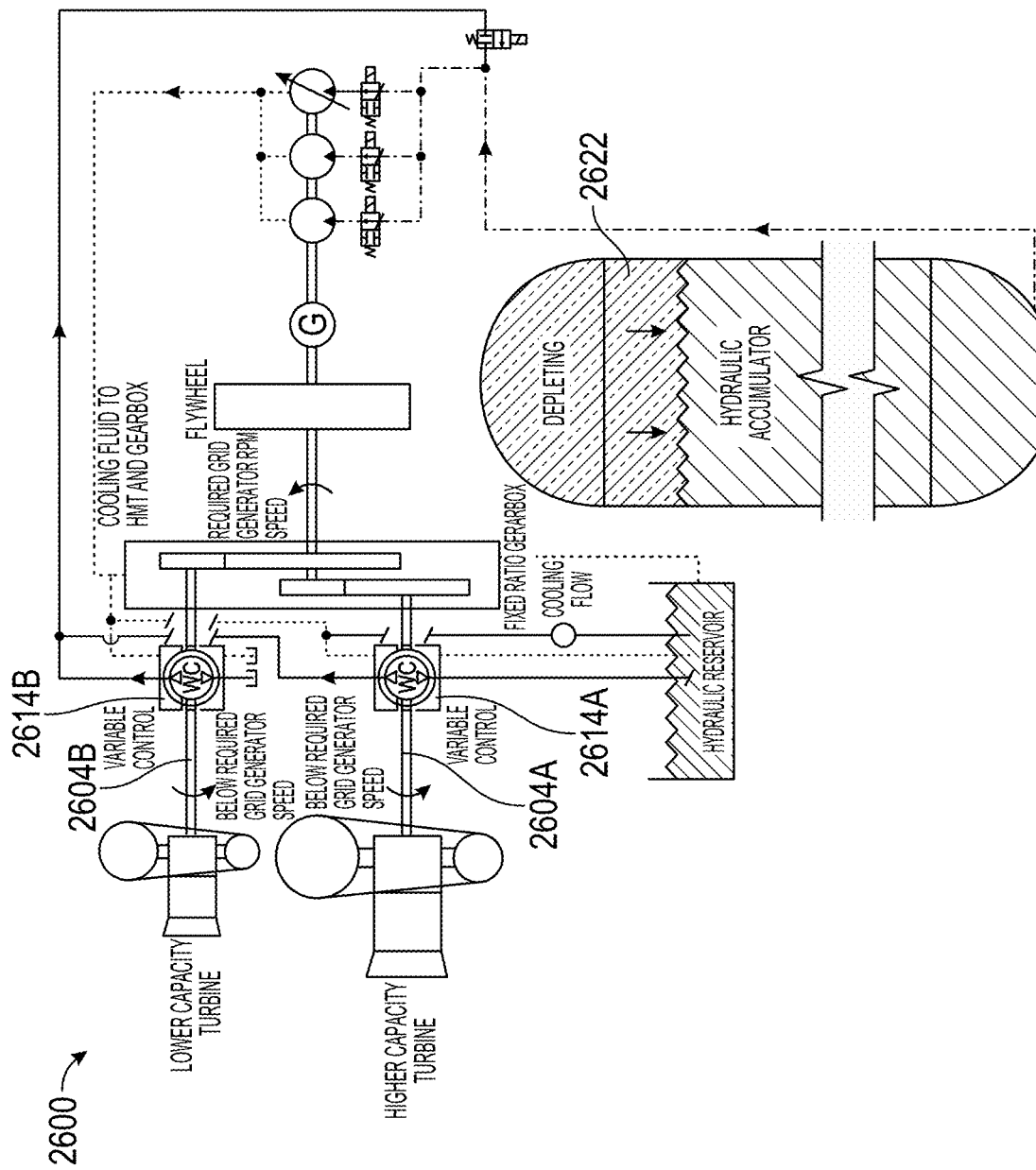
FIG. 16C is a schematic diagram of the system of FIG. 16A during a regeneration (discharging) mode of operation.
Figure 16D:
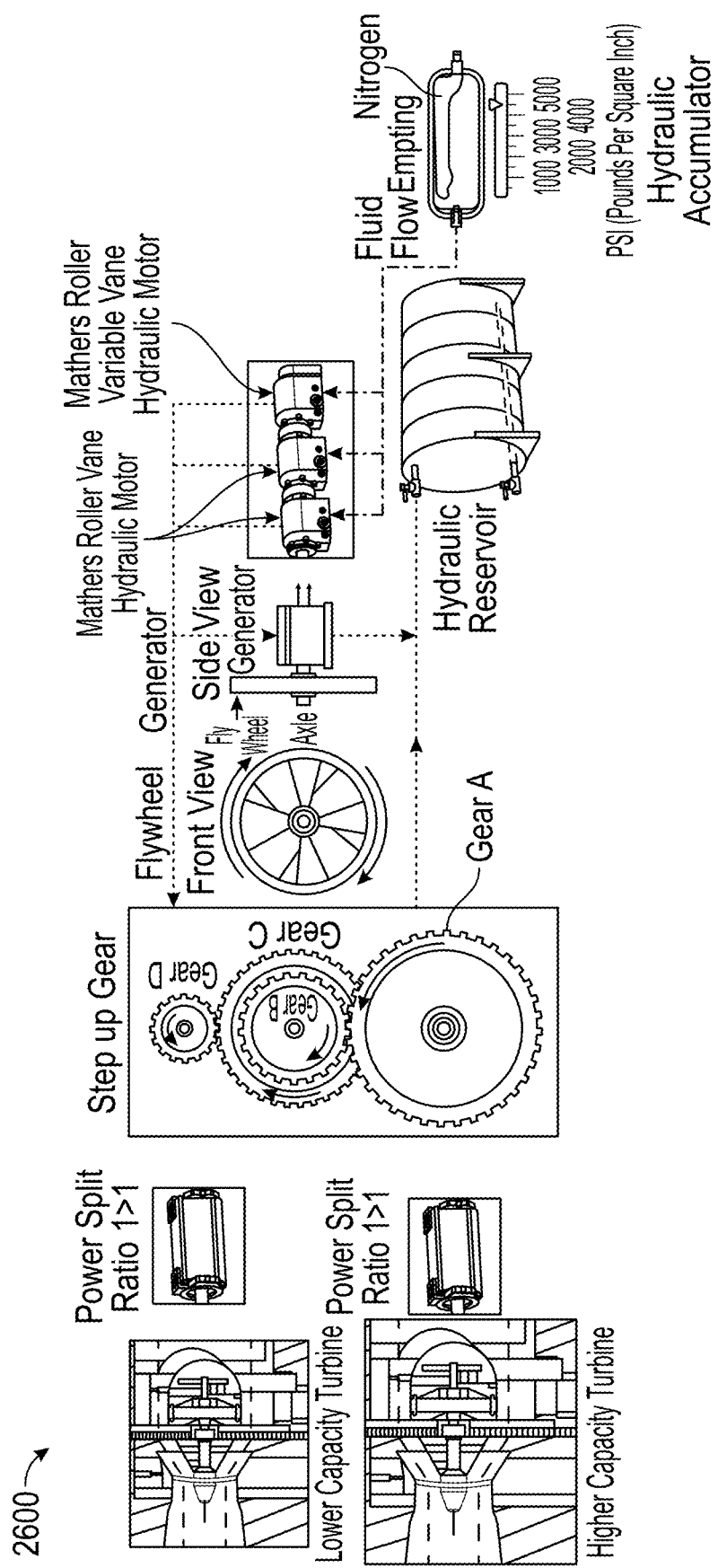
FIG. 16D is a highly schematic illustration of the system of FIG. 16C during the regeneration (discharging) mode of operation.

FIGS. 16C and 16D show a power regeneration mode of operation for the system 2600. This can occur at lowest or lower water flow velocity situation (e.g., situation 1 or situation 0 (insufficient flow velocity-rotors 2604A and 2604B not turning) In the power regeneration mode of operation the one or more accumulators 2622 can be depleted or emptied to power the one or more pump/motors 2620 to turn the one or more generators 2624 at a desired speed.

System 2600 can use sensors. These sensors can comprise tachometers or other type of suitable sensor that can provide sensing along shaft(s) or rotor(s) for the controller. The sensors can be electronic inputs for the controller for the various operation modes discussed subsequently. The controller can be in electrical communication with the plurality of sensors, one or more valves and a plurality of actuators. The sensors can sense aspects of the input and output shafts to the power split transmission coupling, rotors or other shafts in the system 2600. Such aspects can include rotational count, rotational speed of the input and/or output shaft or rotor, acceleration of the input and/or output shaft or rotor, or the like. The one or more valves can be controlled by the controller with input from the plurality of sensors. The one or more valves can send a pilot or other signal to change the operation mode for the power split transmission coupling. Such operation modes and pilot signals are discussed herein and in my prior patents and patent applications incorporated herein by reference. Thus, the controller can control operations of the power split transmission coupling and other components to the various modes of operation discussed herein.

The controller can also control operation of the water flow capturing apparatus 2601 and the system 2600 to operate in the various modes discussed previously herein. To facilitate such control operation, the plurality of actuators can be controlled electrically by the controller.

The plurality of actuators can include the actuator 2610A for the bypass gate 2630A and the actuator for the bypass gate 2630B. The actuator can, at an electronic signal from the controller, open fully, partially close or fully close the bypass gate. Similarly, the actuator can, at an electronic signal from the controller, open fully, partially close or fully close the bypass gate 2630B. The actuator can, at an electronic signal from the controller, open fully, partially close or fully close slide door 2626. The actuator can, at an electronic signal from the controller, actuate movement of the diversion gate 2632 as previously described.

Figure 17A:
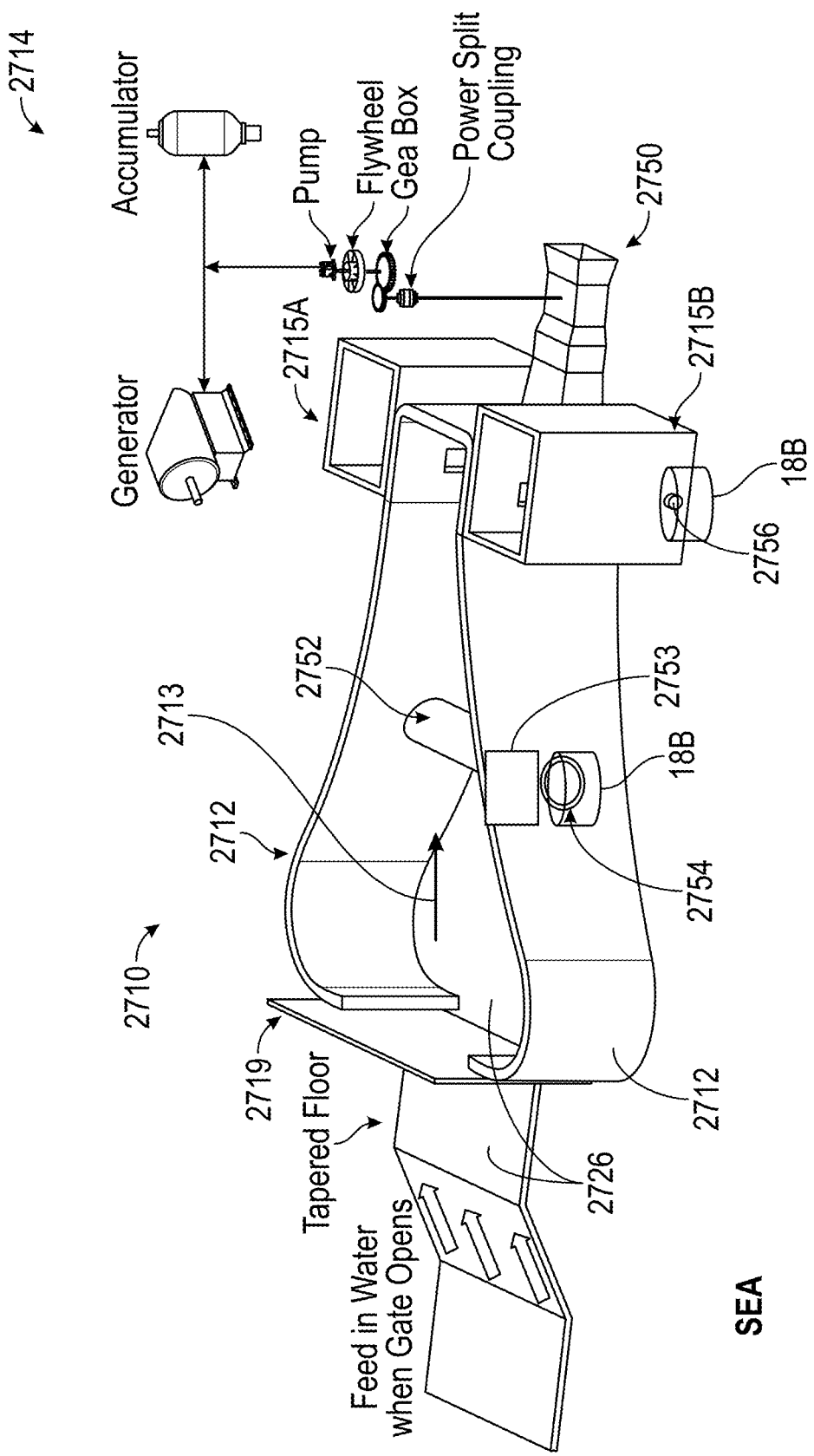
FIG. 17A is a perspective view of a tidal estuary power generation, storage and regeneration system according to an example of the present application.
Figure 17B:
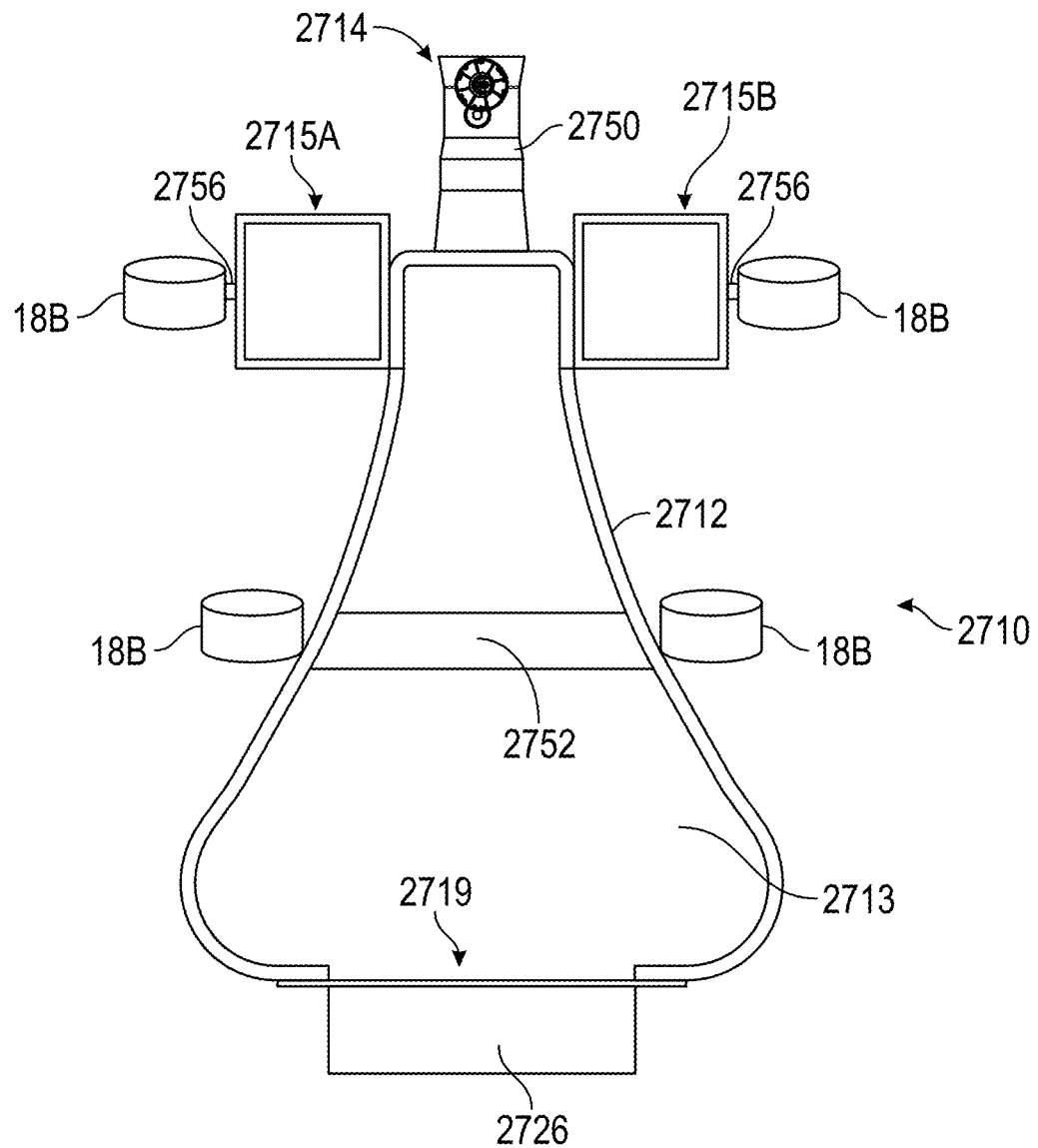
FIG. 17B is a plan view of the tidal estuary power generation, storage and regeneration system of FIG. 17A.
Figure 17C:
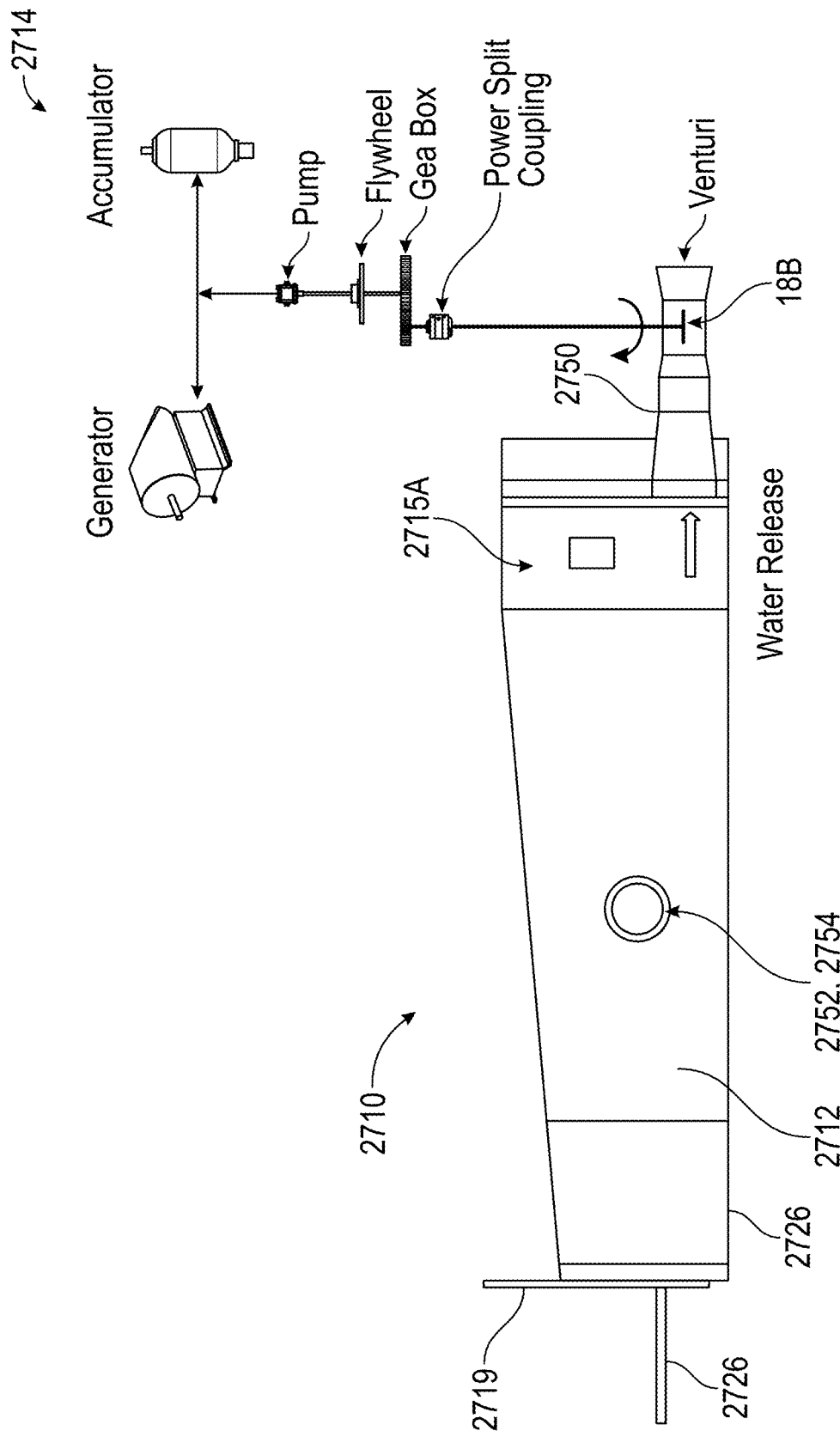
FIG. 17C is a cross-sectional view of the tidal estuary power generation, storage and regeneration system of FIG. 17A.

FIGS. 17A-17C shows a man-modified or man-created estuary 2710 with a construction similar to the estuary 10 described in FIG. 1 but modified. Some modifications are to add some additional components and features as will be discussed herein including a modified version of the water flow capturing apparatus 2601 (FIGS. 15A-16D) as further discussed herein.

The estuary 2710 can have walls 2712 that form a bank with an exemplary shape that funnels and magnifies incoming tidal flow along a flow channel 2713 to dam/reservoir 2715A, dam/reservoir 2715B and/or to a water flow capturing apparatus 2750. Estuary 2710 can be located partially-onshore, off-shore such as on a tidal shelf, adjacent the shoreline (formed by mainland, island, reef or the like) or another suitable location as previously discussed. The shape of the flow channel 2713 and wall 2712 shown is exemplary and is contemplated to be modified (other examples are provided). However, the walls 2712 can be convex or otherwise gradually curved narrowing toward one another to restrict the flow channel 2713 as shown according to one example. The shape can differ from the pear shape illustrated. Portions of the wall 2712 may or may not be modified by human activity according to some examples. Indeed, the entire wall 2712 can be created by human activity in some examples. The wall 2712 can thus be formed by concrete, steel, wood, stone, brick, rock, piled sand, etc. In some cases, portions or all of the wall 2712 may not be modified by human activity. The flow channel 2713 can thus be formed of natural materials (e.g., sand, rock, etc.) that formed from the ocean floor or other material that is man-made or man-modified for example.

In FIGS. 17A-17C, the wall 2712 has the reduced cross-sectional regions leading to the reservoirs 2715A, 2715B and the water flow capturing apparatus 2750 in order to better magnify tidal in flow. The modified estuary 2710 includes a power generation system 2714 that communicates with power generation systems such as a power grid, generator(s), battery stations, accumulators, hydrogen production facilities, etc. The power generation system 2714 can include components similar to the systems 14 and 2600 described previously. Additionally, the power generation system 2714 can include water turbines 18B powered by flow from a water pipe 2752, the dam/reservoir 2715A and/or the dam/reservoir 2715B in addition to (or in alternative to) the water flow capturing apparatus 2750.

Thus, the power generation system 2714 include one or more turbines, in particular, one or more water turbines 18B as described previously. Wind, floating and other power generation apparatuses (e.g., wind turbines, etc.) can also be utilized but are not specifically shown.

FIGS. 17A-17C estuary 2710 differs from the estuary 10 of FIG. 1 in that it does not include an obstruction. Rather, a mouth of the estuary 2710 is open to ocean and faces outward to the ocean. A gate 2719 can be utilized to close off the estuary 2710 and retain tidal water within the estuary 2710 as further described. The gate 2719 can be selectively opened and closed to open or block the mouth of the estuary 2710. Together the walls 2712 and the gate 2719 can form an enclosure that is the estuary 2710. The gate 2719 (and other gates/doors discussed herein) can be hydraulically operated, for example.

FIG. 17A shows an artificial shelf or floor 2726 can be utilized within or adjacent the estuary 2710 as previously discussed in FIGS. 3A-3C, for example. This floor 2726 can be a tapered, raised or otherwise modified from the ocean floor to increase the height of tidal flow into the estuary 2710, for example. The estuary 2710 itself can have a man-modified floor such as a false floor as previously described herein.

FIGS. 17A-17C include some additional features or modifications from previously described devices and/or systems that will now be discussed. The estuary 2710 includes a water pipe 2752. This water pipe 2752 can selectively communicate with the flow channel 2713. The water pipe 2752 can have doors/gates 2753, etc. that can be opened or selectively closed to the flow channel 2713 volume within the estuary 2710. Similarly, doors/gates can be placed within or adjacent the water pipe 2752 such as adjacent or at an outlet 2754 therefrom. In this manner, the water pipe 2752 with doors/gates closed can hold/retain a volume of water for use as desired in the manner of a dam or reservoir similar to the dam/reservoir 2715A and/or the dam/reservoir 2715B. The water pipe 2752 can have the outlet 2754 at an exterior of the wall 2712 of the estuary 2710.

Additionally, one or more water turbines 18B can be placed within or adjacent the outlet 2754 to the water pipe 2752. The water pipe 2752 can be constructed of concrete, steel or other suitable materials. The location of the water pipe 2752 relative to a height of the walls 2712 can vary from example to example and by a relative position within the estuary 2710 (e.g., relatively closer to the gate 2719 v. the water flow capturing apparatus 2750). Although the outlet 2754 is shown midway between a top of the wall 2712 and the floor 2726 of the estuary 2710, this position is purely exemplary. The outlet 2754 can be adjacent or at the floor 2726, for example. Although a single water pipe 2752 is shown in FIGS. 17A-17C, the present invention contemplates the multiple of such pipes at different locations and different relative heights v. the floor 2726 can be utilized.

FIGS. 17A-17C contemplate the use of one or more water turbines 18B positioned at outlet 2756 from the dam/reservoir 2715A and/or the dam/reservoir 2715B as further discussed in regard to FIG. 22.

The water flow capturing apparatus 2750 can have a housing formed by the outer nacelle 2602 as discussed in prior embodiments. This outer nacelle 2602 can be shaped to form a venturi in the region of a water turbine 18B (FIG. 17C). This water turbine 18B can be positioned within the outer nacelle 2602 in or adjacent the venturi. Gate/Door can regulate the flow of captured tide from the estuary 2710 to the water flow capturing apparatus 2750. The water flow capturing apparatus 2750 can be positioned at a most restricted narrowest cross-sectional area location of the estuary 2710, for example. This can be adjacent the dam/reservoir 2715A and/or the dam/reservoir 2715B. However, other locations for the water flow capturing apparatus 2750 such as at the outlets 2756 from the dam/reservoir 2715A and/or the dam/reservoir 2715B and/or the outlet 2754 from the water pipe 2752 are also contemplated.

The power generation system 2714 has many of the components discussed previously, and thus, these will not be discussed in great detail. In some cases, the power generation system 2714 can have the same construction as the power generation system 2600 described previously. However, it is also contemplated that only a single water turbine 18B with a single rotor may be utilized with the power generation system 2714 and the water flow capturing apparatus 2750. This can reduce or otherwise change the number of shafts, the number of power split couplings, the number of gears for the gearbox and the number of flywheels used by the power generation system 2714 as compared with the power generation system 2600.

Figure 18:
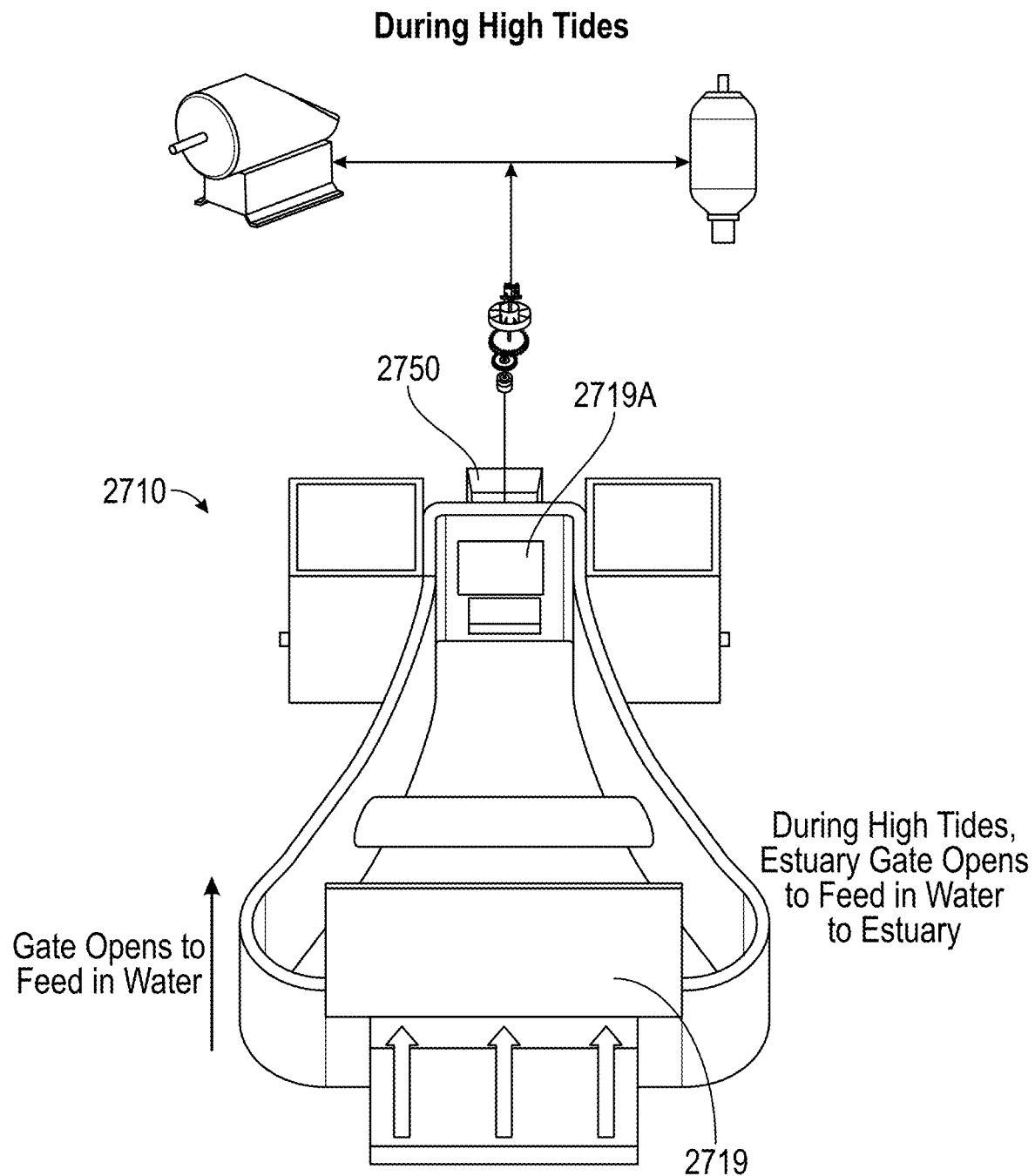
FIG. 18 shows operation of the tidal estuary power generation, storage and regeneration system of FIG. 17A during a high tide.

FIG. 18 shows the estuary 2710 as previously described during a high tide. The estuary 2710 gate 2719 can be opened to allow tidal flow to enter the estuary 2710. A gate 2719A to the water flow capturing apparatus 2750 can be opened or closed as desired. Similarly, gates to the dam/reservoir 2715A and/or the dam/reservoir 2715B can be opened or closed as desired.

Figure 19:
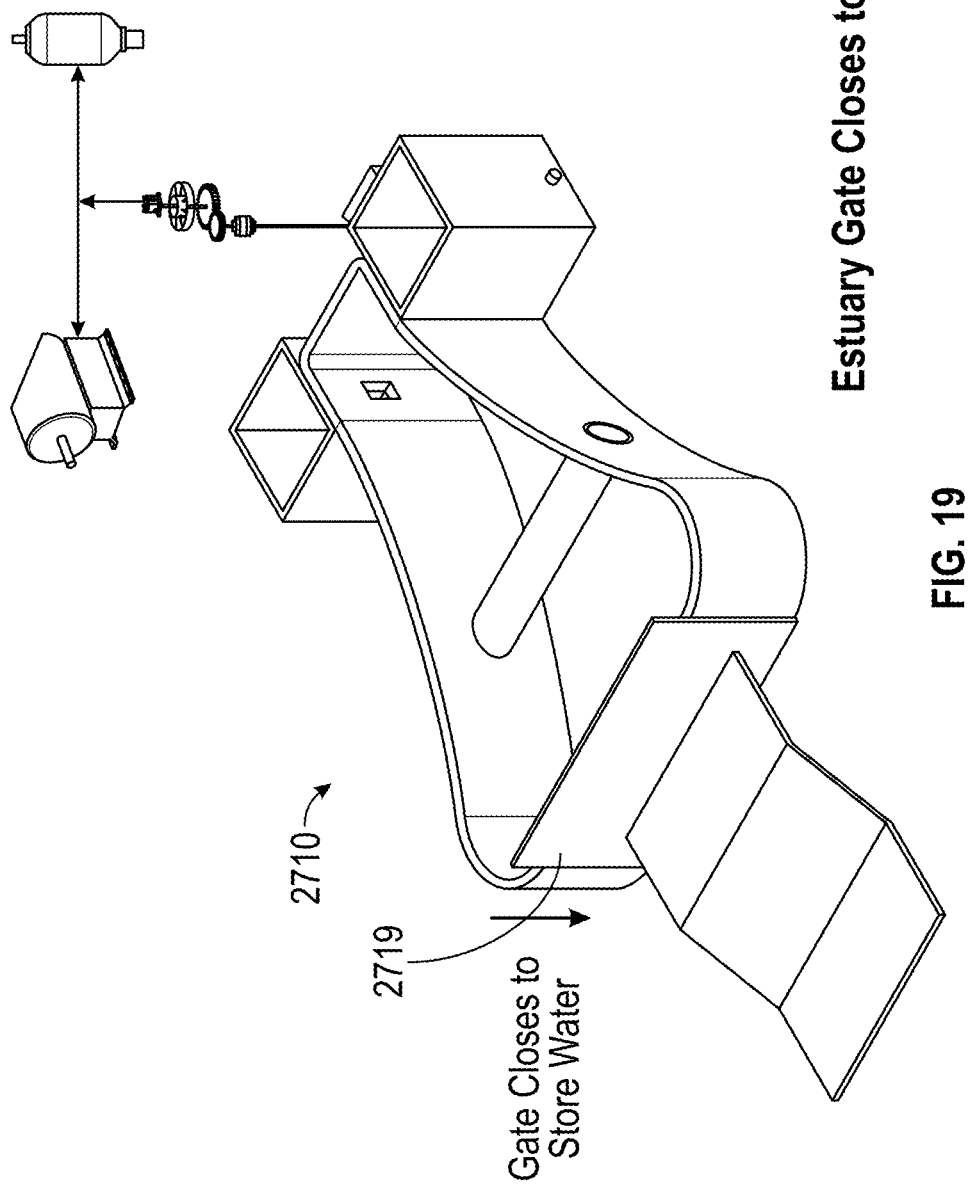
FIG. 19 shows operation of the tidal estuary power generation, storage and regeneration system of FIG. 17A during a low tide to capture water.

FIG. 19 illustrates that during low tides (or indeed during neap or after full high tide) the gate 2719 to the estuary 2710 can be selectively closed to trap and store water within estuary 2710.

Figure 20:
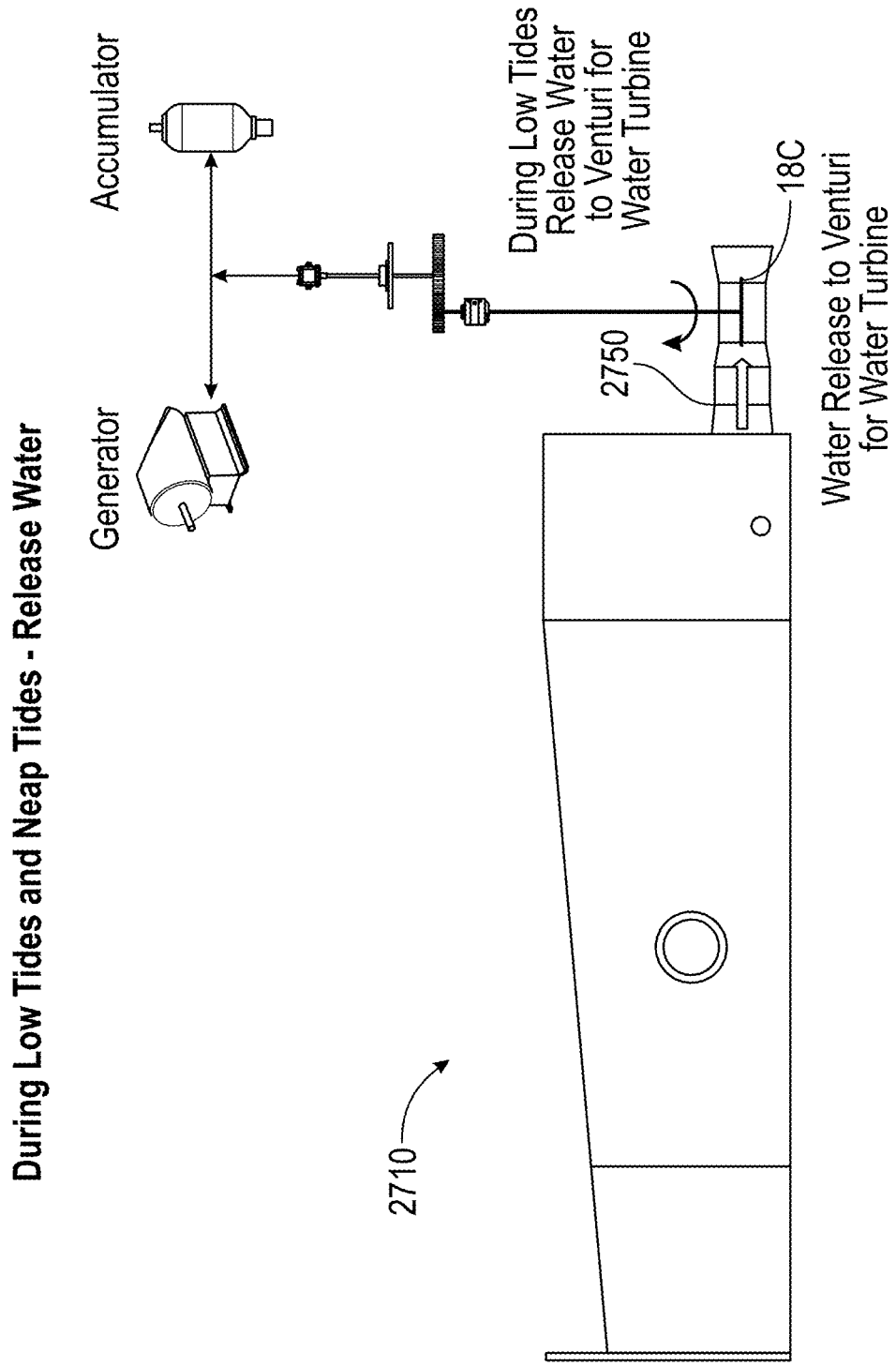
FIG. 20 shows operation of the tidal estuary power generation, storage and regeneration system of FIG. 17A during a low tide and/or neap tides to release water.

As shown in FIG. 20, during low tides and/or neap tides water that has been captured in the estuary 2710 can be released in a controlled manner. For example, the captured tidal water can be released to the water flow capturing apparatus 2750 to turn the water turbine 18B. Flow of the tidal water to the water flow capturing apparatus 2750 can be selectively controlled with the gate/door 2719A (FIG. 18), for example. As an example, during low tides water can be released from the estuary 2710 to the water flow capturing apparatus 2750 or to another or the water turbines 18B (e.g., at the outlet to the dam/reservoir 2715A and/or the dam/reservoir 2715B and/or the water pipe 2752). During neap tides, half or so of the volume of the estuary 2710 can be fed to and through the water flow capturing apparatus 2750. A new neap tide can replenish or maintain the water level within the estuary 2710 so that the flow of the tide to and through the water flow capturing apparatus 2750 can be continued. As discussed previously, water flow to/from the estuary 2710 can be controlled as desired by the grid master to achieve power generation during peak periods of power use. Power storage and regeneration discussed herein are also contemplated for supplementing/saving power for use as needed.

Figure 21:
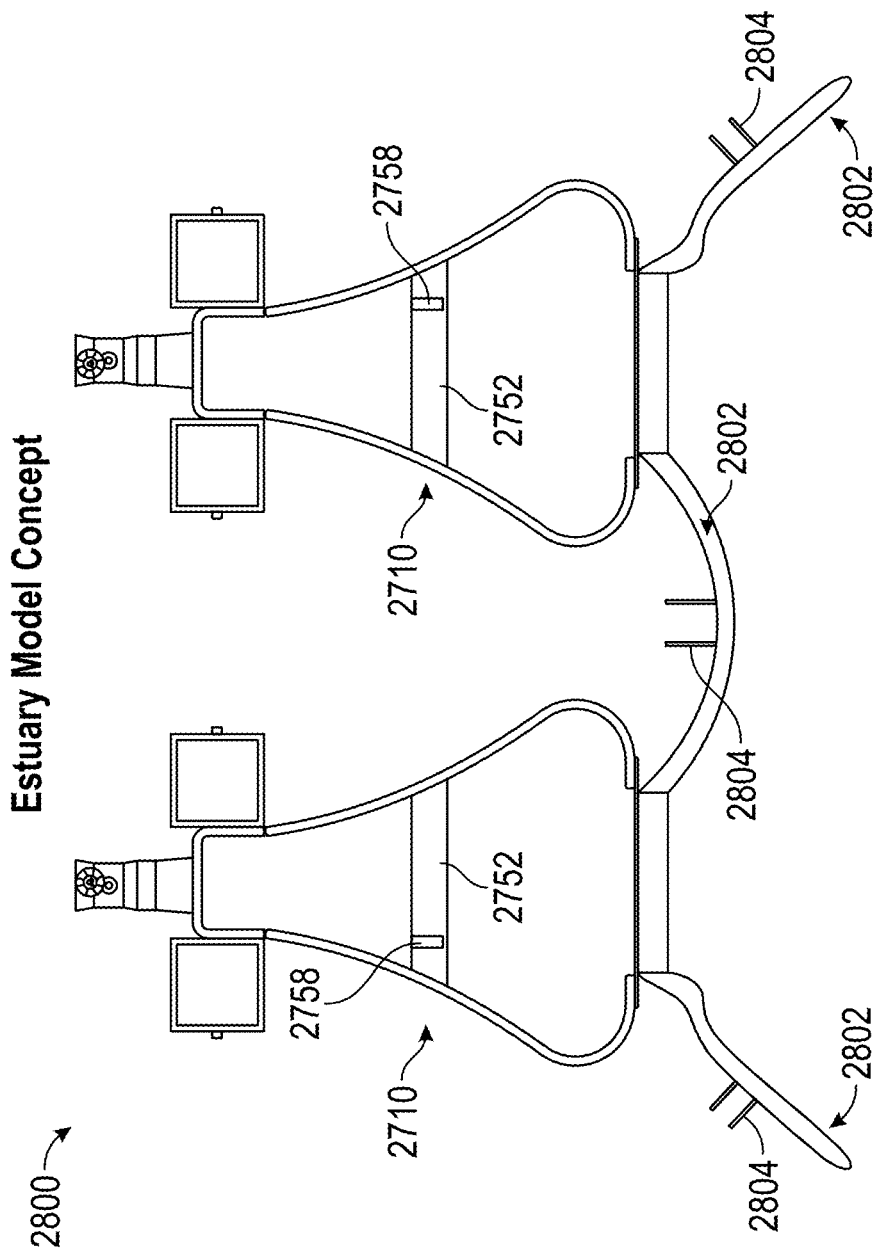
FIG. 21 is a highly schematic view of a system of several tidal estuaries with the tidal estuary power generation, storage and regeneration system of FIG. 17A.

FIG. 21 shows a system 2800 of several of the estuaries 2710 previously described arranged or connected together. Exterior walls 2802 can be utilized to link the estuaries 2710 together an funnel incoming tidal flow into the respective estuaries 2710. This system 2800 with the exterior walls 2802 can capture further incoming tidal flow. Safety gates 2804 can be provided in the exterior walls 2802 as required to allow for bypass of flow in case of hurricane, cyclone or other extreme weather event that would otherwise produce storm surge that could damage the exterior walls 2802 and/or the estuaries 2710. FIG. 21 additionally shows doors/gates 2758 on the water pipe 2752 within the estuaries 2710 that can be selectively opened and closed as desired.

FIG. 22 shows a process of filling and emptying one of the dam/reservoir 2715A and/or the dam/reservoir 2715B of the estuary 2710 (FIGS. 17A-21). A similar process using a drum was previously described in regard to FIG. 4 of the present application. However, FIG. 22 provides further details regarding timing, etc. The dam/reservoir 2715A and/or the dam/reservoir 2715B with the drum that can be selectively raised and lowered within the reservoir to alter a height of the water within the reservoir using displacement and water held by the drum.

As shown in FIG. 22, the drum 2900 can be placed on a hydraulic actuator 2902. Hydraulic actuator 2902 can be operated by pressure from an accumulator (see FIGS. 15A-17C) or other pressure vessel, for example. During low tides the dam/reservoir 2715A and/or the dam/reservoir 2715B can be drained to empty (see step (1) to viewer's left). During high tides (with estuary 2710 full or filling) the dam/reservoir 2715A and/or the dam/reservoir 2715B and the drum 2900 can be filled as shown in step (2). Water off flow from the dam/reservoir 2715A and/or the dam/reservoir 2715B can rotate the water turbine 18B as previously described. Buoyance of the drum 2900 along with the hydraulic actuator 2902 can raise the drum 2900 to the position of step 3. When tides reduce (as shown in step 3), water level in the dam/reservoir 2715A and/or the dam/reservoir 2715B reduces. However, by hydraulically selectively lifting and/or lowering the drum 2900 with the hydraulic actuator 2902, water level within the dam/reservoir 2715A and/or the dam/reservoir 2715B can be selectively displaced higher or lower so as to maintain a desired flow velocity to the water turbine 18C. Water captured by the drum 2900 during filing in the high tide can also be selectively emptied into the dam/reservoir 2715A and/or the dam/reservoir 2715B to change the water level therein as desired. As shown in step (4), once the drum 2900 is emptied it can be lowered to again raise the water level within the dam/reservoir 2715A and/or the dam/reservoir 2715B by displacement allowing for a higher flow velocity to the water turbine 18C.

Figure 23:
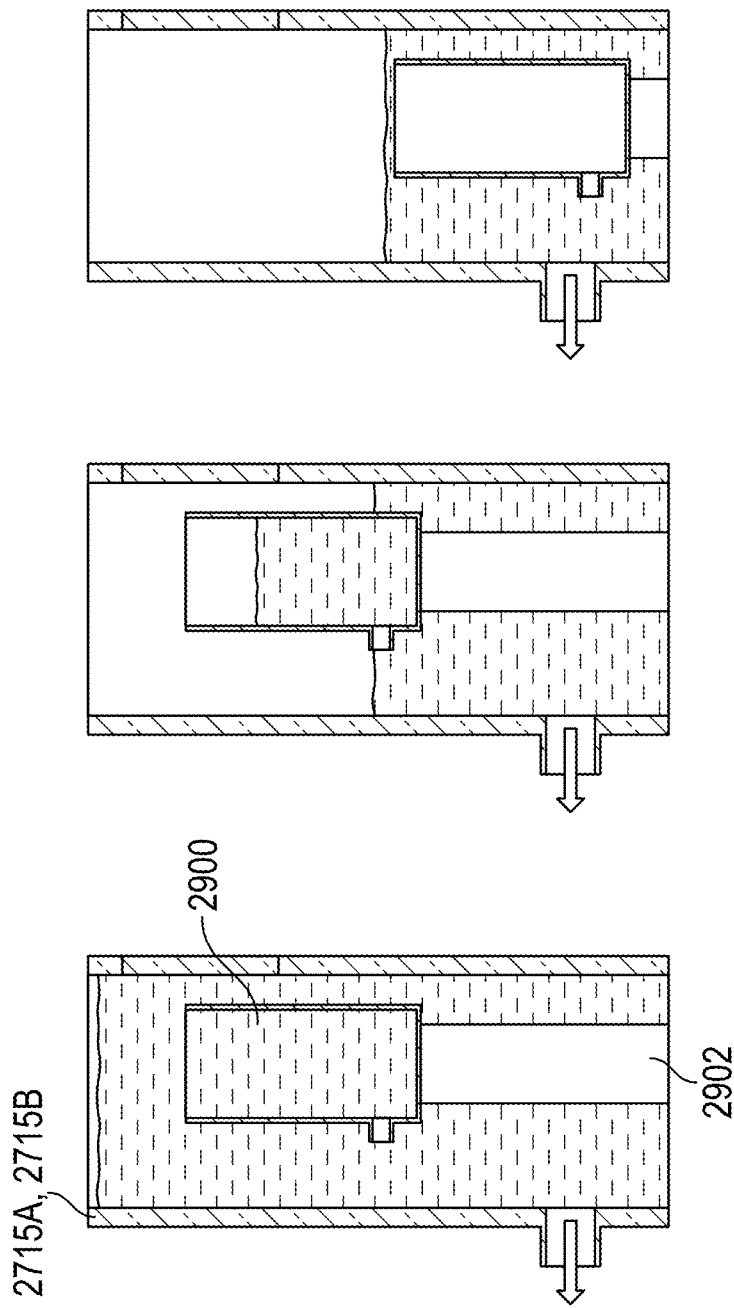
FIG. 23 is a schematic illustration of another process of filling and emptying a reservoir with a drum that can be selectively raised and lowered within the reservoir to alter a height of the water within the reservoir.

FIG. 23 shows an alternative process of filling and emptying one of the dam/reservoir 2715A and/or the dam/reservoir 2715B of the estuary 2710 (FIGS. 17A-21). The process of FIG. 23 differs from that of FIG. 22 in that the hydraulic actuator 2902 need not raise a full drum 2900. Rather, the drum 2900 can be filled during a high tide with the actuator 2902 at an extended position. As the tide reduces as the water level within the dam/reservoir 2715A and/or the dam/reservoir 2715B falls, the drum 2900 can be lowered selectively into the volume of the dam/reservoir 2715A and/or the dam/reservoir 2715B to displace the water level higher. Eventually, the water within the drum 2900 can be emptied to again to increase the water level of the dam/reservoir 2715A and/or the dam/reservoir 2715B. The empty drum may float freely or remain coupled to the hydraulic actuator 2902 near a top of the water level within the dam/reservoir 2715A and/or the dam/reservoir 2715B and can eventually return to a lowered position with the hydraulic actuator 2902 in a lowered state as shown to the viewer's far right. The empty drum 2900 is then ready to be lifted again by the hydraulic actuator 2902 to the raised/extended position for high tide filling as shown in the image to the viewer's left.

FIGS. 22 and 23 show the process whereby the dam/reservoir 2715A and/or the dam/reservoir 2715B can be controlled to start exhausting water as it falls generating power so power output is semi-stable to and from the water turbine 18B. When the water level falls and flow of water slows, the process can start lowering the drum 2900 and/or emptying water from the drum 2900 so though the volume has fallen the water height and thus power remains elevated.

Figure 24A:
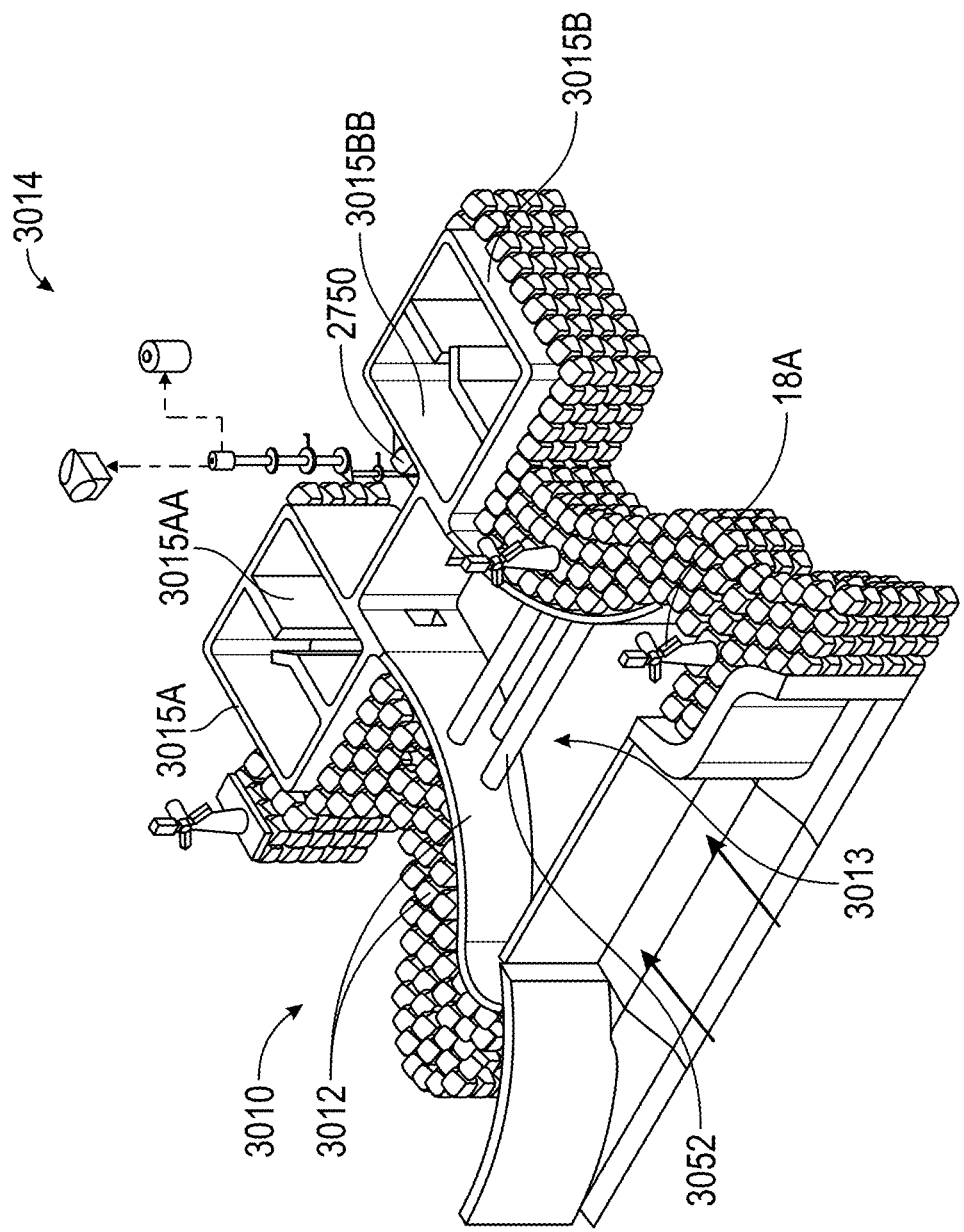
FIG. 24A is a perspective view of a tidal estuary power generation, storage and regeneration system according to an example of the present application.
Figure 24B:
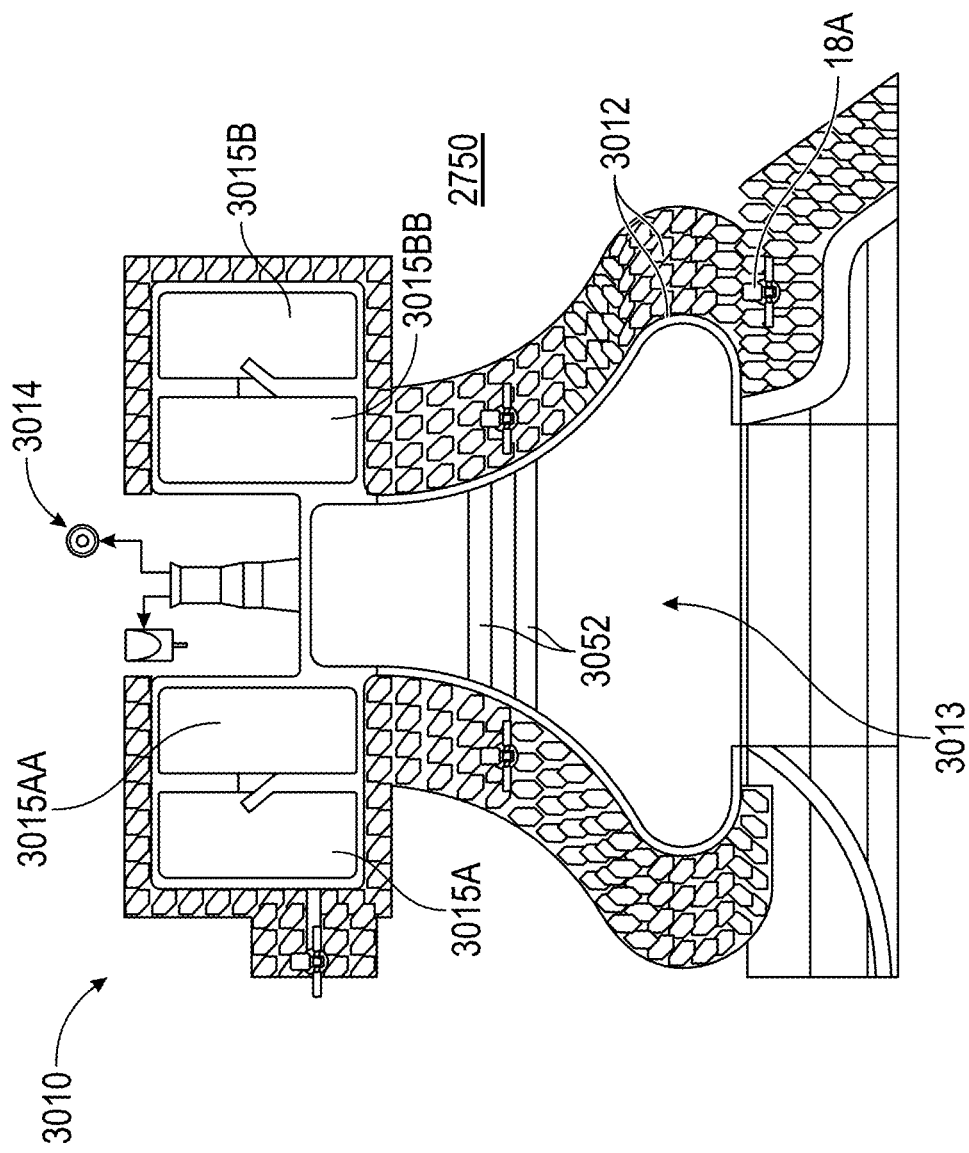
FIG. 24B is a plan view of the tidal estuary power generation, storage and regeneration system of FIG. 24A.
Figure 24C:
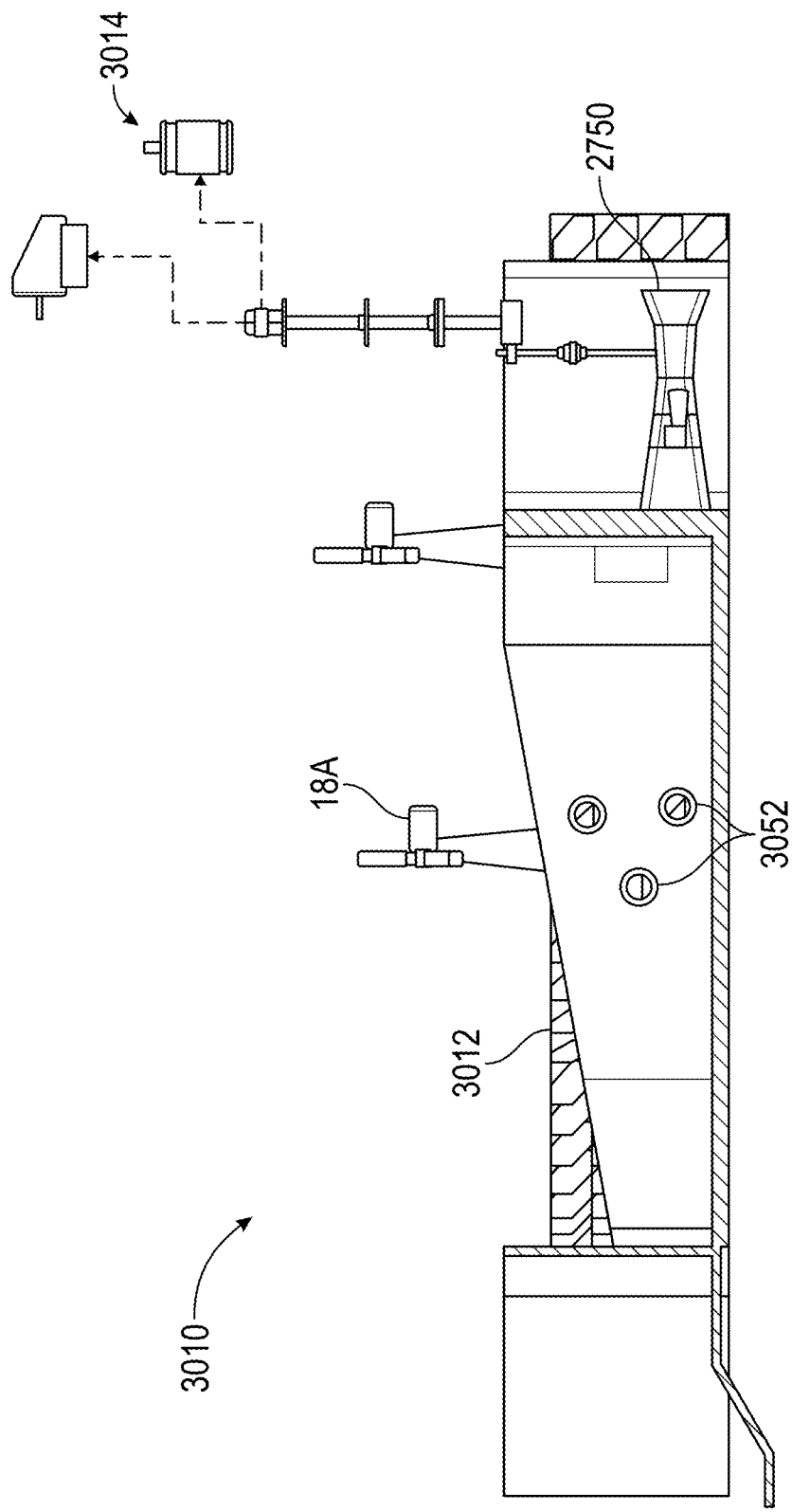
FIG. 24C is a cross-sectional view of the tidal estuary power generation, storage and regeneration system of FIG. 24A.

FIGS. 24A-24C shows a man-modified or man-created estuary 3010 with a construction similar to the estuary 10 and estuary 2710 described in FIGS. 1 and 17A-17C but modified. Primary modification is to add additional dam/reservoirs 3015A, 3015AA and/or dam/reservoir 3015B, 3015BB as will be discussed herein further discussed herein. However, additional modifications such as adding multiple water pipes 3052 are also contemplated.

The estuary 3010 can have walls 3012 that form a bank with an exemplary shape as previously show for the walls 2712 of FIGS. 17A-17C. This shape funnels and magnifies incoming tidal flow along a flow channel 3013 to the dam/reservoir 3015A, dam/reservoir 3015AA, dam/reservoir 3015B, dam/reservoir 3015BB and/or to a water flow capturing apparatus 2750. FIGS. 24A-24C show the walls 3012 can be made of multiple materials such as rock and steel, for example. Wind turbines 18A can be mounted to various portions of the estuary such as the walls 3012, the dam/reservoir 3015A, dam/reservoir 3015B, etc.

In FIGS. 24A-24C, the modified estuary 3010 includes a power generation system 3014 that communicates with power generation systems such as a power grid, generator(s), battery stations, accumulators, hydrogen production facilities, etc. The power generation system 3014 can include components similar to the systems 14, 2600, 2700 described previously. Additionally, the power generation system 3014 can include water turbines powered by flow from the water pipes 3052, the dam/reservoir 3015A, dam/reservoir 3015AA, dam/reservoir 3015B, dam/reservoir 3015BB in addition to (or in alternative to) the water flow capturing apparatus 2750.

The power generation system 3014 components will not be discussed in great detail but can include multiple flywheels similar to the system 2600 of FIGS. 15A-16D. The power generation system 3014 can include, for example, the water turbines, the water flow capturing apparatus 2750, shafts, power split coupling, first flywheel, second flywheel, pump motor, accumulator and generator.

Dam/reservoir 3015A and the dam/reservoir 3015AA can communicate with one another selectively via passage 3018A. Dam/reservoir 3015B and the dam/reservoir 3015BB can communicate with one another selectively via passage 3018B. The passage 3018A can be selectively closed (e.g., by a door) so that each dam/reservoir 3015A and the dam/reservoir 3015AA can be individually drained and refilled including using drum(s) in the manner of the dam/reservoirs previously discussed herein. The passage 3018B can be selectively closed (e.g., by a door or gate as shown) so that each dam/reservoir 3015B and the dam/reservoir 3015BB can be individually drained and refilled including using drum(s) in the manner of the dam/reservoirs previously discussed herein. This use of further dam/reservoirs (as compared with the previous designs shown in prior Figures) provides further opportunity to meter and control power generation through off-flow from the dam/reservoir 3015A, dam/reservoir 3015AA, dam/reservoir 3015B and/or dam/reservoir 3015BB.

Figure 25:
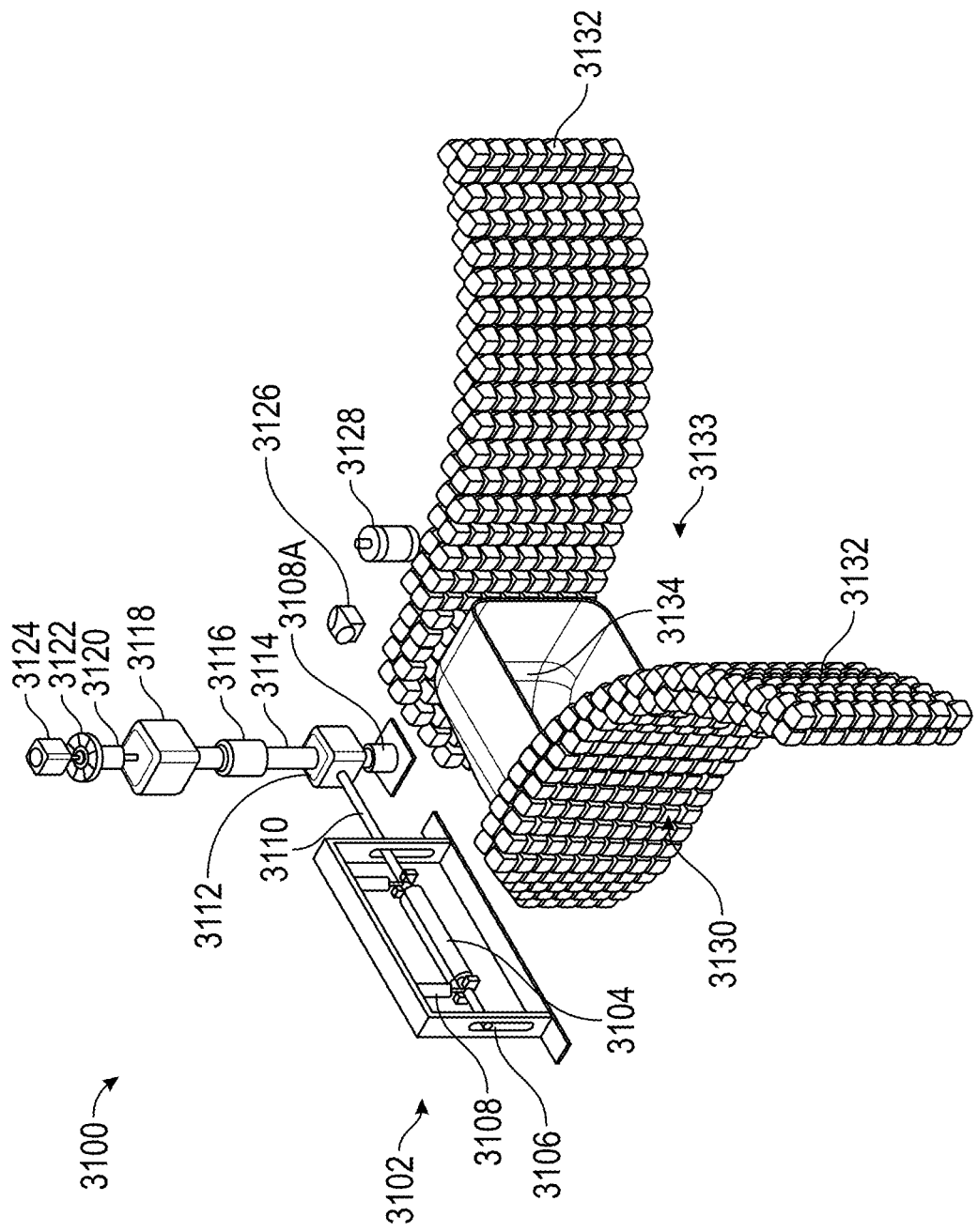
FIG. 25 is a perspective view of a wave power generation system including a water wheel and other components and features according to an example of the present application.

FIG. 25 shows a system 3100 for wave power generation. The system 3100 can include an assembly 3102 including a water wheel 3104, a frame 3106, cylinder(s) 3108 and 3108A, shaft 3110, differential 3112, male spline shaft 3114, female spline shaft 3116, gear box 3118, power split coupling 3120, flywheel 3122, pump motor 3124, generator 3126 and accumulator 3128. The system 3100 can additionally include a wave guide assembly 3130 that includes walls 3132, a channel 3133 and a venturi 3134.

The system 3100 and the assembly 3102 can be constructed in a manner similar to that of the systems and assemblies including the water wheel described in my pending U.S. Provisional Patent Application No. 63/432,245, entitled IN-AND-OUT WAVE CAPTURE APPARATUS SYSTEM AND PROCESS, filed Dec. 13, 2022 previously incorporated by reference herein.

The water wheel 3104 can be coupled to and can be rotatable relative to the frame 3106 via the cylinders 3108. The cylinders 3108 can be extendible or retractable in a telescoping manner to adjust a position of the water wheel 3104 to meet a height of the wave. The cylinders 3108 can be adjusted in height via a controller that communicates with one or more buoy mounted sensors as discussed in my pending U.S. Provisional Patent Application No. 63/432,245. The shaft 3110 can be coupled to and can be turned by the water wheel 3104 when rotated by wave action striking paddles of the water wheel 3104. The shaft 3110 can couple with the differential 3112. The differential 3112 and other components (e.g., the shaft 3110, male spline shaft 3114, female spline shaft 3116, gear box 3118, power split coupling 3120, flywheel 3122, pump motor 3124, etc.) can be supported on the cylinder 3108A, which can be raised and lowered relative to ocean floor or another structure depending upon wave action, tide, etc. The differential 3112 can be a 90 degree differential, for example and can be coupled to the male spline shaft 3114 or another shaft or component, for example. The male spline shaft 3114 can connect with the female spline shaft 3116. The female spline shaft 3116 can couple with the gear box 3118. A shaft or other coupling can connect the power split coupling 3120 with the gear box 3118. Shaft(s) (some not explicitly shown) can connect the flywheel 3122, pump motor 3124, generator 3126 and accumulator 3128 with the power split coupling 3120.

The assembly 3102 may or may not be utilized in combination with the wave guide assembly 3130. The assembly 3102 need not be positioned adjacent a wall or other obstruction to capture rebounding wave action as described previously herein. If utilized the walls 3132 of the wave guide assembly 3130 can be shaped to concentrate wave action and funnel the waves into the venturi 3134. An outlet from the venturi 3134 can be positioned adjacent the assembly 3102 to an ocean side thereof. Venturi 3134 can be shaped to provide a roof to limit to wave height passing to the water wheel 3104, for example.

Figure 26A:
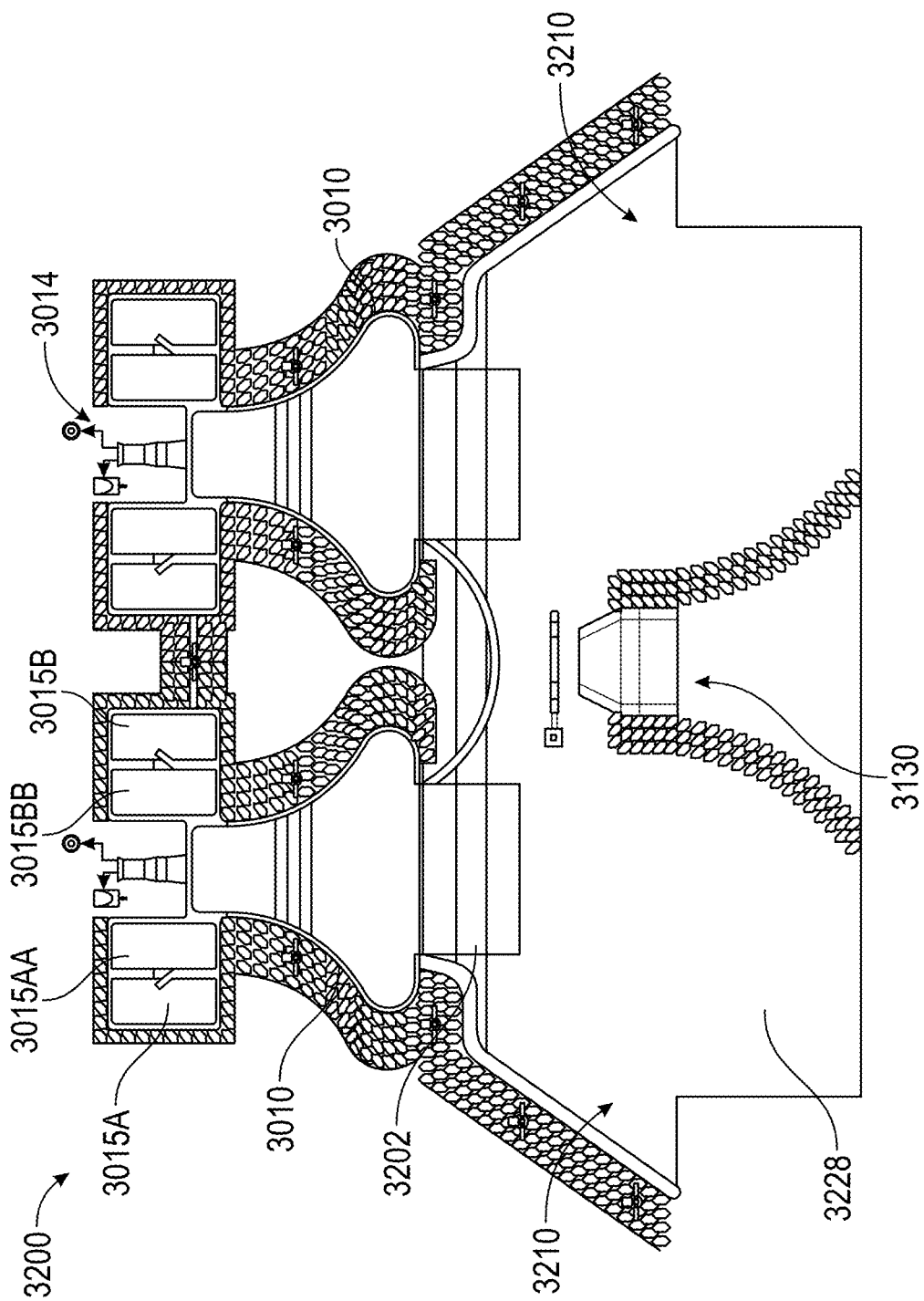
FIG. 26A is a plan view of a system of several tidal estuaries with the tidal estuary power generation, storage and regeneration system of FIG. 24A and the wave power generation system of FIG. 25 according to an example of the present application.
Figure 26B:
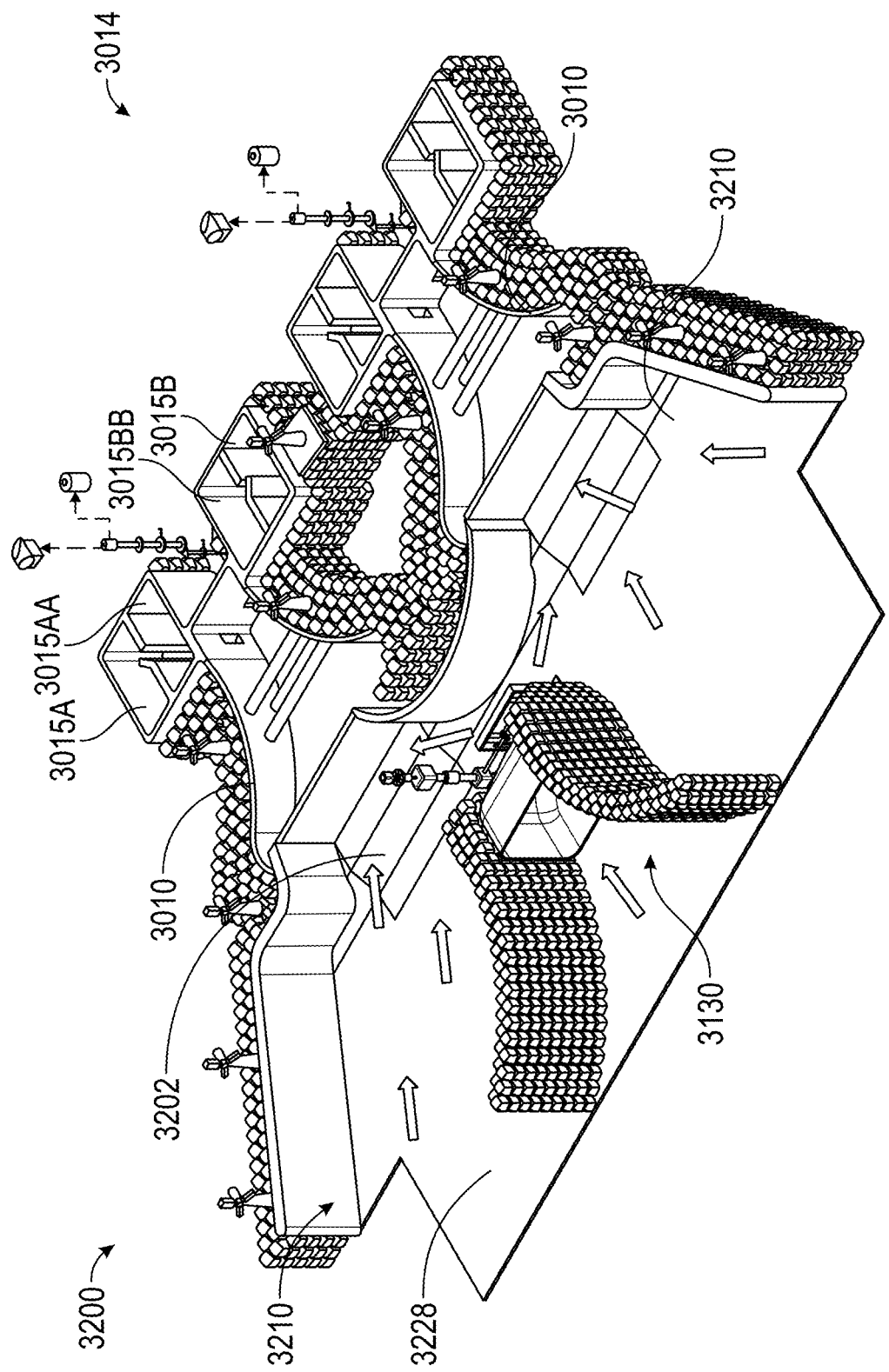
FIG. 26B is a perspective view of the systems of FIG. 26A.

FIGS. 26A and 26B show a system 3200 that includes two or more of the estuaries 3010 described previously with regard to FIGS. 24A-24C as well as the power generation system 3014 in combination with the system 3100 for wave power generation of FIG. 25.

FIGS. 26A and 26B show the system 3200 can include a floor 3228 configured as a shelf or ramp 3202 that is configured to raise tidal and/or wave height in and along an externally open estuary 3210 or channel leading into the selectively closable estuaries 3010. While estuaries 3010 have gates to retain tidal water within the estuaries 3010, the estuaries 3210 are open to the ocean and do not retain tidal flow. Rather, the estuaries 3210 are configured to magnify tides and/or waves entering the system 3200, in particular, the estuaries 3010.

The system 3200 can include features to capture tidal water during a king tide. A king tide can be a higher than normal tide(s) that typically occurs during a new or full moon and when the Moon is at its perigee, or during specific seasons such as spring. To this end, the ramp 3202 can be configured such as to be raised during such event. This can raise the height of water entering the estuaries 3010 during such an event such that an increased volume of water can be captured when the gates to the estuaries 3010 are closed. Furthermore, the dam/reservoir 3015A, the dam/reservoir 3015AA, the dam/reservoir 3015B and the dam/reservoir 3015BB can all be opened to the main flow channel to capture tidal flow during such an event. Thus, the dam/reservoir 3015A can be opened to communicate with the dam/reservoir 3015AA and/or the dam/reservoir 3015B can be opened to communicate with the dam/reservoir 3015BB during such king tide event. Once filled to a desired level during the king tide event, the dam/reservoir 3015A can be closed from the dam/reservoir 3015AA to capture the extra tidal water the dam/reservoir 3015AA and/or the dam/reservoir 3015B can be closed from the dam/reservoir 3015BB to capture this extra tidal water. This additional tidal water held by the dam/reservoir 3015A, dam/reservoir 3015AA, dam/reservoir 3015B, dam/reservoir 3015BB for additional power generation at a time desired by the grid master. Although estuaries 3010 are portrayed as including four dam/reservoirs for each estuary 3010, the present application anticipates that more than four or less than four dam/reservoirs per each estuary 3010 can be utilized in the spirit of the present example.

Figure 27:
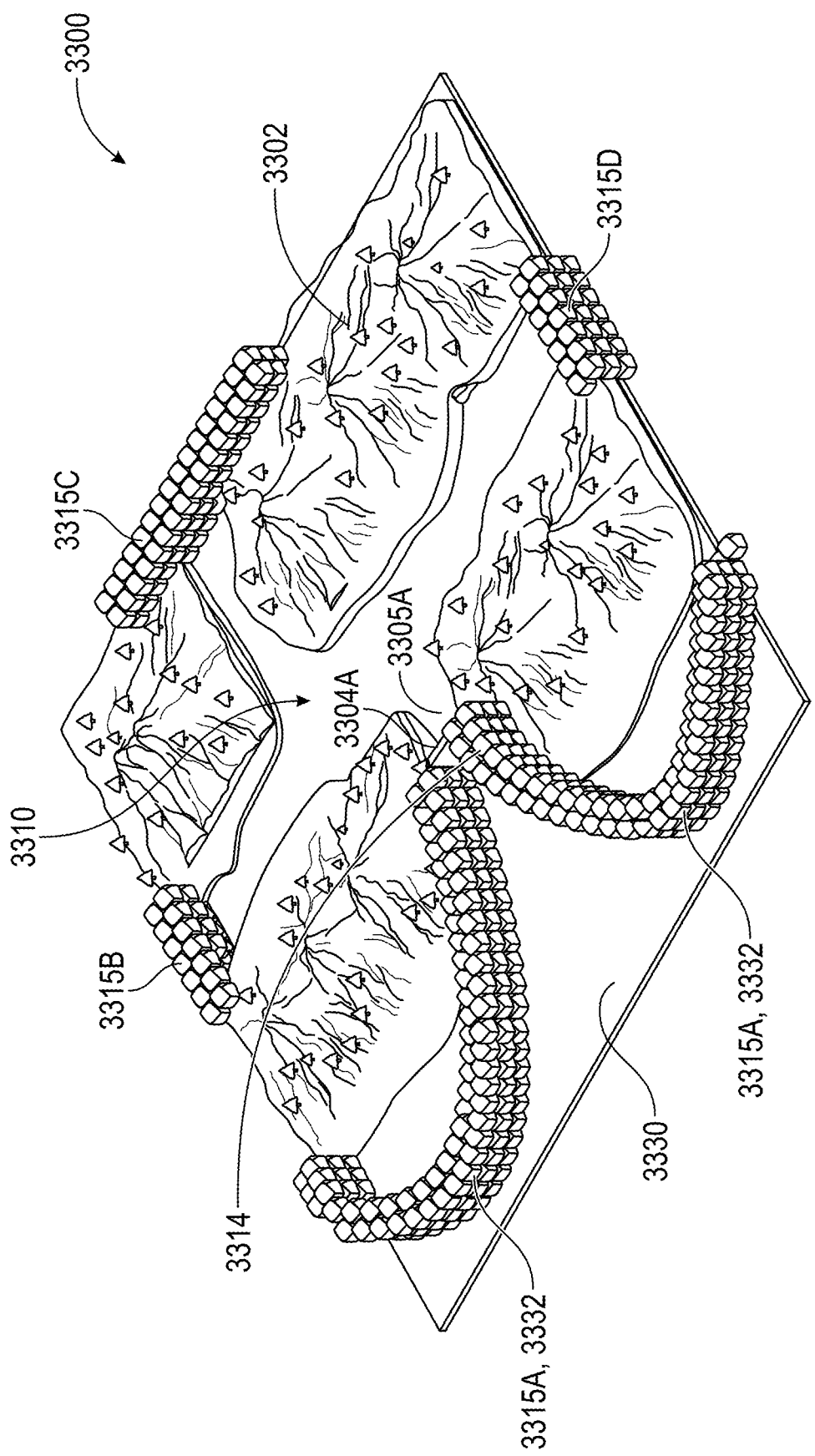
FIG. 27 is a perspective view of a tidal power generation system using a plurality of man-made dams and naturally occurring or partially man-formed islands to create an estuary for power generation, storage and regeneration systems as discussed herein.

FIG. 27 shows a system 3300 that includes man-made dams 3315A, 3315B, 3315C and 3315D. The dams 3315A, 3315B, 3315C and 3315D can be formed of placed rock such as tailings or other materials (concrete, steel, etc.). The system 3300 takes advantage of naturally occurring or partially man-formed land formations 3302 such as islands to form additional boundaries of an estuary 3310. At least the dam 3315A, which forms an inlet to the estuary 3310 has walls 3332 that form a tidal guide assembly 3330 that can be shaped to concentrate tidal action and funnel the tide into the estuary 3310. This funneling along with the dams 3315B, 3315C and 3315D can raise the tidal level within the estuary 3310 substantially (e.g., 10 to 20 meters of additional height than would otherwise occur). Each dam 3315A, 3315B, 3315C and 3315D or some of the dams 3315A, 3315B, 3315C and 3315D can have an associated gate (only one gate 3304A is shown in FIG. 27) and channel 3305A that can be selectively opened and closed to allow water into/out along the channel 3305A. The gate 3304A (and additional gates not shown) along with the dams 3315A, 3315B, 3315C and 3315D can retain tidal water within the estuary 3310 at a level/height as desired. Additionally, each dam 3315A, 3315B, 3315C and 3315D or some of the dams 3315A, 3315B, 3315C and 3315D can have an associated power generation system 3314 that can be positioned within or adjacent the dam 3315A, 3315B, 3315C and 3315D such as within or adjacent the gate or channel. This power generation system 3314 can include at minimum a water turbine(s) and shafting and can additionally optionally include other components such as flywheels and other components similar to the system 2600 of FIGS. 15A-16D. The power generation system(s) 3314 can include, for example, in addition to the water turbine, a water flow capturing apparatus, shafts, power split coupling, first flywheel, second flywheel, pump motor, accumulator and generator, etc.

Figure 28:
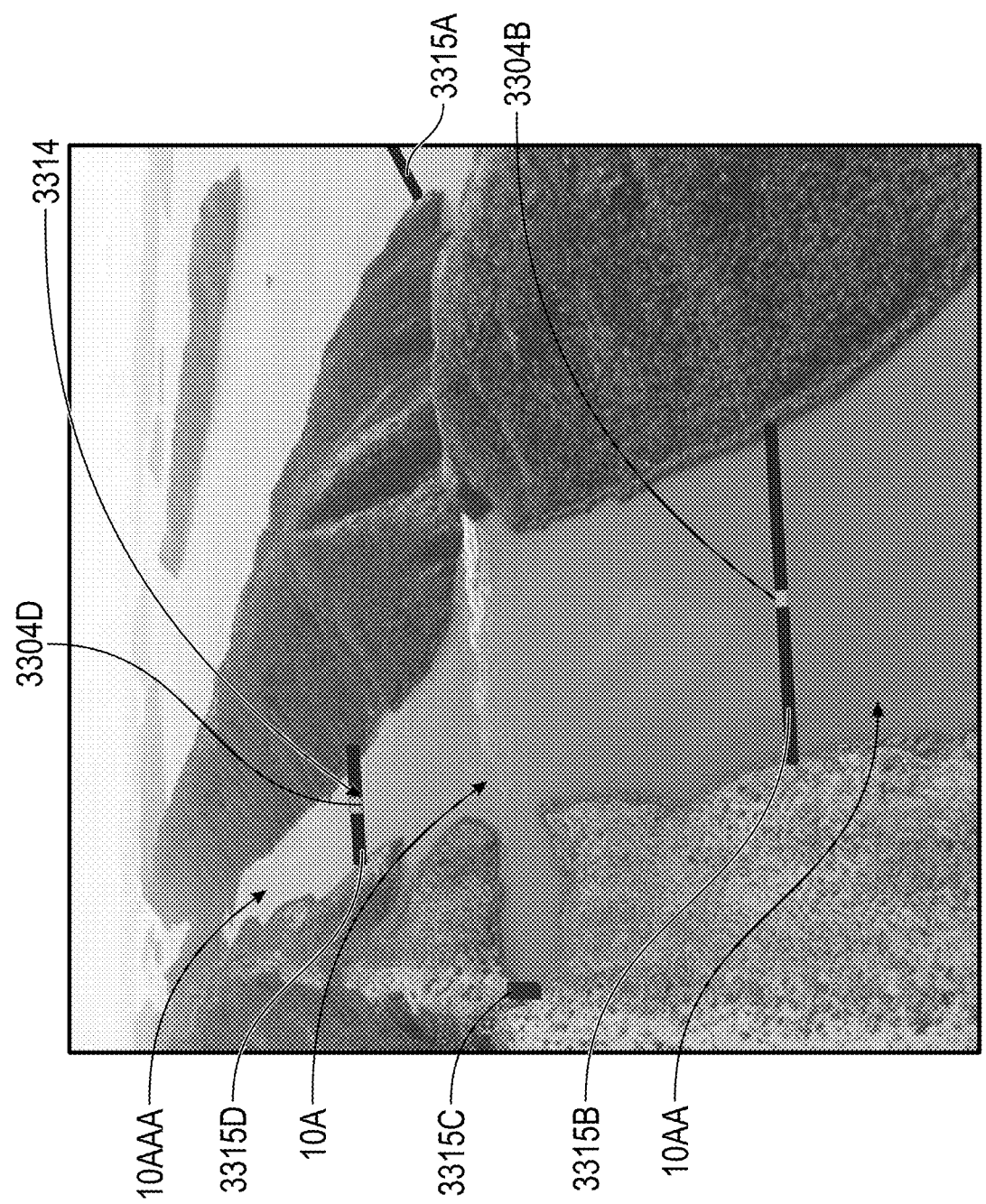
FIG. 28 shows the naturally occurring tidal estuary of FIG. 9 now modified by human activity for power generation using the plurality of man-made dams according to the principles of FIG. 27.

FIG. 28 shows the tidal estuary 10A previously shown in FIG. 9 now man-modified with the dams 3315A, 3315B, 3315C and 3315D including gates 3304B and 3304C associated with the dams 3315B and 3315C. As shown in FIG. 28, the 3315B and 3315C and gates 3304B and 3304D can regulate flow of tidal water through cannels into and out of additional estuaries/reservoirs 10AA and 10AAA. Flow from the estuary 10A to the estuaries/reservoirs 10AA and 10AAA can be harnessed using the apparatuses and systems discussed herein for power generation, for example. The estuaries/reservoirs 10AA and 10AAA can be used to store additional water, which can then be again harnessed in outflow for power generation at a time when such generation is desired. Thus, once estuary 10A tidal level is sufficiently lowered relative to the estuaries/reservoirs 10AA and/or 10AAA, the gates 3304B and/or 3304D can be opened and out flow of water along channels can occur from the estuaries/reservoirs 10AA and/or 10AAA back to the estuary 10A. Such flow can cause turning of water turbine(s) and create power captured with the power generation system(s) 3314. In this manner, inflows and outflows from partially man-made and partially naturally occurring estuaries/reservoirs 10A, 10AA and 10AAA can be utilized for power generation.

Figure 29:
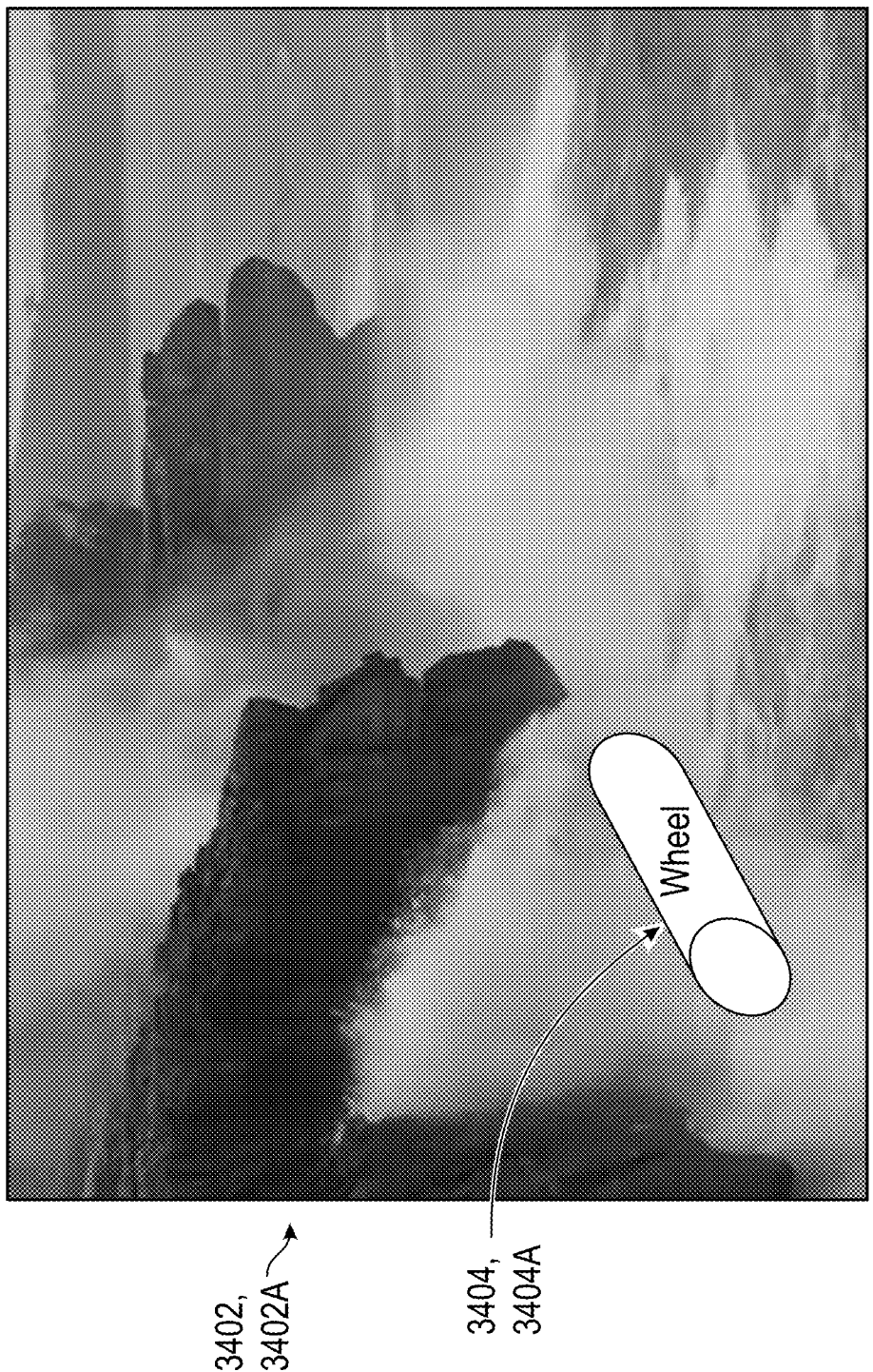
FIG. 29 is a perspective view of waves striking a wall such as a rocky foreshore and rebounding with incoming and/or outgoing force that is captured using a water wheel according to an embodiment.

FIG. 29 shows an example of wave striking and rebounding action off of an obstruction 3402 (in particular terra formed or naturally occurring cliff 3402A). The obstruction 3402 can be another feature such as a break wall, rocky headland, island or other man-made or man-modified feature. The obstruction 3402 can also be shape modified (e.g., be shaped with more vertical surfaces, angled surface(s) such as concave or the like). The energy (such as both the wave action toward the cliff and the rebounding or backwash wave action back from the cliff 3402A) that can be harvested by a wave power generator 3404 positioned adjacent the cliff 3402A. The wave power generator 3404 can be coupled to a structure on the ocean floor or can be a land anchored device, for example. The wave power generator 3404 can have a water wheel 3404A construction as discussed in reference to further FIGURES herein. However, other designs of hydrokinetic turbines as known in the art could also be used to capture wave energy in the manner discussed herein.

Figure 30:
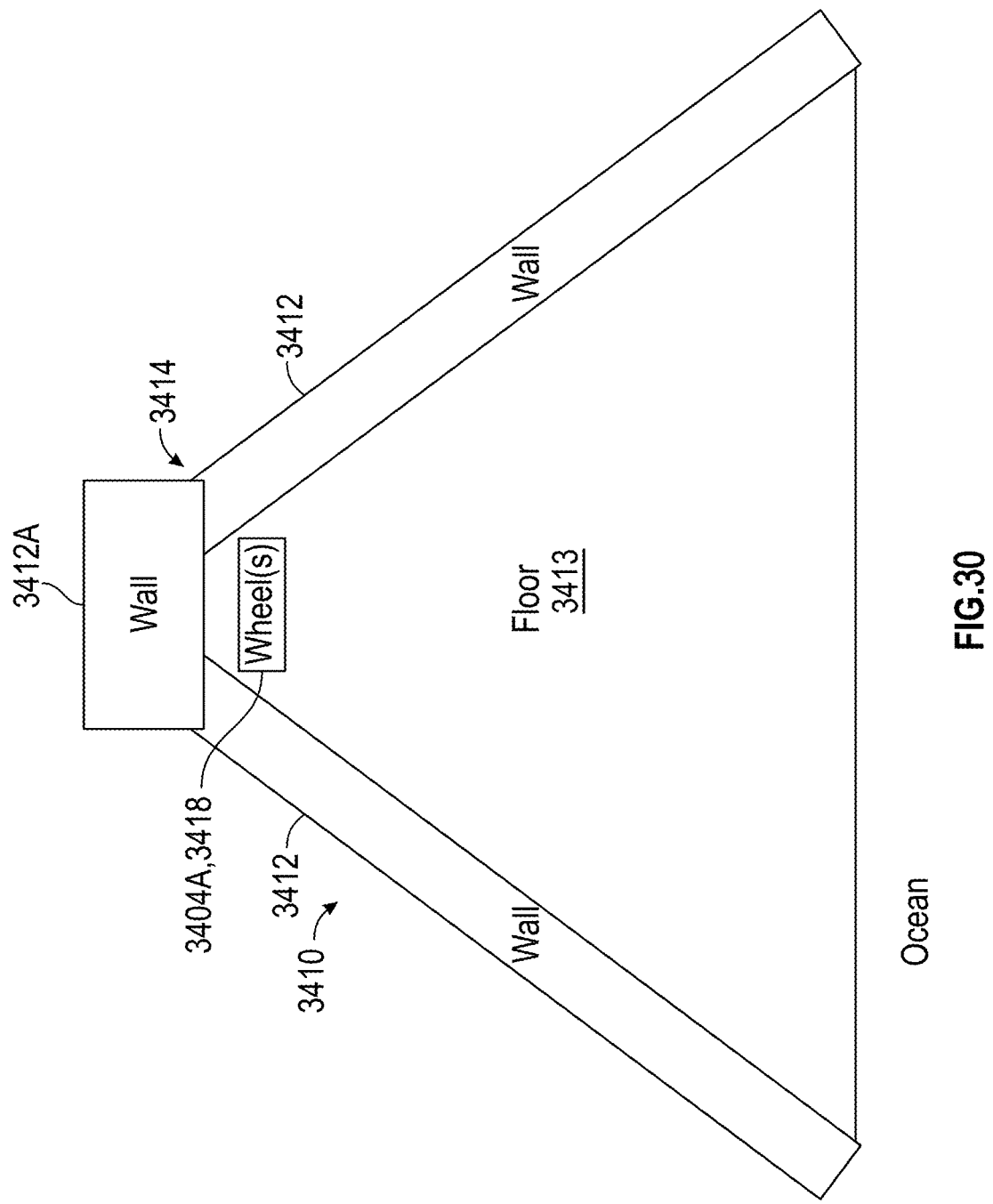
FIG. 30 is a highly schematic view of a man modified wave funneling channel along with a power system including one or more water wheels that can derive power from wave act into the channel and after striking a wall of the channel.

FIG. 30 shows a man-modified or man-created channel 3410 having walls 3412 including a wave break wall 3412A that with an exemplary shape that funnels and magnifies incoming waves along the channel 3410 to the wave break wall 3412A. Channel 3410 can be located partially-onshore, off-shore such as on a tidal shelf, adjacent the shoreline (formed by mainland, island, reef or the like) or another suitable location. Tidal shelfs have been shown to raise wave heights around the world and would be suitable locations for the channel 10. The shape of the channel 3410 and walls 3412 shown is exemplary and is contemplated to be modified. Furthermore, as shown in FIG. 30, walls 3412 (other than obstruction 3402 such as cliff 3402A of FIG. 29) may not be necessary in some embodiments. The walls 3412 can be convex, angled or otherwise shaped to be narrowing toward one another to restrict the channel 3410 to the wave break wall 3412A as shown in FIG. 30. The shape can differ from the shape illustrated. Portions of the wall 3412 may or may not be modified by human activity according to some examples. Indeed, the entire wall 3412 can be created by human activity in some examples. The wall 3412 can thus be formed by concrete, steel, wood, stone, brick, rock, piled sand, etc. In some cases, portions or all of the wall 12 may not be modified by human activity. The channel 3410 can thus be formed of natural materials (e.g., sand, rock, etc.) that is gathered from the ocean floor or other location or can be of other material that is man-made or man-modified for example. In FIG. 30, the wall 3412 has the reduced cross-sectional regions leading to the wave break wall 3412A in order to better magnify wave height. It is contemplated that a floor 3413 of the channel 3410 can be elevated relative to surrounding ocean to better magnify wave height.

The modified channel 3410 includes a wave power system 3414 that communicates with power systems such as a power grid, battery stations, accumulators, hydrogen production facilities, etc. The wave power system 14 can include one or more turbines 18 including a water wheel 4A, one or more power split couplings, etc.

FIG. 30 depicts a wall, cliff, dam, island, gate, breakwater or other obstacle placed across an end of the channel 3410 to act as the wave break wall 3412A. The wave break wall 3412A can be man-made or man-modified to have a particular desired shape as further discussed herein. The wave break wall 3412A can be created by human activity in some examples. The wave break wall 12A can thus be formed by concrete, steel, wood, stone, brick, rock, piled sand, etc. In some cases, portions or all of the wave break wall 3412A may not be modified by human activity. The wave break wall 3412A can be configured to form wave facing wall for the channel 3410 facing the ocean. As the wave break wall 3412A is an ocean facing wall 3412, the wave break wall 3412A can be subject to ocean wave action, storm, tide and other forces in a manner that portions of the walls 3412 may not be. Together the walls 3412 including the wave break wall 12A can partially enclose the channel 3410. In some cases, the channel 3410 can include one or more exit flow channels (not specifically illustrated). Exit flow channels can be provided between the wall 3412 and the wave break wall 3412A as an outlet from the channel 3410. Such exit flow channels could also be provided as tunnels or other features through the walls 12 including the wave break wall 3412A.

As shown in FIG. 30, the shape for the wave break wall 3412A can have a substantially flat, concave, convex or other shape facing with the channel 10. However, other shapes for the wave break wall 3412A are contemplated. The outer side of the wave break wall 3412A can have elevated and vertical or almost vertical face (e.g. similar to a cliff). This wave break wall 3412A can be configured to create backwash flow as a result of the backwash wave action (see FIG. 29) that can interact with and powers the power system 3414 via the water wheel 3404A placed adjacent (within a 200 feet to a foot or less) of the wave break wall 3412A.

According to the example of FIG. 30, the channel 3410 can be shaped with at least one section configured as venturi. Alternatively or additionally, the water wheel 3404A can be part of an apparatus shaped to form a venturi. This shape for the channel 10 can facilitate magnified velocity for tidal flow.

It should be understood that the size (e.g., volume and diameter) of the channel 3410 is purely exemplary in the FIG. 30. A careful study should be undertaken to properly size the channel 3410 (e.g., provide for a proper cross-sectional area and volume) relative to the wave characteristics (speed, height, volume flow rate, mass flow rate) of the flow such that inertia of the water passing along and/or through the channel 3410 can be maintained or is not substantially reduced before passing to the water wheel 3404A.

The one or more turbines 3418 including the water wheel 3404A can be constructed in the manner described in the subsequent FIGS., or known in the art, for example. The one or more turbines 3418 can include blades for capturing load of water as known in the art. Likewise, the wave power system 3414 can be constructed in the manner described in subsequent of the FIGS. and can include a hydraulic power system as will be discussed in further detail subsequently. In some cases, the wave power system 3414 can include other sources of power generation including for hydraulic power generation in parallel or series with the water wheel(s) 3404A. This can include the wind turbines, other hydrokinetic turbines and other power generation sources. However, such supplemental sources of power generation are not necessary and are optional.

Figure 31:
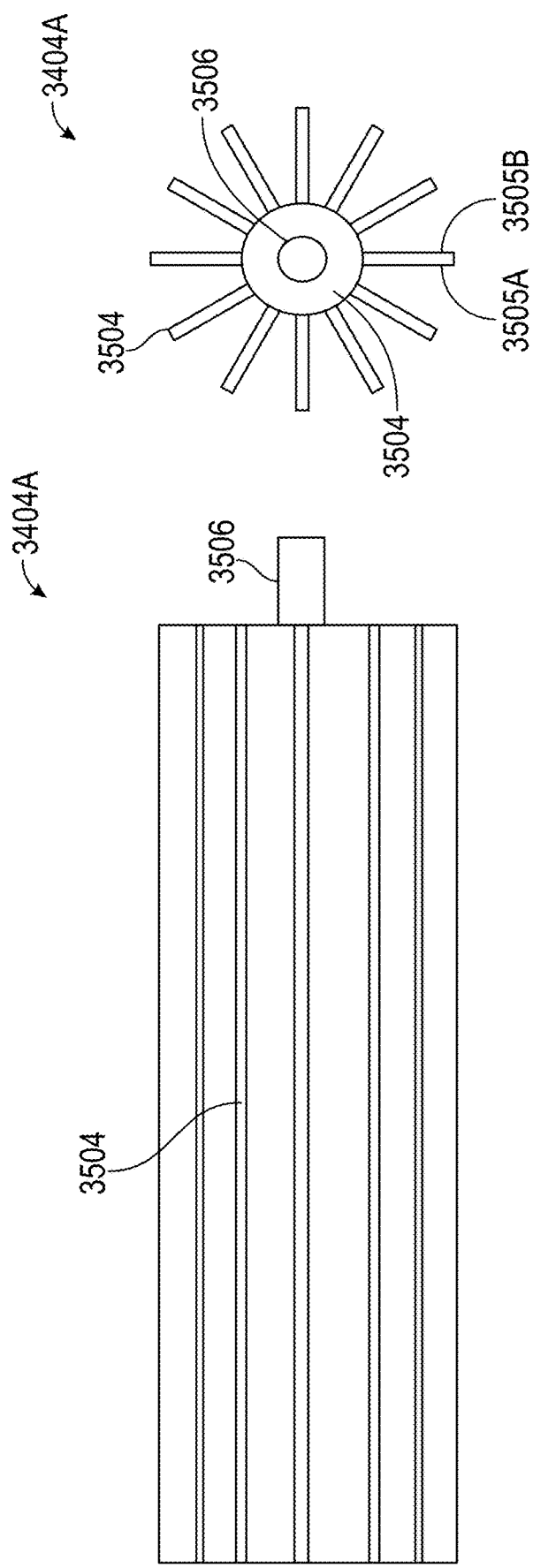
FIG. 31A is a side plan view of an exemplary water wheel apparatus according to an embodiment.
FIG. 31B is an end view of the water wheel apparatus of FIG. 31A.

FIGS. 31A and 31B show an example of the water wheel 3404A constructed with a hub 3502 (FIG. 31B), a plurality of blades 3504 and an output shaft 3506. The hub 3502 is coupled to the plurality of blades 3504. The hub 3502 and the plurality of blades 104 are rotatable on the output shaft 106. The plurality of blades 3504 are configured to be engaged by water flow as a result of breaking wave action, for example. This breaking wave action can include incoming breaking wave action and backwash wave action that results from the wave striking the obstruction 2 (e.g., the cliff 3402A of FIG. 29, the wave break wall 3412A of FIG. 30, etc.) and rebounding. Engagement by the water flow of one or more of the plurality of blades 3504 can turn the hub 3502 and the output shaft 3506. The output shaft 3506 can be a drive shaft for a wave power system. It should be noted that the plurality of blades 3504 and the other components of the water wheel 3404A including the output shaft 3506 are configured for rotating operation in both clockwise and counterclockwise direction. Thus, the water wheel 3404A is configured for rotating and reverse rotating operation. As an example an incoming wave would engage one or more of the plurality of blades 3504 and rotate the hub 3502 and the output shaft 3506 in a first clockwise direction. Backwash wave flow from the wave rebounding off an obstacle 3402 (FIGS. 29 and 30) can engage one or more of the plurality of blades 3504 and rotate the hub 3502 and the output shaft 3506 in a second counter-clockwise direction.

The water wheel 3404A can be configured to generate torque from waves. In particular, the plurality of blades 3504 are configured to produce a first rotor torque and rotate the hub 3502 in a first direction in response to a first applied loading by a flow of water from a first of the waves engaging one or more of the plurality of blades 3504 in a first direction (e.g., the wave in direction in FIG. 33) and configured to produce a second rotor torque and rotate the hub 3502 in a reverse direction in response to a second applied loading by a flow of water in a second direction (e.g., wave out direction in FIG. 33) from a second of the waves engaging one or more of the plurality of blades 3504.

As shown in FIGS. 31A and 31B, each of the plurality of blades 3504 has substantially a same geometry along each of two major surfaces 3505A and 3505B thereof so as to be engageable by the flow of water in the first direction and the second direction. Each of the plurality of blades 3504 is substantially flat along an extent of each of the two major surfaces 3505A and 3505B. The water wheel is configured to couple with one or more anchors (see FIG. 33) configured to secure the water wheel in a position adjustable manner.

Figure 32:
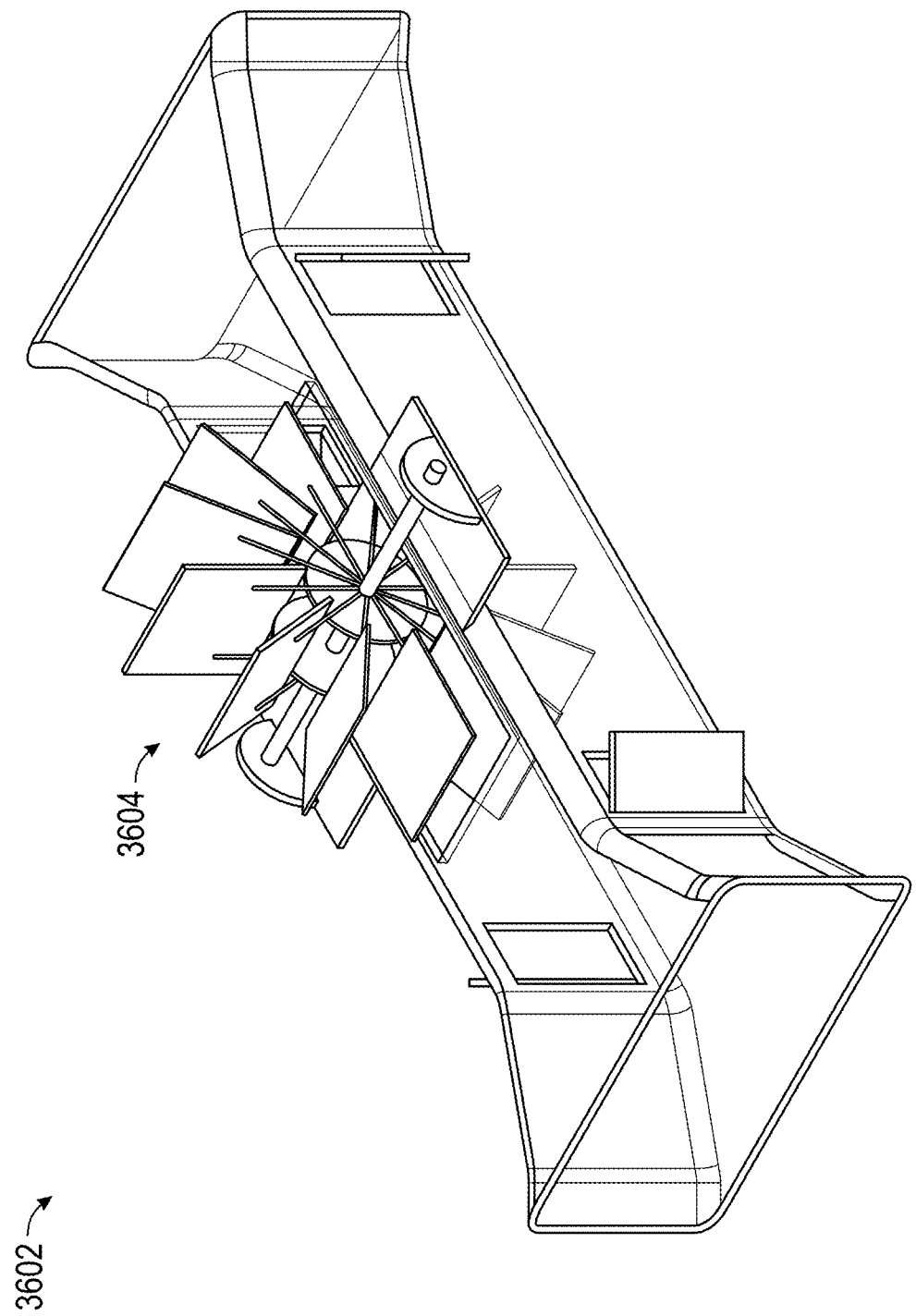
FIG. 32 is a schematic view of various an example apparatus that can be used as a wave power generator having a water wheel as contemplated herein.

FIG. 32 illustrates another wave power apparatus 3602 that can include a water wheel 3604 of similar construction to the water wheel 3404A described previously. The apparatus 3602 can include a housing and other features constructed in a manner similar to the device described in my U.S. application Ser. No. 17/860,842, entitled RIVER VENTURI POWER AMPLIFICATION, STORAGE AND REGENERATION SYSTEM AND METHOD, previously incorporated by reference but can include the water wheel 3604. Operation of the apparatus 3602 as part of various power systems will be discussed in reference to subsequently FIGS. 33 and 34A and 34B, for example.

Figure 33:
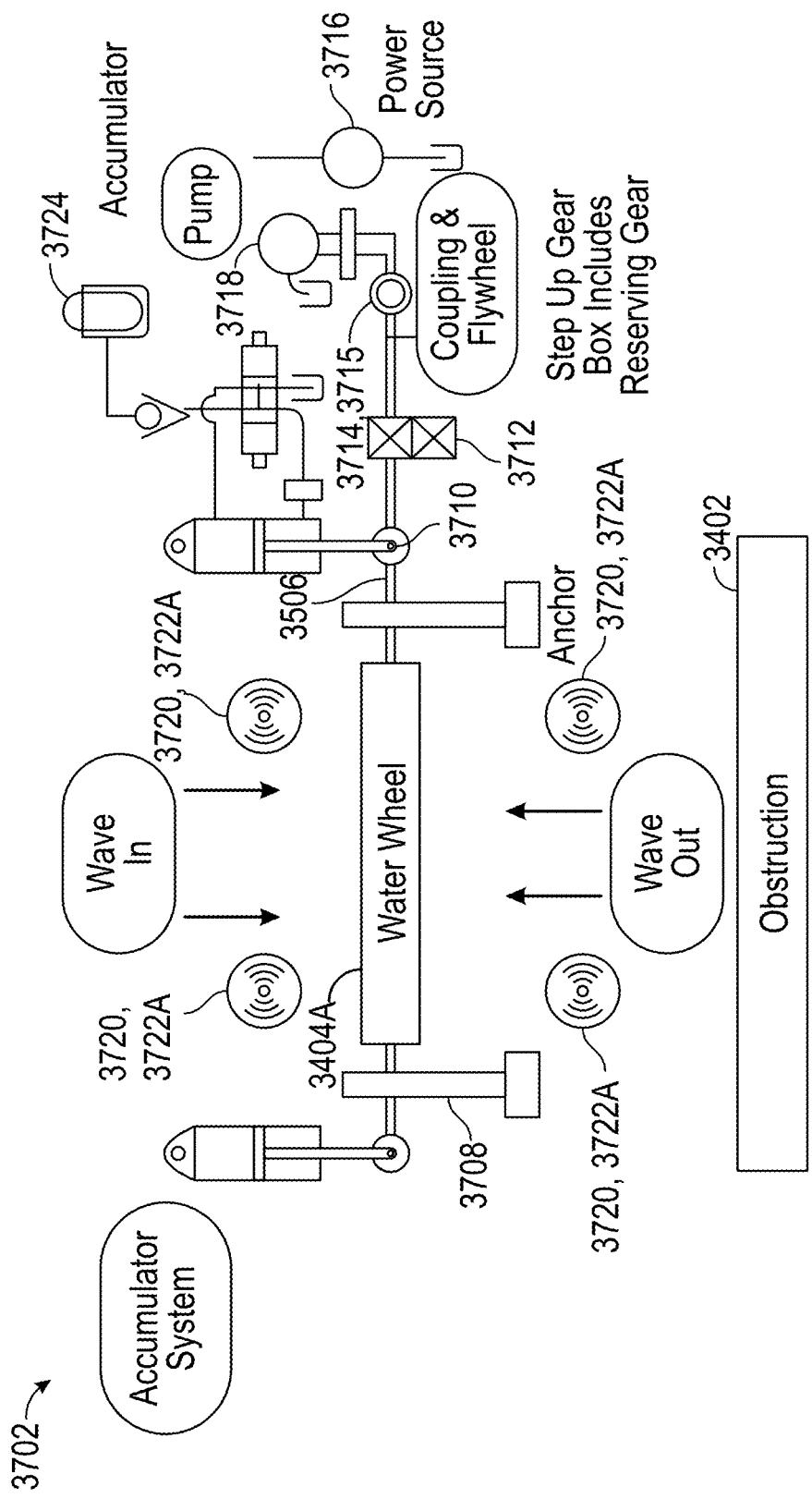
FIG. 33 shows a wave power generation, storage and regeneration system according to an example of the present application.

FIG. 33 shows the water wheel 3404A of FIGS. 29-31B, implemented as part of a wave power system 3702. However, such wave power system 3702 could alternatively or additionally include the apparatus 3602 of FIG. 32. The wave power system 3702 can include the water wheel 3404A, output shaft 3506, one or more anchors 3708, a universal joint 3710, a gearbox 3712, a power split transmission coupling 3714, one or more flywheels 3715, a power source 3716 (e.g., a generator), at least one hydraulic pump motor 3718, one or more sensors 3720. The water wheel 3404A can generate a torque in response to wave loading (both incoming and outgoing backwash from the obstruction 3402) and transmit that torque to the remainder of the wave power system 3702. The water wheel 3404A can transmit the torque generated by the plurality of blades (3504 in FIGS. 31A and 31B) to the power source 3716 (e.g., the generator, an accumulator, etc.) via the output shaft 3506.

The one or more anchors 3708 can be secured to ocean floor, the obstruction 3402, a floor of a channel (if utilized) and/or other features. The one or more anchors 3408 can be position adjustable (such as via extending and retracting) to change a position of the water wheel 3404A. Such change in position or positioning of the water wheel 3404A can be based upon one or more criteria. The position can be a height of the water wheel 3404A from the floor (e.g., ocean, channel, etc.), from a surface of the water, and/or relative to the obstruction 3402. The criteria can include: a measured trough and/or crest of the incoming waves, wave height, wave speed, wave frequency, a measured trough and/or crest of the backwash wave action, measured height of spray from contact with the obstruction 3402, current or future tidal conditions, current or combination thereof. The one or more sensors 3720 can be deployed on floating electronic buoys 3722A placed adjacent to or remote from (e.g., to an ocean side and/or relatively closer to the obstruction 3402 than) the water wheel 3404A. Placement of the one or more sensors 320 can be selected to provide remoteness from the water wheel 3404A and can allow time for height and/or other position adjustment to be in harmony with the one or more criteria for maximum energy capture by the water wheel 3404A.

The sensors 3720 can measure and provide data of the one or more criteria discussed above. This one or more criteria can be used to control the one or more anchors 3708 to adjust the water wheel 3404A position The one or more criteria can include data regarding wave movement toward and back away from the obstruction 2, data regarding wave movement toward the obstruction 3402 only, data regarding wave movement back away from the obstruction 3402 only, or data regarding any one or combination of the one or more criteria discussed previously.

The one or more anchors 3708 can be position adjustable by hydraulic power generated by the wave power system 3702. Thus, an accumulator charged by the system 3702 or a dedicated accumulator, hydraulic cylinder and/or winch motor can be utilized to facilitate position adjustment of the water wheel 3404A, for example.

Electrical power can be produced by the generator in response to the application of torque to a generator rotor resulting in a rotation of the generator rotor within a stator of the generator. The water wheel 3404A can be coupled to the power source 3716 by one or more linkages (including output shaft 3506 and universal joint 3710). The spinning water wheel energy passes along the output shaft 3506 acting as a drive shaft for the wave power system 3702. The output shaft 3506 directs power through the universal joint 3710 (e.g., a 90 degree universal) to the gearbox 3712. The gearbox 3712 can be a multi geared transmission gear box with right hand and left hand reversing gears to unify the output shaft 3506 rotation direction (recall the water wheel 3404A can rotate back-and-forth in some cases due to incoming and outgoing (backwash) wave action). The gearing of the gearbox 3712 can be selected to both meet the direction of the wave, the spinning water wheel power and rotational speed. The gearbox 3712 and the power split transmission coupling 3714 can be operatively coupled via one or more linkages (e.g., shafts and/or other components) between the water wheel 3404A and the generator.

As discussed above, the gearbox 3712 can include an input coupling attached via the universal 3710 to the output shaft 3506 and an output coupling. The gearbox 3712 can include a step-up gearing 3712A and can include one or more reversing gears 3712B (see discussion previously). The gearbox 3712 can configured to rotate an output linkage at a desired speed. In other words, the gearbox 3712 can rotate the output linkage at a faster, slower, or equal speed of the output shaft 3506. The one or more linkages of the wave power system 3702 can further include an input shaft of the power split transmission coupling 3714 (as previously shown in FIGS. 11-15 and described herein). The power split transmission coupling 3714 can be configured to drive the one or more flywheels 3715. The power split transmission coupling 3714 and/or the hydraulic pump motor 3718 can divert hydraulic fluid under high pressure to a storage vessel such as the accumulator 3724. The system can include multiple accumulators 3724, for example. The hydraulic fluid stored under high pressure can be used for auxiliary power purposes including, but not limited to, supplying high pressure hydraulic fluid to a hydraulic pump motor 3718 for power generation or regeneration, pumping fluid, adjusting the position of the water wheel 3404A or the like.

The hydraulic pump motor 3718 can also be coupled to the generator rotor for supplying increased torque and power to the generator (an example of the power source 3716). The system 3703 can include any combination or arrangement of hydraulic pump motors 3718, power split transmission couplings 3714 and/or flywheel 3715. Thus, it is not limited to the arrangement or number of such components illustrated. As an example, multiple hydraulic pump motors 3718 can be more efficient than a single larger hydraulic pump motor and can be used to provide variable displacement. For instance, where the maximum power output of the hydraulic pump motor 3718 can exceed the maximum power of the generator, the hydraulic pump motor 3718 can be de-stroked to operate at lower than maximum capacity. Some hydraulic pump motors 3718 operate less efficiently when de-stroked. The greater the degree of de-stroking, the less efficient the hydraulic pump motor 3718 can operate. In an example, the hydraulic pump motor 3718 can include a similar design to the power split transmission coupling 3714 (as shown in FIGS. 11-15 and described herein). In some cases the systems described in this application can use a torque converting device other than the power split transmission couplings described. Such alternative devices include motors, torque converters, pumps or the like, for example. Instead of diverting hydraulic fluid to reduce the torque delivered to the generator, the hydraulic pump motor 3718 can produce torque on the generator rotor in response to the application high pressure hydraulic fluid to the hub and vanes of the hydraulic pump motor 3718.

Where the mechanical power of the water wheel 3404A exceeds the maximum power of the generator, the power split transmission coupling 3714 can draw hydraulic fluid from a reservoir into the power split transmission coupling 3714 and divert the hydraulic fluid at high pressure to the hydraulic storage vessel (e.g., one or more of the accumulators 3724) for later regenerative use(s) such as to adjust the position of the water wheel 3404A, etc. The power split transmission coupling 3714 can include an inlet port and outlet port. The inlet port can be coupled to the reservoir to communicate the hydraulic fluid from the reservoir to the power split transmission coupling 3714. A hydraulic storage conduit can couple the power split transmission coupling 3714 to the hydraulic storage vessel. The high pressure hydraulic fluid can be stored at high pressure in the storage vessel. For instance, high pressure hydraulic fluid can be hydraulic fluid at pressures including, but not limited to, 20 bar, 100 bar, 300 bar, 500 bar, or other pressure. The hydraulic storage conduit can include at least one cutoff valve located along the hydraulic storage conduit between the power split transmission coupling 3714 and the hydraulic storage vessel. The communication of hydraulic fluid from the power split transmission coupling 3714 and the hydraulic storage vessel can be interrupted or stopped where the cutoff valve is in the closed position. Closing the cutoff valve can prevent reverse flow of hydraulic fluid from the hydraulic storage vessel to the power split transmission coupling 3714.

It is contemplated that the power split transmission coupling 3714 can be controlled in various manners advantageous for the system 3702. For example, pulsing pressure control of the power split transmission coupling 3714 can be used to match or substantially match the rhythm of incoming torque generated by the wave action to the stabilizing one or more flywheels 3715. Pulsing can also be used to maintain or alter inertia of the blades of the water wheel, for example. This pulsing can be used to maximize efficiency and performance of the system 3702. It is understood that although the systems of FIGS. 30-33 illustrate a single water wheel, the systems can include multiple water wheels arranged adjacent or remote from one another. The systems discussed herein also can be used for independent power generation such that each system has a single water wheel.

In an example, the hydraulic fluid can include, but is not limited to water, a water glycol mixture, hydraulic oil, or the like. The power split transmission can operate with water as a fluid medium for transmitting torque from the input shaft to the output shaft resulting in cost savings over more expensive fluids. Couplings, fittings, hoses, conduits, and the like can leak hydraulic fluid in the course of normal operation. The use of water as the hydraulic fluid can result in an environmentally friendly solution. In an example, glycol or ethylene glycol can be added to water to form a water glycol mixture. For instance, the water glycol mixture can include a lower freezing point and a higher boiling point than pure water.

The reservoir used by the system can include a fluid storage tank for holding the hydraulic fluid at low pressures, such as atmospheric pressure. In an example, the reservoir can include a large body of water, such as an ocean, lake, tidal estuary, storage pod, tank, or the like. For instance, the large body of water can include a naturally occurring body of water. The reservoir can provide for storing the hydraulic fluid at high pressure generated by the power split transmission coupling 3714. In an example, where the hydraulic fluid from the reservoir is not stored under high pressure, it can be returned to the reservoir.

The hydraulic storage vessel can be configured to store high pressure hydraulic fluid for long durations of time. For instance, the hydraulic storage vessel can contain pressures of up to 350 bar for hours, days, weeks, or months. In the example of FIG. 33, the hydraulic storage vessel is the hydraulic accumulator 3724. The accumulator 3724 can be charged with a gas or a liquid, such as nitrogen gas or liquid nitrogen, to increase the storage pressure of the accumulator. In an example, the stored hydraulic fluid can provide up to 1 megawatt of power or more.

Figure 34A:
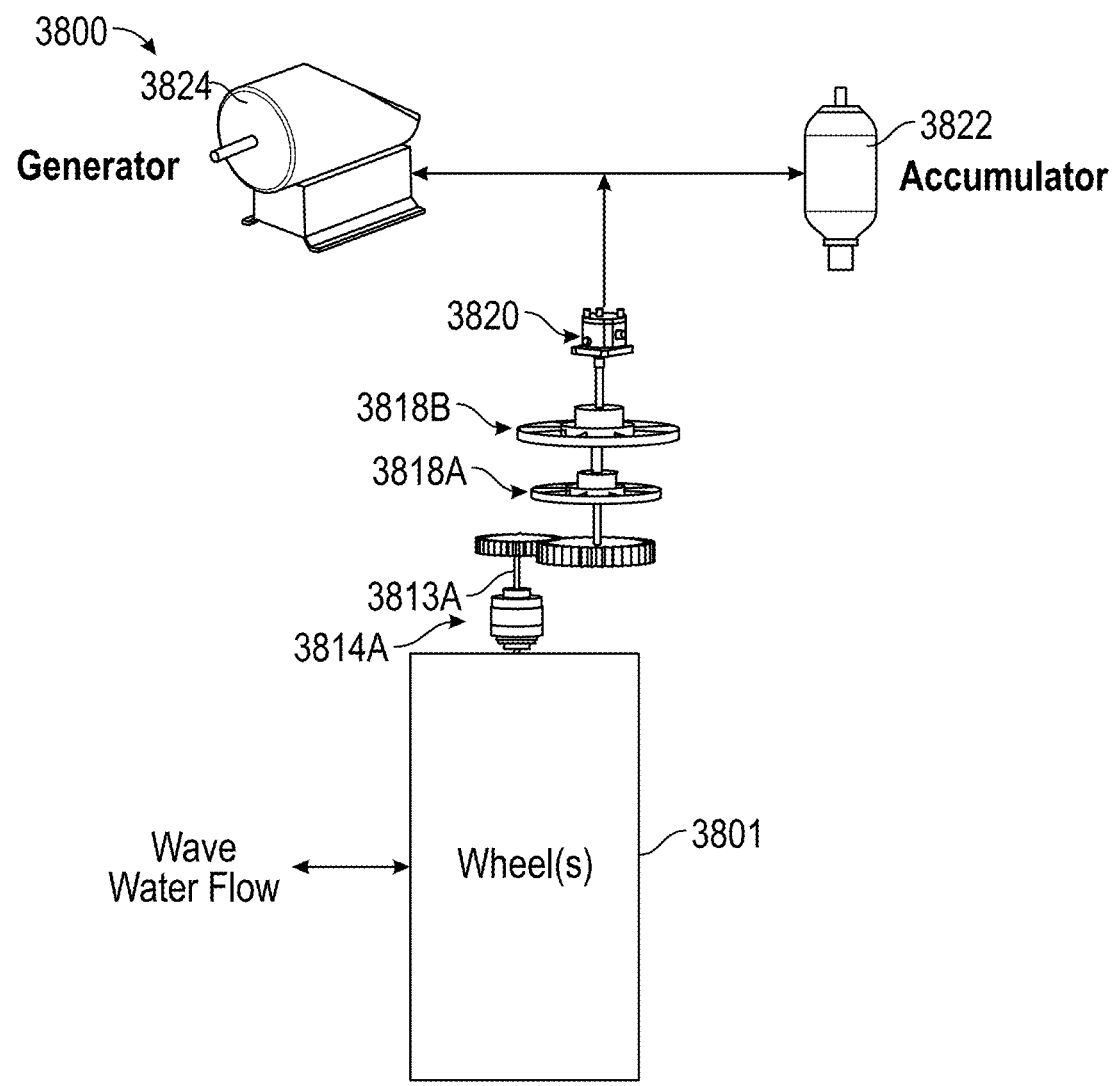
FIG. 34A shows a wave power generation, storage and regeneration system according to an example of the present application.
Figure 34B:
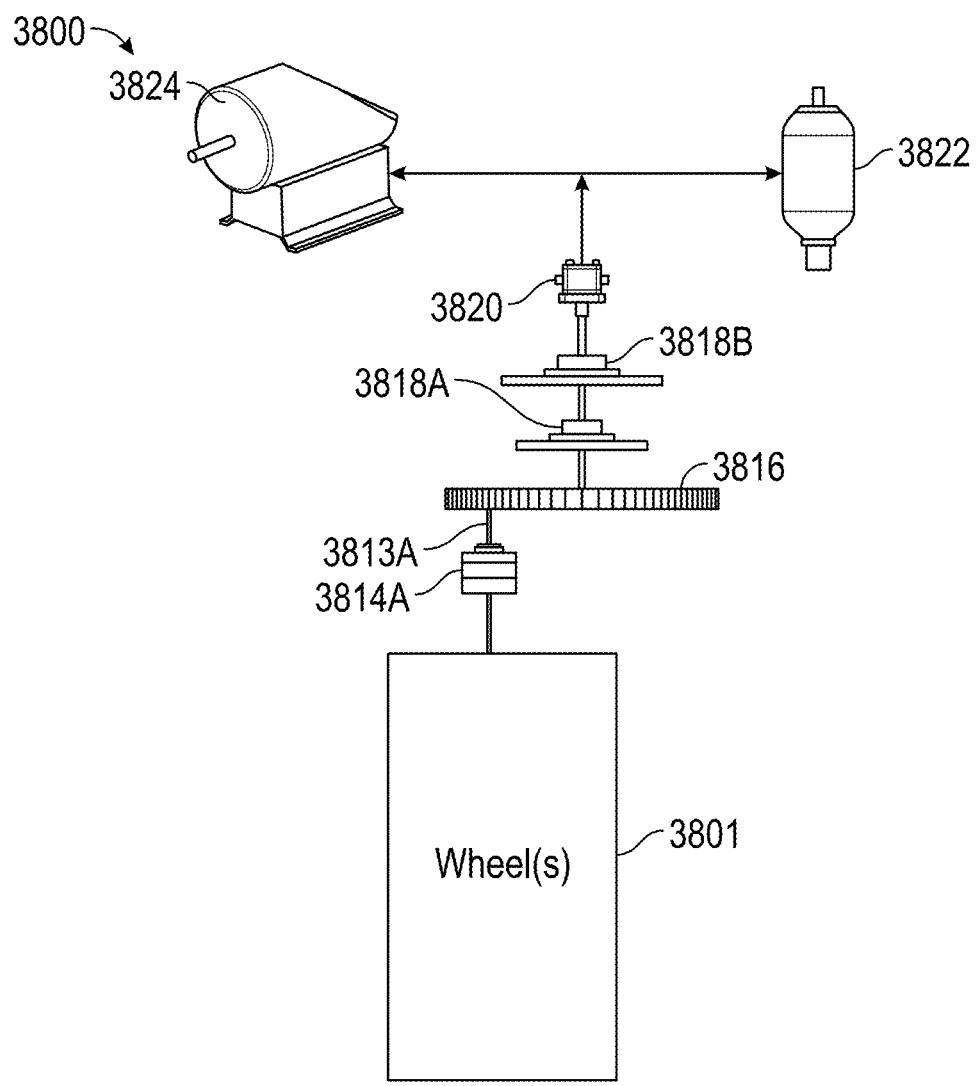
FIG. 34B is a plan view of the wave power generation, storage and regeneration system of FIG. 34A.

FIGS. 34A and 34B show a wave power generation, storage and regeneration system 3800 according to another example. The system 3800 can optionally include the wave power apparatus 3602. However, the system 3800 can include a water wheel 3801 constructed in a manner similar to that of the water wheel embodiments (water wheel 3404A, water wheel 3604, or the like) discussed previously. The water wheel 3801 can be modified slightly as needs dictate. The water wheel 3801 can include drive shaft 3813A, one or more power split transmission couplings 3814A, a gearbox 3816, a first flywheel 3818A, a second flywheel 3818B, one or more pump/motors 3820, one or more accumulators 3822 and one or more generators 3824. Although not specifically shown in FIGS. 34A and 34B, the system 3800 can also include one or more controllers and one or more sensors such as (electrical control unit and tachometers). The controller can be used to operate the system 3800 in the various operation modes discussed herein.

Referring now to FIGS. 34A and 34B in combination, the water wheel 3801 can include an outer nacelle or housing (see FIG. 32), a hub (see FIGS. 31A and 31B), a plurality of blades (see FIGS. 31A and 31B).

At a system level, the system 3800 the water wheel 3801 can be configured to be engaged by wave action on one or more of the plurality of blades. The load of the water engaging the one or more of the plurality of blades can cause the one or more of the plurality of blades to turn the hub as discussed previously. The hub can couple with or be the one or more drive shafts 3813A. The one or more power split transmission couplings 3814A can selectively couple with the one or more drive shafts 3813A and can be utilized in the manner discussed previously. The drive shafts 3813A can extend from the one or more power split transmission couplings 3814A and can couple with the gearbox 3816. Another drive shaft (or shafts) can extend from the gearbox 3816 and can couple in series or parallel arrangement with the first flywheel 3818A, the second flywheel 3818B, the one or more generators 3824 and the one or more pump/motors 3820. Hydraulically, the one or more power split transmission couplings 3814A can be in selective fluid communication with the gearbox 3816, the one or more pump/motors 3820 and the one or more accumulators 3822.

The first flywheel 3818A and second flywheel 3818B can differ in size and inertia. The first flywheel 3818A and second flywheel 3818B can smooth out delivery of power from the shafts to the one or more generators 3824. The inertia of each of the first flywheel 3818A and second flywheel 3818B opposes and moderates fluctuations in the speed of the water wheel 3801 (as a result of changes in water flow velocity) and stores the excess rotational energy (conserves angular momentum) for intermittent use.

The system 3800 can operate in a power storage mode of operation. This can occur in a higher wave height situation. In this power storage mode, the water wheel 3801 is rotating at a speed that is above required grid generator speed. The one or more power split transmission couplings 3814A can reduce the respective shafts speeds to acceptable rotational speeds for the generator and can act as pumps to divert hydraulic fluid with the excess energy to the one or more accumulators 3822.

A power regeneration mode of operation for the system 3800 can occur at low wave height situation. In the power regeneration mode of operation, the one or more accumulators 3822 can be depleted or emptied to power the one or more pump/motors 3820 to turn the one or more generators 3824 at a desired speed.

System 3800 can use sensors. These sensors can comprise tachometers, buoy mounted sensors (see FIG. 33) or other type of suitable sensor that can provide sensing of wave related criteria and of sensing along shaft(s) or rotor(s) for the controller. The sensors can be electronic inputs for the controller for the various operation modes discussed subsequently. The controller can be in electrical communication with the plurality of sensors, one or more valves and a plurality of actuators. The sensors can sense aspects of the input and output shafts to the power split transmission coupling, rotors or other shafts in the system 3800. Such aspects can include rotational count, rotational speed of the input and/or output shaft or rotor, acceleration of the input and/or output shaft or rotor, or the like. The one or more valves can be controlled by the controller with input from the plurality of sensors. The one or more valves can send a pilot or other signal to change the operation mode for the power split transmission coupling. Such operation modes and pilot signals are discussed herein and in my prior patents and patent applications incorporated herein by reference. Thus, the controller can control operations of the power split transmission coupling and other components to the various modes of operation discussed herein.

The controller can also control operation of the water wheel 3801 and the system 3800 to operate in the various modes discussed previously herein. To facilitate such control operation, the plurality of actuators can be controlled electrically by the controller.

Figure 35:
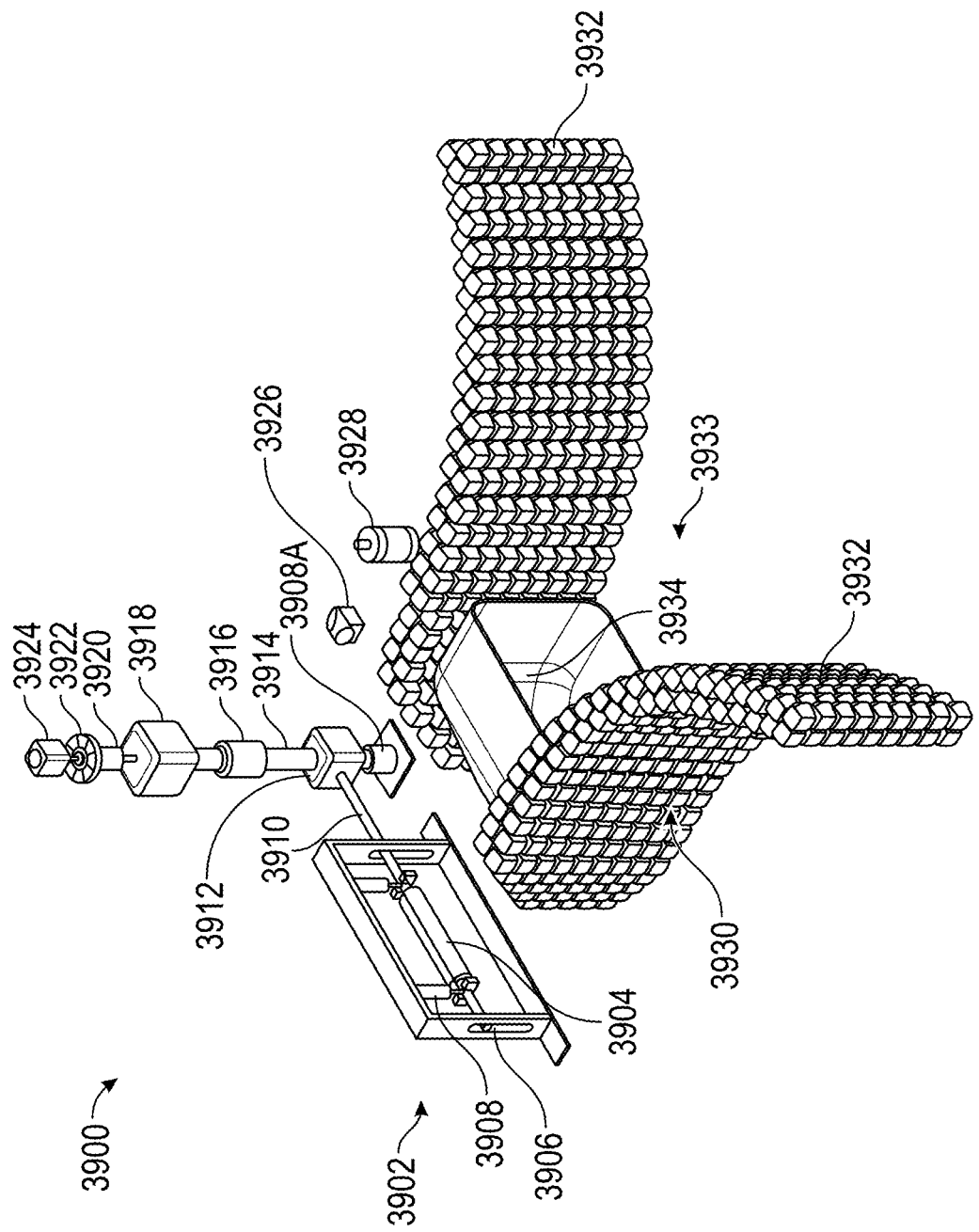
FIG. 35 shows a wave power generation, storage and regeneration system according to an example of the present application.

FIG. 35 shows a system 3900 for wave power generation. The system 3900 can include an assembly 3902 including a water wheel 3904, a frame (also called an anchor herein) 3906, cylinder(s) 3908 and 3908A, shaft 3910, differential 3912, male spline shaft 3914, female spline shaft 3916, gear box 3918, power split coupling 3920, flywheel 3922, pump motor 3924, generator 3926 and accumulator 3928. The system 3900 can additionally include a wave guiding assembly 3930 that includes walls 3932, a channel 3933 and a venturi 3934.

The system 3900 and the assembly 3902 can be constructed in a manner similar to that of the systems and assemblies including the water wheel described in my prior filed U.S. Provisional Patent Application No. 63/432,245, entitled IN-AND-OUT WAVE CAPTURE APPARATUS SYSTEM AND PROCESS, filed Dec. 13, 2022, and can be utilized with estuaries described in U.S. Patent Application Ser. No. 63/423,193, entitled "POWER AMPLIFICATION, STORAGE AND REGENERATION SYSTEM AND METHOD USING TIDES, WAVES AND/OR WIND", filed Nov. 7, 2022, each previously incorporated by reference herein.

The water wheel 3904 can be coupled to and can be rotatable relative to the frame/anchor 3906 via the cylinders 3908. The cylinders 3908 can be extendible or retractable in a telescoping manner to adjust a position of the water wheel 3904 to meet a height of the wave. The cylinders 3908 can be adjusted in height via a controller that communicates with one or more buoy mounted sensors as discussed in my pending U.S. Provisional Patent Application No. 63/432,245. The shaft 3910 can be coupled to and can be turned by the water wheel 3904 when rotated by wave action striking paddles of the water wheel 3904. The shaft 3910 can couple with the differential 3912. The differential 3912 and other components (e.g., the shaft 3910, male spline shaft 3914, female spline shaft 3916, gear box 3918, power split coupling 3920, flywheel 3922, pump motor 3924, etc.) can be supported on the cylinder 3908A, which can be raised and lowered relative to ocean floor or another structure depending upon wave action, tide, etc. The differential 3912 can be a 90 degree differential, for example and can be coupled to the male spline shaft 3914 or another shaft or component, for example. The male spline shaft 3914 can connect with the female spline shaft 3916. The female spline shaft 3916 can couple with the gear box 3918. A shaft or other coupling can connect the power split coupling 3920 with the gear box 3918. Shaft(s) (some not explicitly shown) can connect the flywheel 3922, pump motor 3924, generator 3926 and accumulator 3928 with the power split coupling 3920.

The assembly 3902 may or may not be utilized in combination with the wave guiding assembly 3930. The assembly 3902 need not be positioned adjacent a wall or other obstruction to capture rebounding wave action as described previously herein. If utilized, the walls 3932 of the wave guiding assembly 3930 can be shaped to at least partially form the channel 3933 and to raise wave height and funnel the waves into the venturi 3934. An outlet from the venturi 3934 can be positioned adjacent the assembly 3902 to an ocean side thereof. Venturi 3934 can be shaped to provide a roof to limit to wave height passing to the water wheel 3904, for example.

Figure 36:
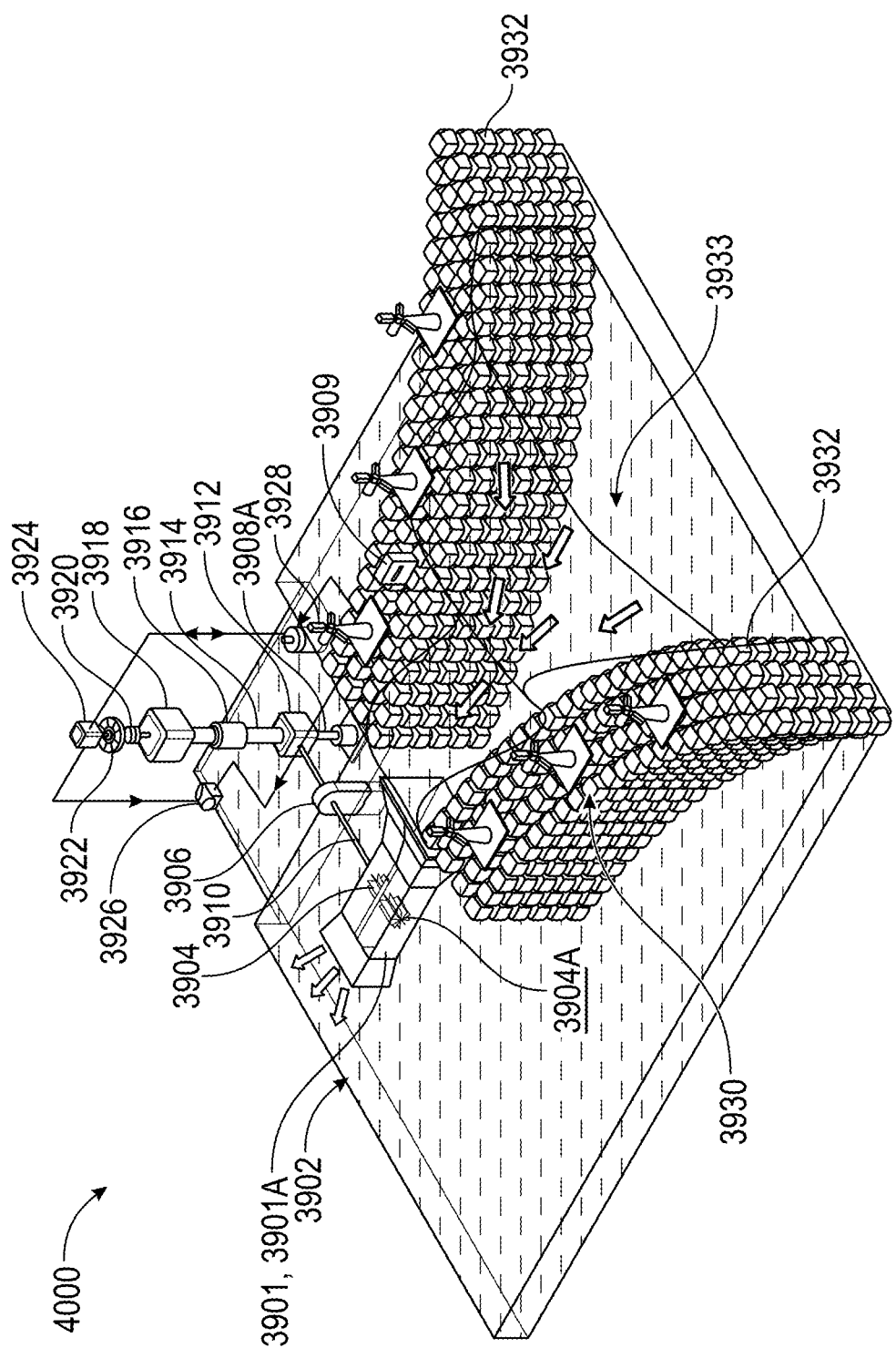
FIG. 36 shows a wave power generation, storage and regeneration system according to yet an example of the present application.

FIG. 36 shows a system 4000 for wave power generation similar to that of FIG. 35 but including a wave capture apparatus 3901 having a housing 3901A as part of the assembly 3902 described previously. Thus, the system 4000 can include the assembly 3902 including two or more water wheels 3904A and 3904B, the frame (also called an anchor herein) 3906, cylinder(s) 3908 and 3908A, shaft 3910, differential 3912, male spline shaft 3914, female spline shaft 3916, gear box 3918, power split coupling 3920, flywheel 3922, pump motor 3924, generator 3926 and accumulator 3928. The system 4000 can additionally include a wave guiding assembly 3930 that includes walls 3932 and the channel 3933.

The system 4000 and the assembly 3902 can be constructed in a manner similar to that of the systems and assemblies including the water wheel described in my prior filed U.S. Provisional Patent Application No. 63/432,245, entitled IN-AND-OUT WAVE CAPTURE APPARATUS SYSTEM AND PROCESS, filed Dec. 13, 2022, and can be utilized with estuaries described in U.S. Patent Application Ser. No. 63/423,193, entitled "POWER AMPLIFICATION, STORAGE AND REGENERATION SYSTEM AND METHOD USING TIDES, WAVES AND/OR WIND", filed Nov. 7, 2022, each previously incorporated by reference herein.

The wave capture apparatus 3901 with the housing 3901A can be shaped with an inlet to capture an funnel waves to a reduced cross-sectional section (or venturi section) where the water wheel 3904A and 3904B are located. The water wheels 3904A and 3904B can be co-shafted together in series. However, other examples contemplate the wheels 3904A and 3904B can be coupled to different shafts from one another. Additionally, the wheels 3904A and 3904B can be similarly or differently sized and shaped relative to one another. Different sized and shape for the water wheel 3904A relative to the water wheel 3904B may be suitable for capturing wave energy under different wave conditions. The water wheels 3904A and 3904B can be utilized without the wave capture apparatus 3901 and the housing 3901A according to some examples like the example previously described in FIG. 35.

Figure 36A:
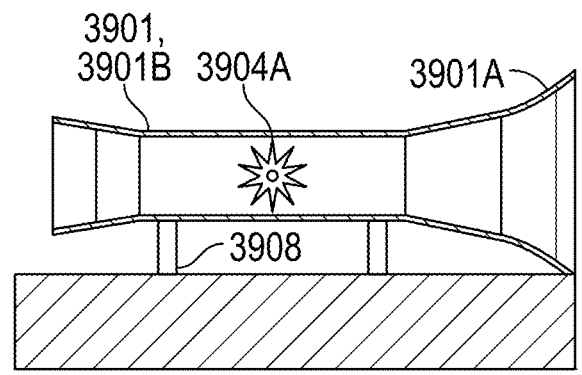
FIG. 36A is a first cross-sectional view of a wave capture apparatus of FIG. 36.

The wheels 3904A and 3904B can be coupled to and can be rotatable relative to the frame/anchor 3906 via the cylinders 3908 (FIG. 36A). The cylinders 3908 (FIG. 36A) can be extendible or retractable in a telescoping manner to adjust a position of the wave capture apparatus 3901 including the water wheels 3904A and 3904B to meet a height of the wave. The cylinders 3908 (FIG. 36A) can be adjusted in height via a controller that communicates with a wall mounted sensor 3909 and/or one or more buoy mounted sensors as discussed in my U.S. Provisional Patent Application No. 63/432,245. The shaft 3910 can be coupled to and can be turned by the wheels 3904A and 3904B when rotated by wave action striking paddles of the water wheel 3904. The shaft 3910 can couple with the differential 3912. The differential 3912 and other components (e.g., the shaft 3910, male spline shaft 3914, female spline shaft 3916, gear box 3918, power split coupling 3920, flywheel 3922, pump motor 3924, etc.) can be supported on the cylinder 3908A, which can be raised and lowered relative to ocean floor or another structure depending upon wave action, tide, etc. The differential 3912 can be a 90 degree differential, for example and can be coupled to the male spline shaft 3914 or another shaft or component, for example. The male spline shaft 3914 can connect with the female spline shaft 3916. The female spline shaft 3916 can couple with the gear box 3918. A shaft or other coupling can connect the power split coupling 3920 with the gear box 3918. Shaft(s) (some not explicitly shown) can connect the flywheel 3922, pump motor 3924, generator 3926 and accumulator 3928 with the power split coupling 3920.

The system 3200 may or may not be utilized in combination with the wave guiding assembly 3930. The assembly 3902 need not be positioned adjacent a wall or other obstruction to capture rebounding wave action as described previously herein. If utilized, the walls 3932 of the wave guiding assembly 3930 can be shaped to at least partially form the channel 3933 and to raise wave height and funnel the waves into the wave capture apparatus 3901. Wave capture apparatus 3901 can be shaped to provide a roof to limit to wave height passing to the water wheel 3904, for example. Wave capture apparatus 3901 can be height adjustable relative to the floor for example so as to have an appropriate height to receive incoming waves. Various sizes for the wave capture apparatus 3901 are contemplated according to ocean conditions, the size of the wave guiding apparatus 3930, etc. Sizes of 5 to 7 meters for the length of each of the wheels 3904A and 3904B are contemplated. Other lengths for the wheels 3904A and 3904B are contemplated.

FIG. 36A shows a cross-section of the wave capture apparatus 3901 with the housing 3901A and the cylinders 3908 as previously described. The water wheel 3904A is additionally shown. The housing 3901A forms chutes at the inlet to funnel wave action into the venturi section 3901B where the water wheel 3904A is located.

Figure 36B:
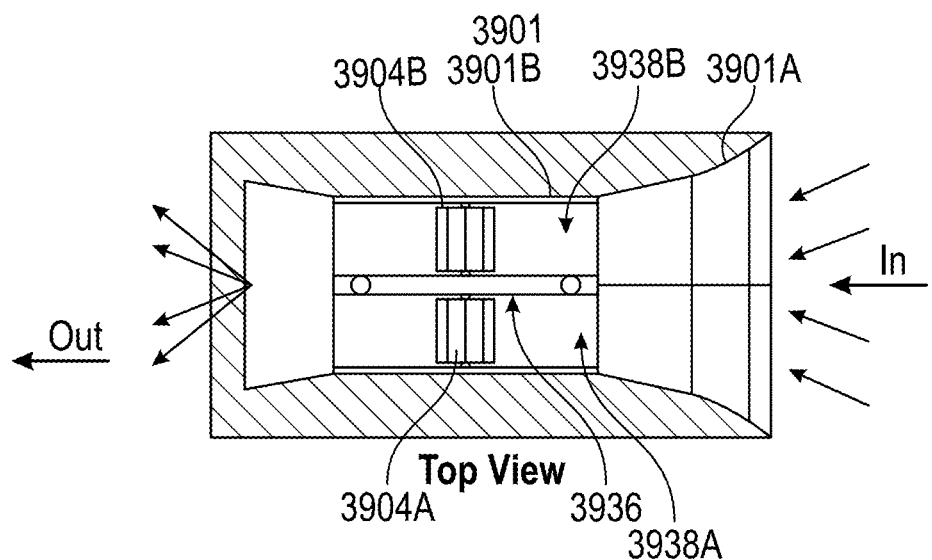
FIG. 36B is a second cross-sectional view of the wave capture apparatus of FIG. 36.

FIG. 36B shows another cross-section of the wave with the housing 3901A including a flow divider 3936 positioned between the wheels 3904A and 3904B to divide the wave flow into two separate parallel chutes 3938A and 3938B of the venturi section 3901B in which the wheels 3904A and 3904B are respectively positioned. As discussed previously, it is contemplated the size, shape and or the position of the wheels 3904A and 3904B can differ relative to one another to provide for more efficient energy extraction from wave action during different wave conditions. The thru-shafting and coupling of the wheels 3904A and 3904B along shaft(s) in series in merely exemplary as discussed above.

Each of these non-limiting examples (referred to as aspects and/or techniques) below can stand on its own, or can be combined in various permutations or combinations with one or more of the other examples.

In some aspects, the techniques described herein relate to a system for use in power generation from a flow of water as result of a tide being received by an estuary at least partially formed by human activity, the system including: one or more walls; an obstruction, wherein the one or more walls and the obstruction together at least partially enclose an area to form the estuary; a flow channel configured for the flow of the water out of the estuary between the one or more walls and the obstruction; and one or more water turbines positioned within the flow channel formed between the obstruction and the one or more walls, the one or more water turbines each having a turbine rotor configured to produce a rotor torque in response to an applied loading by the flow of the water out of the estuary.

In some aspects, the techniques described herein relate to a system, further including: one or more flow channels formed in the obstruction or adjacent the obstruction and configured to receive at least the flow of water into the estuary as a result of the tide; and second one or more water turbines positioned within the second one or more flow channels or adjacent an opening thereto, the second one or more water turbines each having a turbine rotor configured to produce a rotor torque in response to an applied loading by the flow of the water into the estuary as a result of the tide.

In some aspects, the techniques described herein relate to a system, further including: a power split transmission coupling configured to transmit the rotor torque to an output shaft at an adjustable torque ratio and divert hydraulic fluid in response to the output shaft exceeding a threshold power; a hydraulic fluid storage vessel configured to store diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, further including one or more wave power generators positioned adjacent to or on an ocean wall side of the obstruction.

In some aspects, the techniques described herein relate to a system, further including one or more wind turbines positioned within or adjacent the estuary.

In some aspects, the techniques described herein relate to a system, further including one or more gates configured to selectively open and close to control the flow of the water to and from the estuary.

In some aspects, the techniques described herein relate to a system, wherein the one or more gates are part of a dam that at least partially forms the flow channel.

In some aspects, the techniques described herein relate to a system, wherein the one or more gates are positioned at one or more of: an entrance to the flow channel, within the flow channel, adjacent a tunnel or passage through the obstruction, and/or within the tunnel or passage through the obstruction.

In some aspects, the techniques described herein relate to a system, wherein at least one of the flow channel or the one or more water turbines positioned within the flow channel has a venturi.

In some aspects, the techniques described herein relate to a system, wherein at least one of or both of the one or more walls of the estuary and the obstruction are shaped by human activity in order to magnify the flow of water as a result of the tide to a reservoir in fluid communication with the estuary.

In some aspects, the techniques described herein relate to a system, wherein the reservoir has at least one gate to regulate the flow of the water, and wherein a level of the water within the reservoir is selectively raised or lowered by displacement caused by a drum.

In some aspects, the techniques described herein relate to a system, wherein at least one of or both of the one or more walls of the estuary or the obstruction are shaped by human activity in order to magnify the flow of the water along the flow channel and out of the estuary.

In some aspects, the techniques described herein relate to a system, wherein the estuary includes a plurality of estuaries that are at least one of: joined together, staggered in series or arranged in parallel.

In some aspects, the techniques described herein relate to a system, wherein at least one of the plurality of estuaries has only a single flow channel for the flow of the water out of a respective one of the plurality of estuaries.

In some aspects, the techniques described herein relate to a system, wherein the power split transmission coupling includes: a cam ring and a hub disposed between an input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position and one or more extended positions therebetween; in the retracted position, the input shaft is independently rotatable with respect to the output shaft; in the one or more extended positions, the plurality of vanes are configured to work the hydraulic fluid and transmit torque from the input shaft to the output shaft at an adjustable torque ratio; an inlet port communicatively coupled to a hydraulic fluid source, the hydraulic fluid transportable from the hydraulic fluid source to the power split transmission coupling; and an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure.

In some aspects, the techniques described herein relate to a system, further including: a compressor configured to compress a gas; and a plurality of pressure vessels one or more in selective communication with the compressor, the plurality of pressure vessels including at least one chamber configured to hold the gas compressed to a higher gas pressure, at least one chamber configured to hold the gas compressed to a lower gas pressure relative to the higher gas pressure, and at least one chamber configured to hold the gas compressed to an intermediate pressure relative to the higher gas pressure and the lower gas pressure.

In some aspects, the techniques described herein relate to a system, wherein the at least one chamber configured to hold the gas compressed to the lower gas pressure includes a piston accumulator having a piston residing therein.

In some aspects, the techniques described herein relate to a system, wherein gas from one of the at least one chamber configured to hold the gas compressed to the higher gas pressure and the at least one chamber configured to hold the gas compressed to the intermediate pressure selectively drives a movement of the piston within the piston accumulator.

In some aspects, the techniques described herein relate to a system, wherein the piston accumulator is configured to hold the hydraulic fluid on a first side of the piston and is configured to hold the gas on a second side of the piston.

In some aspects, the techniques described herein relate to a system, wherein the hydraulic motor selectively communicates with a piston accumulator for storage of the hydraulic fluid.

In some aspects, the techniques described herein relate to a system, wherein the hydraulic motor is selectively driven by the hydraulic fluid stored in the piston accumulator.

In some aspects, the techniques described herein relate to a method for operating one or more water turbines for power generation including: forming at least a portion of one or more walls or an obstruction to create an estuary; positioning the one or more turbines within a channel formed between the one or more walls and the obstruction that form parts of the estuary; receiving a flow of water as a result of a tide into the estuary; retaining the water within the estuary; and selectively releasing the water as an outflow along the channel formed between the one or more walls and the obstruction, wherein the outflow turns a rotor of the one or more turbines.

In some aspects, the techniques described herein relate to a method, further including: adjusting a power split transmission coupling to transfer torque from the rotor to a generator by working a hydraulic fluid, wherein the generator converts mechanical power to electrical power; diverting the hydraulic fluid at high pressure from the power split transmission coupling in response to the electrical power produced by the generator exceeding a threshold to maintain the electrical power produced by the generator at or below the threshold; storing the hydraulic fluid diverted from the power split transmission coupling under high pressure in a storage vessel; and introducing the hydraulic fluid stored at high pressure to a hydraulic motor in response to the generator producing below threshold electrical power, the hydraulic motor operatively coupled to the generator and configured to transmit mechanical power to the generator for electrical power generation.

In some aspects, the techniques described herein relate to a method, further including one or more wave power generators positioned on or adjacent the obstruction.

In some aspects, the techniques described herein relate to a method, further including one or more wind turbines positioned in or adjacent the estuary.

In some aspects, the techniques described herein relate to a method, further including providing one or more gates configured to selectively open and close to control the flow of the water to and from the estuary.

In some aspects, the techniques described herein relate to a method, wherein providing the one or more gates includes providing a dam, wherein the one or more gates are part of a dam that at least partially forms the flow channel.

In some aspects, the techniques described herein relate to a method, wherein providing the one or more gates includes positioning the gates at one or more of: an entrance to the flow channel, within the flow channel, adjacent a tunnel or passage through the obstruction, and/or within the tunnel or passage through the obstruction.

In some aspects, the techniques described herein relate to a method, wherein at least one of the flow channel or the one or more water turbines positioned within the flow channel has a venturi.

In some aspects, the techniques described herein relate to a system for use in power generation using water as a result of a tide to an estuary, the system including: one or more flow channels formed between an obstruction and a wall of the estuary, wherein the one or more flow channels are configured to receive an outflow of the water from the estuary; and one or more water turbines positioned within the one or more flow channels, the one or more water turbines each having a turbine rotor configured to produce a rotor torque in response to an applied loading by the outflow of the water from the tidal estuary along the one or more flow channels.

In some aspects, the techniques described herein relate to a system, further including: a power split transmission coupling configured to transmit the rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, further including second one or more channels that pass through the obstruction, wherein the second one or more channels are configured to receive an inflow of the water to the estuary.

In some aspects, the techniques described herein relate to a system, further including one or more gates regulating the inflow and the outflow of the water to and from the estuary.

In some aspects, the techniques described herein relate to a system, wherein at least some of the one or more gates are part of a dam that form at least one of the one or more channels or the second one or more channels.

In some aspects, the techniques described herein relate to a system, wherein at least one of the one or more water turbines, the one or more flow channels or the second one or more channels include a venturi.

In some aspects, the techniques described herein relate to a system, wherein at least one of or both of the one or more walls of the estuary and the obstruction are shaped by human activity in order to magnify the tidal flow to a reservoir in fluid communication with the estuary.

In some aspects, the techniques described herein relate to a system, wherein the reservoir has at least one gate to regulate the flow of the water, and wherein a level of the water within the reservoir is selectively raised or lowered by displacement of water by a drum.

In some aspects, the techniques described herein relate to a system, wherein at least one of or both of the one or more walls of the estuary or the obstruction are shaped by human activity in order to magnify flow of the water along the flow channel and out of the estuary.

In some aspects, the techniques described herein relate to a system, wherein the estuary includes a plurality of estuaries that are at least one of: joined together, staggered in series or arranged in parallel.

In some aspects, the techniques described herein relate to a system, wherein at least one of the plurality of estuaries has only a single flow channel for the flow of the water out of a respective one of the plurality of estuaries.

In some aspects, the techniques described herein relate to a system for use in power generation from a flow of water as result of a tide being received by an estuary at least partially formed by human activity, the system including: one or more walls; a floor; one or more gates configured to selectively open and close to control the flow of the water to and from the estuary, wherein the one or more walls, the floor and the one or more gates together enclose a volume that includes the estuary to capture the water from the tide; at least one of: a water flow capturing apparatus, a pipe or a reservoir configured to receive a flow of the water out of the estuary; and one or more water turbines positioned at least one of: within the water flow capturing apparatus, at or adjacent an outlet of the pipe, or at or adjacent an outlet of the reservoir, wherein the one or more water turbines each having a turbine rotor configured to produce a rotor torque in response to an applied loading by the flow of the water out of the estuary.

In some aspects, the techniques described herein relate to a system, wherein the pipe includes a plurality of pipes extending across at least a portion of the estuary, wherein the plurality of pipes are each configured to receive a portion of the water received by the estuary as a result of the tide.

In some aspects, the techniques described herein relate to a system, wherein the reservoir includes a plurality of reservoirs that are in selective communication with the estuary to receive the water as result of the tide.

In some aspects, the techniques described herein relate to a system, wherein the plurality of reservoirs include at least two reservoirs that communicate selectively via opening of a door or gate.

In some aspects, the techniques described herein relate to a system, wherein a level of the water within one or more of the plurality of reservoirs is selectively raised or lowered by displacement of a drum.

In some aspects, the techniques described herein relate to a system, wherein the drum is filled during a high tide and is selectively drained to change the level of water within the one or more of the plurality of reservoirs.

In some aspects, the techniques described herein relate to a system, further including a second estuary selectively communicating with the estuary, the second estuary is open to the ocean and has a man modified floor configured to magnify a level of the water as result of the tide being received by the estuary.

In some aspects, the techniques described herein relate to a system, wherein the man modified floor includes a ramp adjacent the gate.

In some aspects, the techniques described herein relate to a system, further including: a power split transmission coupling configured to transmit the rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, further including one or more wave power generators positioned adjacent to the estuary.

In some aspects, the techniques described herein relate to a system, further including one or more wind turbines coupled to the one or more walls.

In some aspects, the techniques described herein relate to a system, wherein water flow capturing apparatus forms a venturi and the one or more water turbines are positioned within the venturi.

In some aspects, the techniques described herein relate to a system, wherein the one or more walls of the estuary are shaped by human activity in order to magnify a level the flow of water as a result of the tide to the water flow capturing apparatus.

In some aspects, the techniques described herein relate to a system, wherein the estuary includes a plurality of estuaries that connected together by walls that form a second estuary open to the ocean, wherein the second estuary has a man-modified floor.

In some aspects, the techniques described herein relate to a system, wherein the one or more walls of the estuary are shaped by human activity in order to magnify a level the flow of water as a result of the tide to the plurality of reservoirs.

In some aspects, the techniques described herein relate to a system, wherein the power split transmission coupling includes: a cam ring and a hub disposed between an input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position and one or more extended positions therebetween; in the retracted position, the input shaft is independently rotatable with respect to the output shaft; in the one or more extended positions, the plurality of vanes are configured to work the hydraulic fluid and transmit torque from the input shaft to the output shaft at an adjustable torque ratio; an inlet port communicatively coupled to a hydraulic fluid source, the hydraulic fluid transportable from the hydraulic fluid source to the power split transmission coupling; and an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure.

In some aspects, the techniques described herein relate to a method for operating one or more water turbines for power generation including: forming at least a portion of one or more walls or a floor to create an estuary; positioning the one or more water turbines adjacent or within estuary; receiving a flow of water as a result of a tide into the estuary; retaining the water within the estuary; and selectively releasing the water as an outflow from the estuary, wherein the outflow turns a rotor of the one or more water turbines.

In some aspects, the techniques described herein relate to a method, wherein at least one of the one or more water turbines are part of: a water flow capturing apparatus, adjacent or at an outlet to a pipe that extends through the one or more walls or adjacent or at an outlet from a reservoir that communicates with and receives the water from the estuary.

In some aspects, the techniques described herein relate to a method, wherein a level of the water within the reservoir is selectively raised or lowered by a drum.

In some aspects, the techniques described herein relate to a method, wherein the drum is filled during a high tide and is selectively drained to change the level of water within the reservoir.

In some aspects, the techniques described herein relate to a method, further including: forming a second estuary that selectively communicates with the estuary, the second estuary is open to the ocean and has a man modified floor configured to magnify a level of the water as result of the tide being received by the estuary.

In some aspects, the techniques described herein relate to a method, wherein the man modified floor includes a ramp.

In some aspects, the techniques described herein relate to a method, further including: adjusting a power split transmission coupling to transfer torque from the rotor to a generator by working a hydraulic fluid, wherein the generator converts mechanical power to electrical power; diverting the hydraulic fluid at high pressure from the power split transmission coupling in response to the electrical power produced by the generator exceeding a threshold to maintain the electrical power produced by the generator at or below the threshold; storing the hydraulic fluid diverted from the power split transmission coupling under high pressure in a storage vessel; and introducing the hydraulic fluid stored at high pressure to a hydraulic motor in response to the generator producing below threshold electrical power, the hydraulic motor operatively coupled to the generator and configured to transmit mechanical power to the generator for electrical power generation.

In some aspects, the techniques described herein relate to a method, further including one or more wind turbines positioned in or adjacent the estuary.

In some aspects, the techniques described herein relate to a method, wherein selectively releasing the water includes passing the water through a venturi to the one or more water turbines.

In some aspects, the techniques described herein relate to a system for use in power generation using water as a result of a tide to an estuary, the system including: a plurality of reservoirs communicating with the estuary, wherein the plurality of reservoirs are configured to receive the water as a result of the tide from the estuary; and one or more water turbines positioned within or adjacent an outlet from one or more of the plurality of reservoirs, the one or more water turbines each having a turbine rotor configured to produce a rotor torque in response to an applied loading by outflow of the water from the one or more of the plurality of reservoirs.

In some aspects, the techniques described herein relate to a system, further including: a power split transmission coupling configured to transmit the rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, wherein one or more walls of the estuary are shaped by human activity in order to magnify a level of a flow of water as the result of the tide to the plurality of reservoirs.

In some aspects, the techniques described herein relate to a system, wherein a level of the water within one or more of the plurality of reservoirs is selectively raised or lowered by displacement cause by a drum that is selectively moveable.

In some aspects, the techniques described herein relate to a system, wherein the drum is filled during a high tide and is selectively drained to change the level of water within the one or more of the plurality of reservoirs.

In some aspects, the techniques described relate to a system for use in power generation using water as a result of a tide to an estuary. The system can optionally include a plurality of reservoirs communicating with the estuary and one or more turbines. The plurality of reservoirs can each be partially formed by man-formed dams and can each be partially formed by a naturally occurring land formation. The plurality of reservoirs can be configured to receive the water as a result of the tide from the estuary. The one or more water turbines can be positioned within or adjacent a gate or channel from one or more of the plurality of reservoirs. The one or more water turbines can each have a turbine rotor configured to produce a rotor torque in response to an applied loading by an inflow or outflow of the water from the one or more of the plurality of reservoirs.

In some aspects, the techniques described herein relate to a system where the estuary is at least partially man-formed having one or more man-formed walls and is at least partially formed by the naturally occurring land formation.

In some aspects, the techniques described herein relate to a system, further including: a power split transmission coupling configured to transmit the rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, one or more walls of at least one of the man-formed dams are shaped by human activity in order to magnify a level of a flow of water as the result of the tide to the plurality of reservoirs.

In some aspects, the techniques described herein relate to a system, wherein the one or more anchors are configured to be position adjustable to adjust a position of the water wheel relative to at least one of the floor, from a surface of the water or relative to the obstruction.

In some aspects, the techniques described herein relate to a system, further including one or more sensors configured to measure one or more criteria regarding: a trough and/or crest of the first of the waves, a height of the waves, a speed of the waves, a frequency of the waves, a trough and/or crest of the second of the waves, a height of spray from contact with the obstruction, tidal conditions, current, or any combination thereof.

In some aspects, the techniques described herein relate to a system, wherein the one or more sensors generate data regarding the one or more criteria and the data is used to adjust the position of the water wheel.

In some aspects, the techniques described herein relate to a system, further including: a drive shaft coupled to the water wheel and configured to transmit the first rotor torque and the second rotor torque; a universal joint coupled to the drive shaft; a gearbox coupled to the universal joint and including a right hand reversing gear and a left hand reversing gear to unify a direction of rotation of the drive shaft; a power split transmission coupling configured to transmit the first rotor torque and the second rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, wherein the power split transmission coupling includes: a cam ring and a hub disposed between an input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position and one or more extended positions therebetween; in the retracted position, the input shaft is independently rotatable with respect to the output shaft; in the one or more extended positions, the plurality of vanes are configured to work the hydraulic fluid and transmit torque from the input shaft to the output shaft at an adjustable torque ratio; an inlet port communicatively coupled to a hydraulic fluid source, the hydraulic fluid transportable from the hydraulic fluid source to the power split transmission coupling; an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure.

In some aspects, the techniques described herein relate to a system, further including: one or more pressure vessels in selective communication with the power split transmission coupling, the one or more pressure vessels configured to hold a gas compressed by action of the power split transmission coupling.

In some aspects, the techniques described herein relate to a system, wherein the hydraulic motor selectively communicates with a piston accumulator for storage of the hydraulic fluid.

In some aspects, the techniques described herein relate to a system, wherein the hydraulic motor is selectively driven by the hydraulic fluid stored in the piston accumulator.

In some aspects, the techniques described herein relate to a system, further including one or more flywheels coupled to the power split coupling.

In some aspects, the techniques described herein relate to a method for operating a water wheel for power generation from waves including: forming at least a portion of an obstruction with one or more walls facing the waves; positioning the water wheel adjacent the obstruction; rotating the water wheel in a first direction as a result of a first of the waves engaging at least one of a plurality of blades of the water wheel; and rotating the water wheel in a reverse direction as a result of a second of the waves striking and backwashing from the obstruction and engaging at least one of the plurality of blades of the water wheel.

In some aspects, the techniques described herein relate to a method, further including: unifying a direction of an drive shaft coupled to the water wheel; adjusting a power split transmission coupling to transfer torque from the drive shaft to a generator by working a hydraulic fluid, wherein the generator converts mechanical power to electrical power; diverting the hydraulic fluid at high pressure from the power split transmission coupling in response to the electrical power produced by the generator exceeding a threshold to maintain the electrical power produced by the generator at or below the threshold; storing the hydraulic fluid diverted from the power split transmission coupling under high pressure in a storage vessel; and introducing the hydraulic fluid stored at high pressure to a hydraulic motor in response to the generator producing below threshold electrical power, the hydraulic motor operatively coupled to the generator and configured to transmit mechanical power to the generator for electrical power generation.

In some aspects, the techniques described herein relate to a method, further including forming at least a portion of the obstruction with human activity.

In some aspects, the techniques described herein relate to a method, further including providing a channel at least partially formed by human activity, wherein the channel is configured to direct the waves to the obstruction, wherein the channel is formed by one or more walls at least partially shaped by human activity and oriented at an angle to the obstruction.

In some aspects, the techniques described herein relate to a method, further including providing one or more anchors coupled to the water wheel and configured to secure the water wheel to one or more of the obstruction, a floor or another object.

In some aspects, the techniques described herein relate to a method, wherein the one or more anchors are configured to be position adjustable to adjust a position of the water wheel relative to at least one of the floor, from a surface of the water or relative to the obstruction.

In some aspects, the techniques described herein relate to a method, further including providing one or more sensors configured to measure one or more criteria regarding: a trough and/or crest of the first of the waves, a height of the waves, a speed of the waves, a frequency of the waves, a trough and/or crest of the second of the waves, a height of spray from contact with the obstruction, tidal conditions, current, or any combination thereof.

In some aspects, the techniques described herein relate to a method, further including generating with the one or more sensors data regarding the one or more criteria and adjusting the position of the water wheel based upon the data.

In some aspects, the techniques described herein relate to a water wheel configured to generate torque from waves including: a hub; and a plurality of blades coupled to the hub, wherein the plurality of blades are configured to produce a first rotor torque and rotate the hub in a first direction in response to a first applied loading by a flow of water from a first of the waves engaging one or more of the plurality of blades in a first direction and configured to produce a second rotor torque and rotate the hub in a reverse direction in response to a second applied loading by a flow of water in a second direction from a second of the waves engaging one or more of the plurality of blades.

In some aspects, the techniques described herein relate to a water wheel, wherein each of the plurality of blades has substantially a same geometry along each of two major surfaces thereof so as to be engageable by the flow of water in the first direction and the second direction.

In some aspects, the techniques described herein relate to a water wheel, wherein each of the plurality of blades is substantially flat along an extent of each of the two major surfaces.

In some aspects, the techniques described herein relate to a water wheel, wherein the water wheel is configured to couple with one or more anchors configured to secure the water wheel in a position adjustable manner.

In some aspects, the techniques described herein relate to a system for power generation from waves, including: a wave guiding apparatus; and a water wheel positioned adjacent the obstruction, wherein the water wheel includes a plurality of blades configured to produce a first rotor torque and rotate the water wheel in a first direction in response to a first applied loading by a flow of water from a first of the waves engaging one or more of the plurality of blades in a first direction toward the obstruction and configured to produce a second rotor torque and rotate the water wheel in a reverse direction in response to a second applied loading by a backwash flow of water in a second direction from a second of the waves engaging one or more of the plurality of blades back from the obstruction.

In some aspects, the techniques described herein relate to a system, wherein the wave guiding apparatus is at least partially formed by human activity and includes a wall configured to magnify wave height.

In some aspects, the techniques described herein relate to a system, wherein the wave guiding apparatus includes a venturi positioned in a channel at least partially formed by the wall, wherein the channel is configured to direct the waves through the venturi to the water wheel.

In some aspects, the techniques described herein relate to a system, further including one or more anchors coupled to the water wheel and configured to secure the water wheel to a floor or another object.

In some aspects, the techniques described herein relate to a system, further including one or more cylinders coupled to the one or more anchors, wherein the one or more cylinders are configured to be position adjustable to adjust a position of the water wheel.

In some aspects, the techniques described herein relate to a system, further including one or more sensors configured to measure one or more criteria regarding: a trough and/or crest of the first of the waves, a height of the waves, a speed of the waves, a frequency of the waves, a trough and/or crest of the second of the waves, a height of spray from contact with the obstruction, tidal conditions, current, or any combination thereof.

In some aspects, the techniques described herein relate to a system, wherein the one or more sensors generate data regarding the one or more criteria and the data is used to adjust the position of the water wheel using the one or more cylinders.

In some aspects, the techniques described herein relate to a system, further including: a drive shaft coupled to the water wheel and configured to transmit the first rotor torque and the second rotor torque; a differential coupled to the drive shaft; a splined shaft coupled to the differential; a gearbox coupled to the universal joint and including a right hand reversing gear and a left hand reversing gear to unify a direction of rotation of the drive shaft; a power split transmission coupling configured to transmit the first rotor torque and the second rotor torque to an output shaft at an adjustable torque ratio and divert hydraulic fluid in response to the output shaft exceeding a threshold power; a flywheel coupled to the power split transmission coupling; a pump motor coupled to the flywheel; a hydraulic fluid storage vessel configured to store the diverted hydraulic fluid under pressure; a hydraulic motor including a motor output configured to receive the hydraulic fluid stored under pressure and generate a torque on the motor output in response; a generator operatively coupled to the output shaft and the motor output, wherein the generator produces electrical power in response to at least one of rotation of: the output shaft, the torque of the motor output, or both; and a cylinder configured to adjust a position of one or more of the drive shaft, the differential, the splined shaft, the gearbox, the power split transmission coupling, the flywheel and the pump motor.

In some aspects, the techniques described herein relate to a system, wherein the power split transmission coupling includes: a cam ring and a hub disposed between an input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position and one or more extended positions therebetween; in the retracted position, the input shaft is independently rotatable with respect to the output shaft; in the one or more extended positions, the plurality of vanes are configured to work the hydraulic fluid and transmit torque from the input shaft to the output shaft at an adjustable torque ratio; an inlet port communicatively coupled to a hydraulic fluid source, the hydraulic fluid transportable from the hydraulic fluid source to the power split transmission coupling; an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure.

In some aspects, the techniques described herein relate to a method for operating a water wheel for power generation from waves including: forming a wave funneling apparatus; positioning the water wheel adjacent the wave funneling apparatus; and rotating the water wheel in a first direction as a result of a first of the waves engaging at least one of a plurality of blades of the water wheel as a result of the waves passing through the wave funneling apparatus.

In some aspects, the techniques described herein relate to a method, further including forming at least a portion of the wave funneling apparatus with human activity, wherein the wave funneling apparatus includes a wall configured to magnify wave height.

In some aspects, the techniques described herein relate to a method, further including providing the wave guiding apparatus with a venturi positioned in a channel at least partially formed by the wall, wherein the channel is configured to direct the waves through the venturi to the water wheel.

In some aspects, the techniques described herein relate to a method, further including adjusting a position of the water wheel based upon a wave height.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplate examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for operating one or more water turbines for power generation comprising:
   forming at least a portion of one or more walls to create an estuary, wherein the one or more walls include at least a first wall and a second wall, wherein at least the first wall is angulated relative to the second wall to funnel and magnify a flow of water into or out of the estuary as a result of a tide flowing along a flow channel;
   positioning the one or more water turbines adjacent to an outlet to the estuary;
   receiving the flow of the water as a result of the tide into the estuary;
   retaining the water within the estuary; and
   selectively releasing the water as an outflow from the estuary, wherein the outflow turns a rotor of the one or more water turbines.

2. The method of claim 1, wherein at least one of the one or more water turbines are positioned adjacent or at an outlet from a reservoir that is a dam that communicates with and receives water from the estuary but is configured to hold the water separate from the estuary for selective use.

3. The method of claim 2, wherein a level of the water within the reservoir is selectively raised or lowered by a drum.

4. The method of claim 3, wherein the drum is filled during a high tide and is selectively drained to change the level of water within the reservoir.

5. The method of claim 1, further comprising:
forming a second estuary that selectively communicates with the estuary, the second estuary is open to ocean and has a man modified floor configured to magnify a level of the water as result of the tide being received by the estuary.

6. The method of claim 5, wherein the man-modified floor includes a ramp.

7. The method of claim 1, further comprising:
adjusting a power split transmission coupling to transfer torque from the rotor to a generator by working a hydraulic fluid, wherein the generator converts mechanical power to electrical power;
diverting the hydraulic fluid at high pressure from the power split transmission coupling in response to the electrical power produced by the generator exceeding a threshold to maintain the electrical power produced by the generator at or below the threshold;
storing the hydraulic fluid diverted from the power split transmission coupling under high pressure in a storage vessel; and
introducing the hydraulic fluid stored at high pressure to a hydraulic motor in response to the generator producing below threshold electrical power, the hydraulic motor operatively coupled to the generator and configured to transmit mechanical power to the generator for electrical power generation.

8. The method of claim 1, further comprising at least one of: wind turbines and wave power generators positioned in or adjacent the estuary.

9. The method of claim 1, wherein selectively releasing the water includes passing the water through a venturi to the one or more water turbines.

10. A system for use in power generation using water as a result of a tide to an estuary, the system comprising:
a plurality of reservoirs communicating with the estuary, wherein the plurality of reservoirs are configured to receive the water as a result of the tide from the estuary, wherein one or more walls of the estuary are shaped by human activity including at least a first wall that is angulated relative to a second wall in order funnel and to magnify a level of a flow of the water as the result of the tide to the plurality of reservoirs; and
one or more water turbines positioned within or adjacent an outlet from one or more of the plurality of reservoirs, the one or more water turbines each having a turbine rotor configured to produce a rotor torque in response to an applied loading by outflow of the water from one or more of the plurality of reservoirs.

11. The system of claim 10, further comprising:
a power split transmission coupling configured to transmit the rotor torque to an output shaft at an adjustable torque ratio and divert hydraulic fluid in response to the output shaft exceeding a threshold power;
a hydraulic fluid storage vessel configured to store the hydraulic fluid that is diverted under pressure;
a hydraulic motor including a motor output configured to receive the hydraulic fluid stored under pressure and generate a torque on the motor output in response; and
a generator operatively coupled to the output shaft and the motor output, wherein the generator produces electrical power in response to at least one of rotation of: the output shaft, the torque of the motor output, or both.

12. The system of claim 10, wherein a level of the water within one or more of the plurality of reservoirs is selectively raised or lowered by displacement-cause caused by a drum that is selectively moveable.

13. The system of claim 12, wherein the drum is filled during a high tide and is selectively drained to change the level of water within the one or more of the plurality of reservoirs.

14. The system of claim 10, further comprising one or more wave power generators positioned adjacent to or on an ocean wall side of an obstruction.

15. A system for use in power generation using water as a result of a tide to an estuary, the system comprising:
a plurality of reservoirs communicating with the estuary, wherein the plurality of reservoirs are each partially formed by man-formed dams and partially formed by a naturally occurring land formation, wherein the plurality of reservoirs are configured to receive the water as a result of the tide from the estuary, wherein one or more walls of the estuary are shaped by human activity including at least a first wall that is angulated relative to a second wall in order funnel and to magnify a level of a flow of the water as the result of the tide to the plurality of reservoirs; and
one or more water turbines positioned within or adjacent a gate or channel from one or more of the plurality of reservoirs, the one or more water turbines each having a turbine rotor configured to produce a rotor torque in response to an applied loading by an inflow or outflow of the water from one or more of the plurality of reservoirs.

16. The system of claim 15, wherein the estuary is at least partially man-formed having some of the one or more walls being one or more man-formed walls and having some of the one or more walls being at least partially formed by the naturally occurring land formation.

17. The system of claim 15, further comprising:
a power split transmission coupling configured to transmit the rotor torque to an output shaft at an adjustable torque ratio and divert hydraulic fluid in response to the output shaft exceeding a threshold power;
a hydraulic fluid storage vessel configured to store the hydraulic fluid that is diverted under pressure;
a hydraulic motor including a motor output configured to receive the hydraulic fluid stored under pressure and generate a torque on the motor output in response; and
a generator operatively coupled to the output shaft and the motor output, wherein the generator produces electrical power in response to at least one of rotation of: the output shaft, the torque of the motor output, or both.

18. The system of claim 15, wherein one or more walls of at least one of the man-formed dams are shaped by human activity in order to magnify the level of the flow of water as the result of the tide to the plurality of reservoirs.

19. The system of claim 15, further comprising one or more wave power generators positioned adjacent to or on an ocean wall side of an obstruction.

* * * * *